(12) United States Patent
Nagai

(10) Patent No.: US 8,164,422 B2
(45) Date of Patent: Apr. 24, 2012

(54) RADIO-FREQUENCY TAG COMMUNICATION DEVICE, AND RADIO-FREQUENCY TAG COMMUNICATION SYSTEM

(75) Inventor: Takuya Nagai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1324 days.

(21) Appl. No.: 11/761,263

(22) Filed: Jun. 11, 2007

(65) Prior Publication Data
US 2007/0241864 A1    Oct. 18, 2007

Related U.S. Application Data

(63) Continuation-in-part of application No. PCT/JP2005/021728, filed on Nov. 25, 2005.

(30) Foreign Application Priority Data

Dec. 15, 2004  (JP) ................................. 2004-363695
Feb. 23, 2005  (JP) ................................. 2005-047982

(51) Int. Cl.
*H04Q 5/22* (2006.01)
(52) U.S. Cl. ...................... 340/10.1; 340/572.1; 340/8.1
(58) Field of Classification Search ................. 340/10.1, 340/10.2, 10.3, 10.31, 572.1, 539.23, 572.7, 340/8.1, 10.4, 10.41, 10.42
See application file for complete search history.

(56) References Cited

U.S. PATENT DOCUMENTS

| 7,084,739 | B2 | 8/2006 | Taki et al. | |
| 2002/0175805 | A9* | 11/2002 | Armstrong et al. | 340/10.31 |
| 2005/0088284 | A1* | 4/2005 | Zai et al. | 340/10.2 |
| 2006/0114104 | A1* | 6/2006 | Scaramozzino | 340/10.2 |

FOREIGN PATENT DOCUMENTS

| JP | H11-015932 A | 1/1999 |
| JP | 2001-116583 A | 4/2001 |
| JP | 2003-283367 A | 10/2003 |
| JP | 2004-088755 A | 3/2004 |
| JP | 2004-287719 A | 10/2004 |

OTHER PUBLICATIONS

Japanese Patent Office, Office Action for Japanese Patent Application No. 2005-047982, mailed Sep. 9, 2008. (counterpart for above-captioned U.S. patent application.).
International Search Report for PCT/JP2005/021728, mailed Feb. 14, 2006.

* cited by examiner

*Primary Examiner* — Nabil Syed
(74) *Attorney, Agent, or Firm* — Baker Botts L.L.P.

(57) ABSTRACT

Radio-frequency tag communication system and radio-frequency tag communication device, which permit highly efficient coordinated operations of the communication devices while preventing overlapping of communication. The communication system includes a positional-relationship determining portion configured to determine relative positions of the plurality of radio-frequency tag communication devices, and a transmission control portion configured to control transmission of the transmitted signal from each of the plurality of radio-frequency tag communication devices, according to a result of determination of the relative positions by the positional-relationship determining portion, so that a sufficiently long time is provided for the mutually adjacent communication devices to transmit the transmitted signals. Namely, the present invention provides a radio-frequency tag communication system wherein the radio-frequency tag communication devices are operable in a coordinated fashion with high efficiency, while preventing overlapping of communication.

13 Claims, 35 Drawing Sheets

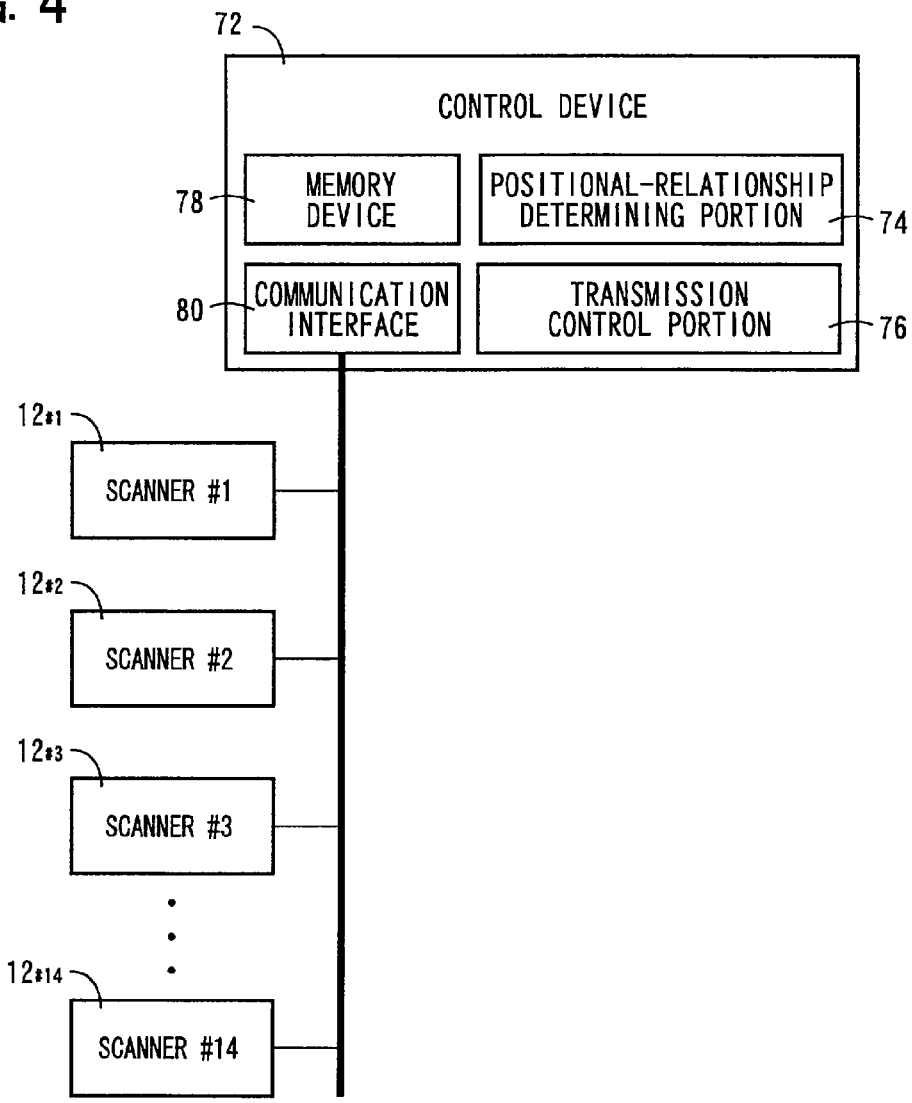

FIG. 16
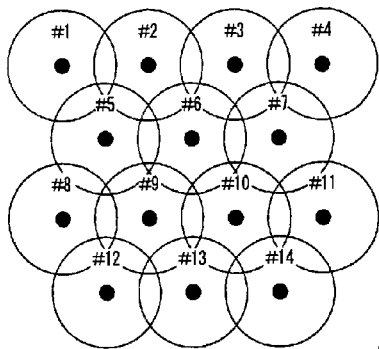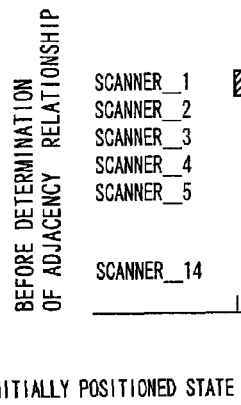
(1) INITIALLY POSITIONED STATE
FIG. 17
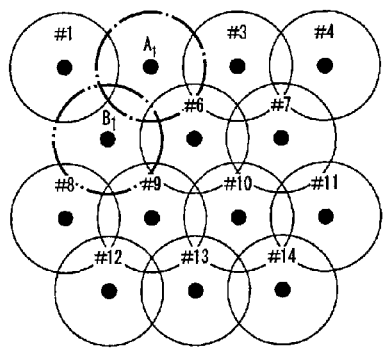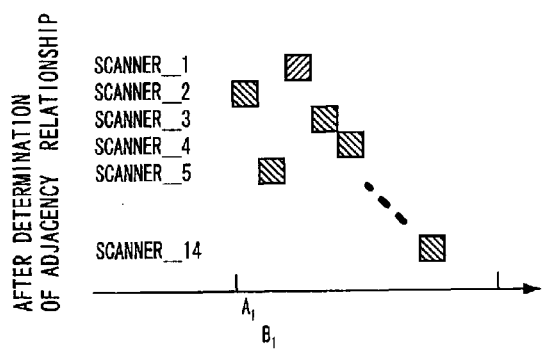
(2) IN CASE OF DETERMINATION
OF ADJACENCY OF SCANNER_2 AND SCANNER_5
FIG. 18
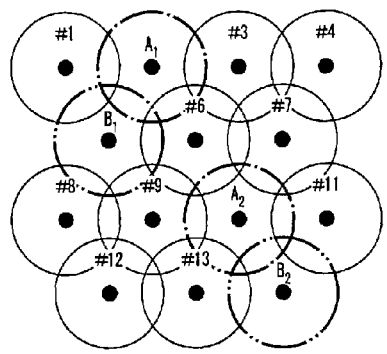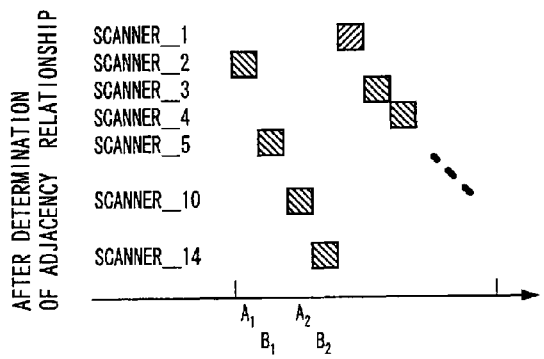
(3) IN CASE OF DETERMINATION
OF ADJACENCY OF SCANNER_10 AND SCANNER_14

FIG. 19
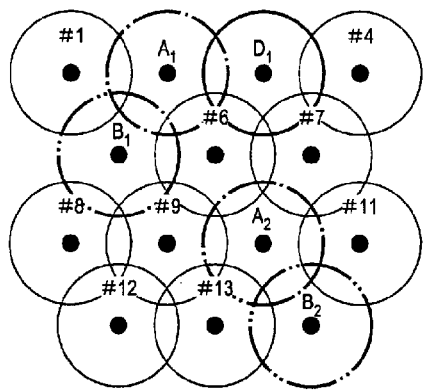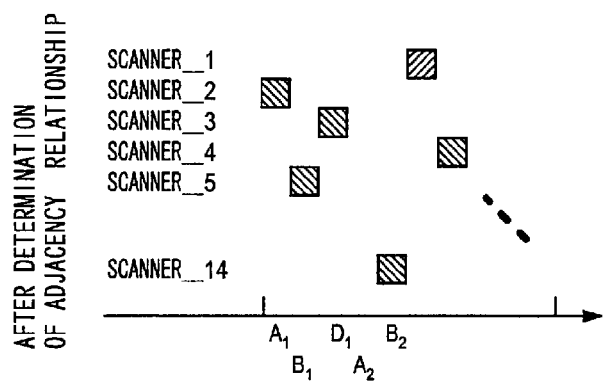
(4) IN CASE OF DETERMINATION
OF ADJACENCY OF SCANNER_2 AND SCANNER_3
FIG. 20
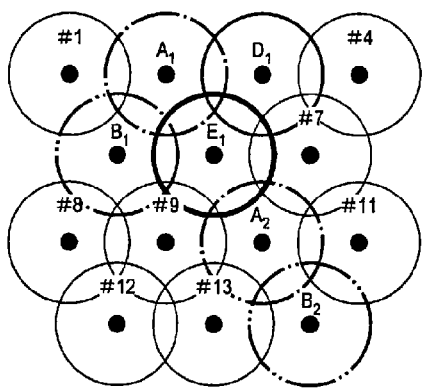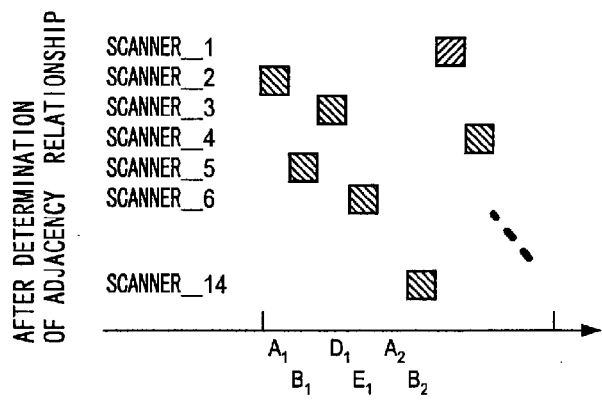
(5) IN CASE OF DETERMINATION
OF ADJACENCY OF SCANNER_5 AND SCANNER_6

FIG. 21
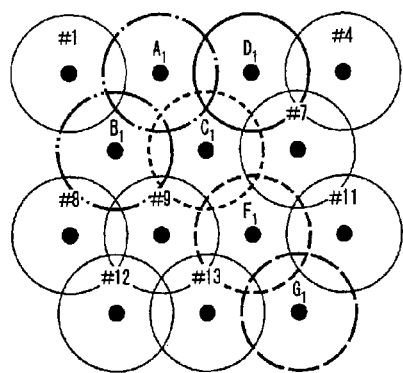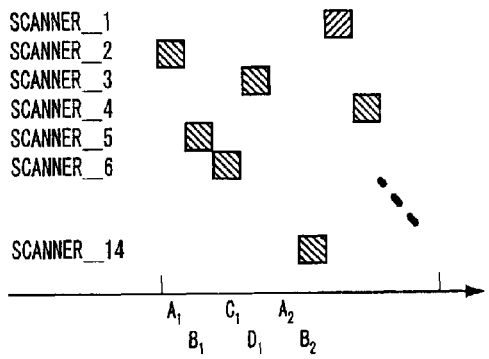
(6) IN CASE OF DETERMINATION
OF ADJACENCY OF SCANNER_2 AND SCANNER_6
FIG. 22
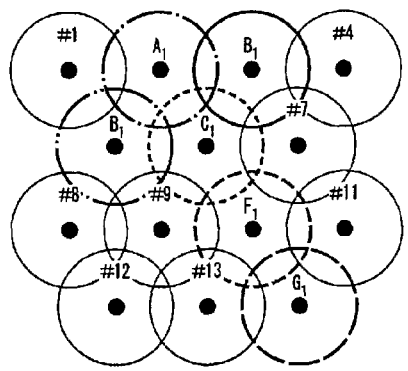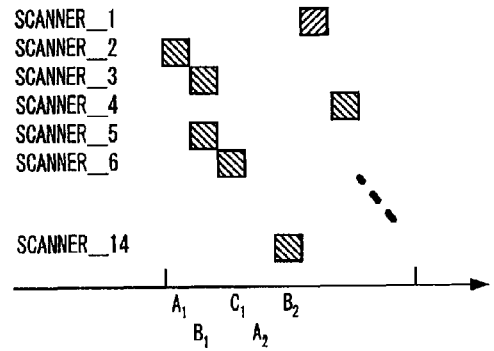
(7) IN CASE OF DETERMINATION
OF ADJACENCY OF SCANNER_3 AND SCANNER_6

RADIO-FREQUENCY TAG COMMUNICATION DEVICE, AND RADIO-FREQUENCY TAG COMMUNICATION SYSTEM

CROSS-REFERENCE TO RELATED APPLICATIONS

This application is a continuation-in-part of International Patent Application No. PCT/JP2005/021728, filed Nov. 25, 2005, which claims the benefits of Japanese Patent application No. 2004-363695 filed Dec. 15, 2004, and Japanese Patent Application No. 2005-047982 filed Feb. 23, 2005; each of which is incorporated herein by reference.

BACKGROUND OF THE INVENTION

1. Field of the Invention

The present invention relates to an improvement of a radio-frequency tag communication device and a radio-frequency tag communication system, which are capable of radio communication with radio-frequency tags for writing and reading information on and from the radio-frequency tags.

2. Description of the Related Art

There is known an RFID (Radio-Frequency Identification) communication system wherein a radio-frequency tag communication device (interrogator) reads out information, in a non-contact fashion, from small-sized radio-frequency tags (transponders) on which desired information is written. In this RFID communication system, the radio-frequency tag communication device is capable of reading out the information from the radio-frequency tags, even where the radio-frequency tags are contaminated or located at positions invisible from the radio-frequency tag communication device. For this reason, the RFID communication system is expected to be used in various fields, such as management and inspection of articles of commodity.

The radio-frequency tag communication device indicated above usually has a limited maximum distance of communication of about several meters, and the single radio-frequency tag communication device is not capable of adequate data communication with radio-frequency tags disposed in a comparatively ample space. In view of this fact, there have been proposed techniques for broadening the area of communication of the radio-frequency tag communication system. Patent Document 1 identified below discloses an example of such techniques, that is, an interrogator system which includes a plurality of radio-frequency tag communication devices, and a control terminal for controlling the plurality of radio-frequency tag communication devices. In this interrogator system, the areas of communication of antenna devices of the radio-frequency tags overlap each other so that radio communication can be effected by the same signal between the plurality of radio-frequency tag communication devices and the radio-frequency tags, whereby the area of communication of the radio-frequency tag communication system is broadened.

In one proposed form of the radio-frequency tag communication system, the radio-frequency tags located in a given area are detected by coordinated operations of the plurality of radio-frequency tag communication devices. Patent Document 2 identified below discloses an example of such form of the radio-frequency tag communication system, which includes a plurality of fixed terminals (stationary radio-frequency tag communication devices) disposed in a given space such as an indoor space, and portable terminals (portable radio-frequency tag communication devices) that are carried by users. This radio-frequency tag communication system is capable of adequate detection of a desired destination or adequate navigation in a relatively narrow area such as an indoor space.

Patent Document 1: JP-2003-283367 A

Patent Document 2: JP-2001-116583 A

A so-called "passive tag" not incorporating a power supply source is generally incapable of data communication when the passive tag receives a plurality of transmitted signals at one time. Where the plurality of radio-frequency tag communication devices are spaced apart from each other by a distance large enough to prevent the passive tag from concurrently receiving the signals transmitted from the radio-frequency tag communication devices, the passive tag may fail to receive from the radio-frequency communication devices an electric energy necessary for data communication with the communication devices, depending upon a specific location of the passive tag. In the area of overlapping of the areas of communication of the antenna devices of the plurality of radio-frequency tag communication devices, the passive tag cannot normally receive signals from the radio-frequency communication devices, giving rise to a risk of failure to effect adequate data communication with the communication devices. Therefore, the radio-frequency tag communication devices must be positioned relative to each other such that the areas of communication of the antenna devices overlap each other to a suitable extent, and the adjacent communication devices must be controlled to transmit the transmitted signals at different points of time. In this case, the time interval of transmission of the transmitted signal from each radio-frequency tag communication device must be sufficiently long, where the number of the neighboring or adjacent communication devices and the points of time of transmission of the transmitted signals from those neighboring communication devices are not known to each communication device. However, the sufficiently log time interval results in an increased time required for the data communication, and therefore it is difficult to optimize the time interval. Thus, there has been a need of developing a radio-frequency tag communication device and a radio-frequency tag communication system, which permit mist efficient coordinated operations of the radio-frequency tag communication devices, while preventing overlapping of communication.

The prior art described above suffers from a risk of mixing of the interrogating waves as received by the radio-frequency tag, when the interrogating waves are concurrently transmitted from the plurality of radio-frequency tag communication devices. Further, the radio-frequency tag communication device suffers from difficulty in receiving a reply wave transmitted from the radio-frequency tag in response to the interrogating wave transmitted from the communication device, which difficulty arises from the interrogating waves received from the neighboring or adjacent communication devices. To avoid these drawbacks, it is considered to control the operations of the plurality of radio-frequency tag communication devices to transmit the interrogating waves, in a time-sharing fashion. However, this control requires communication among the plurality of radio-frequency tag communication devices, for the coordinated operations of the communication devices, and undesirably considerably increases the time required for communication with the radio-frequency tags. Thus, there has been a need of developing a technique which enables the radio-frequency tag communication system to achieve efficient communication of the plurality of radio-

SUMMARY OF THE INVENTION

The present invention was made in view of the background art described above. It is an object of this invention to provide a radio-frequency tag communication device and a radio-frequency tag communication system, which permit highly efficient coordinated operations of the radio-frequency tag communication devices with a simple control, and without overlapping of communication.

The object described above can be achieved according to a first aspect of the present invention, which provides a radio-frequency tag communication system including a plurality of radio-frequency tag communication devices each configured to transmit a transmitted signal toward a radio-frequency tag, and to receive a reply signal transmitted from the radio-frequency tag in response to the transmitted signals, for thereby effecting radio communication with the radio-frequency tag, the radio-frequency tag communication system comprising a positional-relationship determining portion configured to determine relative positions of the plurality of radio-frequency tag communication devices, and a transmission control portion configured to control transmission of the transmitted signal from each of the plurality of radio-frequency tag communication devices, according to a result of determination of the relative positions by the positional-relationship determining portion.

The object described above can also be achieved according to a second aspect of the present invention, which provides a radio-frequency tag communication device configured to transmit a transmitted signal to a radio-frequency tag, and to receive a reply signal transmitted from the radio-frequency tag in response to the transmitted signal, for thereby effecting radio communication with the radio-frequency tag, the radio-frequency tag communication device comprising a group-information storage portion for storing group information indicative of a group to which the radio-frequency tag communication device belongs, and a transmission-timing control portion configured to control a timing of transmission of the transmitted signal, according to the group information stored in the group-information storage portion.

The object described above can be achieved according to a third aspect of this invention, which provides a radio-frequency tag communication device configured to effect radio communication with a desired radio-frequency tag in a non-contact fashion, the radio-frequency tag communication device comprising an information reading portion 183 configured to read information from the radio-frequency tag by receiving a reply wave which is transmitted from the radio-frequency tag in response to an interrogating wave transmitted from another radio-frequency tag communication device.

The object described above can also be achieved according to a fourth aspect of this invention, which provides a radio-frequency tag communication system configured to effect radio communication with a desired radio-frequency tag in a non-contact fashion, the radio-frequency tag communication system comprising a first radio-frequency tag communication device configured to transmit an interrogating wave toward the radio-frequency tag and to receive a reply wave transmitted from the radio-frequency tag in response to the interrogating wave, for thereby effecting radio communication with the radio-frequency tag, and a second radio-frequency tag communication device having information reading portion configured to receive the interrogating wave transmitted from the first radio-frequency tag communication device and to receive a reply wave transmitted from the radio-frequency tag in response to the interrogating wave, for thereby reading information from the radio-frequency tag.

The radio-frequency tag communication system according to the first aspect of this invention comprises the positional-relationship determining portion configured to determine relative positions of the plurality of radio-frequency tag communication devices, and the transmission control portion configured to control transmission of the transmitted signal from each of the plurality of radio-frequency tag communication devices, according to a result of determination of the relative positions by the positional-relationship determining portion, so that a sufficiently long time is provided for the mutually adjacent radio-frequency tag communication devices to transmit the transmitted signals. Namely, the first aspect of the present invention provides the radio-frequency tag communication system wherein the radio-frequency tag communication devices are operable in a coordinated fashion with high efficiency while preventing overlapping of communication among the mutually adjacent communication devices, even where the communication devices are disposed such that the areas of communication of the mutually adjacent communication devices partially overlap each other.

In a preferred form of the first aspect of the invention, the radio-frequency tag communication system further comprises a memory device for storing the relative positions of the plurality of radio-frequency tag communication devices, such that contents of the memory device are updated each time radio communication is effected between the radio-frequency communication devices and the radio-frequency tag. In this case, the relative positions of the plurality of radio-frequency tag communication devices can be practically recognized and controlled.

Preferably, the positional-relationship determining portion determines that the plurality of radio-frequency tag communication devices which are able to communicate with the same radio-frequency tag within a predetermined length of time are located adjacent to each other. In this case, the relative positions of the mutually adjacent radio-frequency tag communication devices can be practically recognized and controlled.

Preferably, the positional-relationship determining portion determines that the plurality of radio-frequency tag communication devices which are able to communicate with the same radio-frequency tag by a plurality of consecutive times within the predetermined length of time are located adjacent to each other. In this case, it is possible to prevent erroneous detection of the relative positions of the radio-frequency tag communication devices due to radio communication with the radio-frequency tag moving at a high speed. Accordingly, the relative positions of the mutually adjacent radio-frequency tag communication devices can be practically determined with high reliability.

Preferably, the transmission control portion controls the transmission of the transmitted signals from the plurality of radio-frequency tag communication devices, such that the radio-frequency tag communication devices that are located adjacent to each other transmit the transmitted signals at respective different points of time. In this case, it is possible to practically prevent overlapping of communication among the adjacent radio-frequency tag communication devices.

Preferably, the transmission control portion classifies the plurality of radio-frequency tag communication devices into a plurality of groups such that the radio-frequency tag communication devices which are determined by the positional-relationship determining portion to be located adjacent to each other belong to the respective different groups, the transmission control portion controlling the transmission of the transmitted signals such that the plurality of groups of the radio-frequency tag communication devices transmit the transmitted signals at respective different points of time. In this case, it is possible not only to prevent overlapping of communication among the adjacent radio-frequency tag communication devices, but also to permit concurrent transmission of the transmitted signals from the radio-frequency tag communication devices that are not located adjacent to each other. Accordingly, the time required for the radio communication can be practically reduced.

Preferably, the transmission control portion controls the transmission of the transmitted signals such that the radio-frequency tag communication devices belonging to the same group transmit the transmitted signals at respective different points of time which are selected at random. In this case, it is possible to prevent overlapping of communication among the radio-frequency tag communication devices, even if the radio-frequency tag communication devices are erroneously grouped.

Preferably, the plurality of radio-frequency tag communication devices are disposed such that three adjacent ones of the radio-frequency tag communication devices are located substantially at respective apexes of an equilateral triangle, as seen in a horizontal plane. In this case, the plurality of radio-frequency tag communication devices are disposed in a honeycomb pattern as seen in the horizontal plane, so that a desired area of communication can be covered by a reduced number of the radio-frequency tag communication devices, and the maximum number of the radio-frequency tag communication devices adjacent to each of the three adjacent radio-frequency tag communication devices can be limited to six.

Preferably, the plurality of radio-frequency tag communication devices are disposed such that a distance between two adjacent ones of the radio-frequency tag communication devices is not shorter than a maximum distance of communication of the radio-frequency communication devices and not longer than a distance two times the maximum distance of communication. In this case, there does not exist an area in which none of the radio-frequency tag communication devices can communicate with the radio-frequency tag, and the maximum number of the radio-frequency tag communication devices the areas of communication of which partially overlap each other can be limited to three.

Preferably, the plurality of radio-frequency tag communication devices are disposed such that a distance between two adjacent ones of the radio-frequency tag communication devices is selected within a range between 1.4 and 1.8 times a maximum distance of communication of the radio-frequency tag communication devices. In this case, the required number of the radio-frequency communication devices can be reduced to a value not larger than two times the ideal number of the communication devices required for optimum radio communication, so that the areas of communication of the communication devices overlap each other sufficiently for adjacency determination of the communication devices, and practical radio communication is possible even after deterioration of condition of radio communication due to deterioration of the properties of the radio-frequency tag.

The radio-frequency tag communication device according to the second aspect of this invention comprises the group-information storage portion for storing the group information indicative of the group to which the radio-frequency tag communication device belongs, and the transmission-timing control portion configured to control the timing of transmission of the transmitted signal, according to the group information stored in the group-information storage portion, so that a sufficiently long time is provided for the mutually adjacent radio-frequency tag communication devices to transmit the transmitted signals. Namely, the second aspect of the present invention provides the radio-frequency tag communication device which is operable with high efficiency in a coordinated fashion together with the other radio-frequency tag communication devices, while preventing overlapping of communication among the mutually adjacent communication devices.

In a preferred form of the second aspect of the invention, the group-information storage portion stores the group information obtained on the basis of positions of the radio-frequency tag communication device relative to other radio-frequency tag communication devices. In this case, the positions of the radio-frequency tag communication devices relative to the adjacent other radio-frequency tag communication devices are stored in the group-information storage portion, and the timing of transmission of the transmitted signal can be determined on the basis of the stored relative positions.

The radio-frequency tag communication device according to the third aspect of this invention comprises an information reading portion configured to read information from the radio-frequency tag by receiving a reply wave which is transmitted from the radio-frequency tag in response to an interrogating wave transmitted from another radio-frequency tag communication device. In this aspect of the invention, the plurality of radio-frequency tag communication devices can receive a reply from the radio-frequency tag in response to one command from one of the radio-frequency tag communication devices, so that concurrent radio communications of the radio-frequency tag communication devices do not cause a wave interference, and the time required for the radio communication can be reduced. Namely, the present aspect of the invention provides a radio-frequency tag communication device which permits rapid radio-communication with the radio-frequency tag with a simple control operation, in a radio-frequency tag communication system provided with a plurality of radio-frequency tag communication devices including the radio-frequency tag communication device in question.

In a preferred form of the radio-frequency tag communication device according to the third aspect of this invention, the interrogating wave consists of a command portion for determining an operation of the radio-frequency tag, and a carrier wave for carrying a reply signal from the radio-frequency tag, In this form of the invention, the radio-frequency tag communication device further comprises a command-transmission-completion detecting portion configured to determine whether transmission of the command portion of the interrogating wave is completed, and a transmitter portion configured to transmit a predetermined carrier wave to the radio-frequency tag after the command-transmission-completion detecting portion has determined that the transmission of the command portion is completed. Accordingly, the reply wave can be subjected to homodyne wave detection, and can therefore be received with high sensitivity.

Preferably, the carrier wave transmitted from the transmitter portion has a frequency different from that of the interrogating wave transmitted from the above-indicated another radio-frequency tag communication device. In this case, it is possible to effectively prevent an influence on the radio communication between the above-indicated another radio-frequency communication device and the radio-frequency tag.

Preferably, a difference between the frequency of the carrier wave transmitted from the transmitter portion and the frequency of the interrogating wave transmitted from the above-indicated another radio-frequency tag communication device is not smaller than the frequency of a sub-carrier wave of the radio-frequency tag. In this case, the reply signal transmitted from the radio-frequency tag in response to the carrier wave transmitted from the above-indicated another radio-frequency tag communication device and the reply signal transmitted from the radio-frequency tag in response to the signal transmitted from the transmitter portion do not interfere with each other, so that it is possible to effectively prevent an influence on the radio communication between the above-indicated another radio-frequency tag communication device and the radio-frequency tag.

Preferably, the transmitter portion is configured to diffuse the frequency of the carrier wave. In this case, it is possible to reduce the possibility of interference between the reply signals transmitted in response to the carrier waves transmitted from the plurality of radio-frequency tag communication devices, and to more stably prevent the influence on the radio-communication between the above-indicated another radio-frequency communication device and the radio-frequency tag.

The radio-frequency tag communication system according to the fourth aspect of this invention comprises the first radio-frequency tag communication device configured to transmit an interrogating wave toward the radio-frequency tag and to receive a reply wave transmitted from the radio-frequency tag in response to the interrogating wave, for thereby effecting radio-communication with the radio-frequency tag, and the second radio-frequency tag communication device having information reading portion configured to receive the interrogating wave transmitted from the first radio-frequency tag communication device and to receive a reply wave transmitted from the radio-frequency tag in response to the interrogating wave, for thereby reading information from the radio-frequency tag. In this aspect of the invention, the plurality of radio-frequency tag communication devices can receive a reply from the radio-frequency tag in response to one command from one of the radio-frequency tag communication devices, so that concurrent radio communications of the radio-frequency tag communication devices do not cause a wave interference, and the time required for the radio communication can be reduced. Namely, the present embodiment provides the radio-frequency communication system which is provided with the plurality of radio-frequency communication devices and which permits rapid radio-communication with the radio-frequency tag with a simple control operation, In a preferred form of the fourth aspect of the invention, the first radio-frequency tag communication device is a stationary radio-frequency tag communication device installed at a fixed position. In this case, the stationary radio-frequency tag communication device which transmits the interrogating wave can have a relatively large electric energy supply capacity, so that the area of communication of the stationary radio-frequency tag communication device can be increased.

Preferably, the first radio-frequency tag communication device is provided with an antenna device having a wide angular range of directivity and configured to transmit the interrogating wave toward the radio-frequency tag and to receive the reply wave transmitted from the radio-frequency tag in response to the interrogating wave. In this case, the first radio-frequency tag communication device has a wide area of communication.

Preferably, the second ratio-frequency tag communication device is a portable radio-frequency tag communication device which is movable. The portable radio-frequency tag communication device permits accurate detection of the position of the radio-frequency tag.

Preferably, the second radio-frequency tag communication device is provided with a unidirectional antenna device configured to receive the interrogating wave transmitted from the first radio-frequency tag communication device and to receive the reply wave transmitted from the radio-frequency tag in response to the interrogating wave. In this case, the position of the radio-frequency tag can be accurately detected.

Preferably, the second radio-frequency tag communication device is provided with a first antenna device in the form of an omni directional antenna device configured to receive the interrogating wave transmitted from the first radio-frequency tag communication device, and a second antenna device in the form of a unidirectional antenna device configured to transmit a carrier wave toward the radio-frequency tag upon reception of the reply wave from the radio-frequency tag and to receive the reply wave transmitted from the radio-frequency tag in response to the interrogating wave. In this case, the second radio-frequency tag communication device can receive, with high sensitivity, the interrogating wave transmitted from the first radio-frequency tag communication device, irrespective of the direction in which the first radio-frequency tag communication device is located with respect to the second radio-frequency tag communication device, so that the position of the radio-frequency tag can be detected with high accuracy.

Preferably, the second radio-frequency tag communication device is provided with a broad-band receiver circuit configured to receive the interrogating wave transmitted from the first radio-frequency tag communication device, without dependence on a frequency of the interrogating wave.

BRIEF DESCRIPTION OF THE DRAWING

The above and other objects, advantages, technical features and industrial significance of this invention will be better understood by reading the following detailed description of preferred embodiments of this invention, when considered in connection with the accompanying drawings, in which:

FIG. 4 is a view for explaining control functions of a control device provided in the radio-frequency tag communication system of FIG. 1, and a plurality of radio-frequency tag communication devices connected to the control device;

FIG. 5 is a view illustrating a positional relationship between the plurality of radio-frequency tag communication devices, which is stored in a memory device provided in the control device of FIG. 4;

FIG. 16 is a view showing an initial state of different states of grouping of the plurality of radio-frequency tag communication devices shown in FIG. 1, which grouping is effected for highly efficient coordinated operations of the communication devices without overlapping of communication;

FIG. 17 is a view showing a specific example of grouping of the plurality of radio-frequency tag communication devices of FIG. 1 for highly efficient coordinated operations of the communication devices without overlapping of communication;

FIG. 18 is a view showing another specific example of grouping of the radio-frequency tag communication devices of FIG. 1 for highly efficient coordinated operations of the communication devices without overlapping of communication, after determination of adjacency relationship of the devices;

FIG. 19 is a view showing a further specific example of grouping of the radio-frequency tag communication devices of FIG. 1 for highly efficient coordinated operations of the communication devices without overlapping of communication, after the determination of the adjacency relationship of the devices;

FIG. 20 is a view showing a still further specific example of grouping of the radio-frequency tag communication devices of FIG. 1 for highly efficient coordinated operations of the communication devices without overlapping of communication, after the determination of the adjacency relationship of the devices;

FIG. 21 is a view showing a yet further specific example of grouping of the radio-frequency tag communication devices of FIG. 1 for highly efficient coordinated operations of the communication devices without overlapping of communication, after the determination of the adjacency relationship of the devices;

FIG. 22 is a view showing still another specific example of grouping of the radio-frequency tag communication devices of FIG. 1 for highly efficient coordinated operations of the communication devices without overlapping of communication, after the determination of the adjacency relationship of the devices;

NOMENCLATURE OF REFERENCE SIGNS

Figure 1:
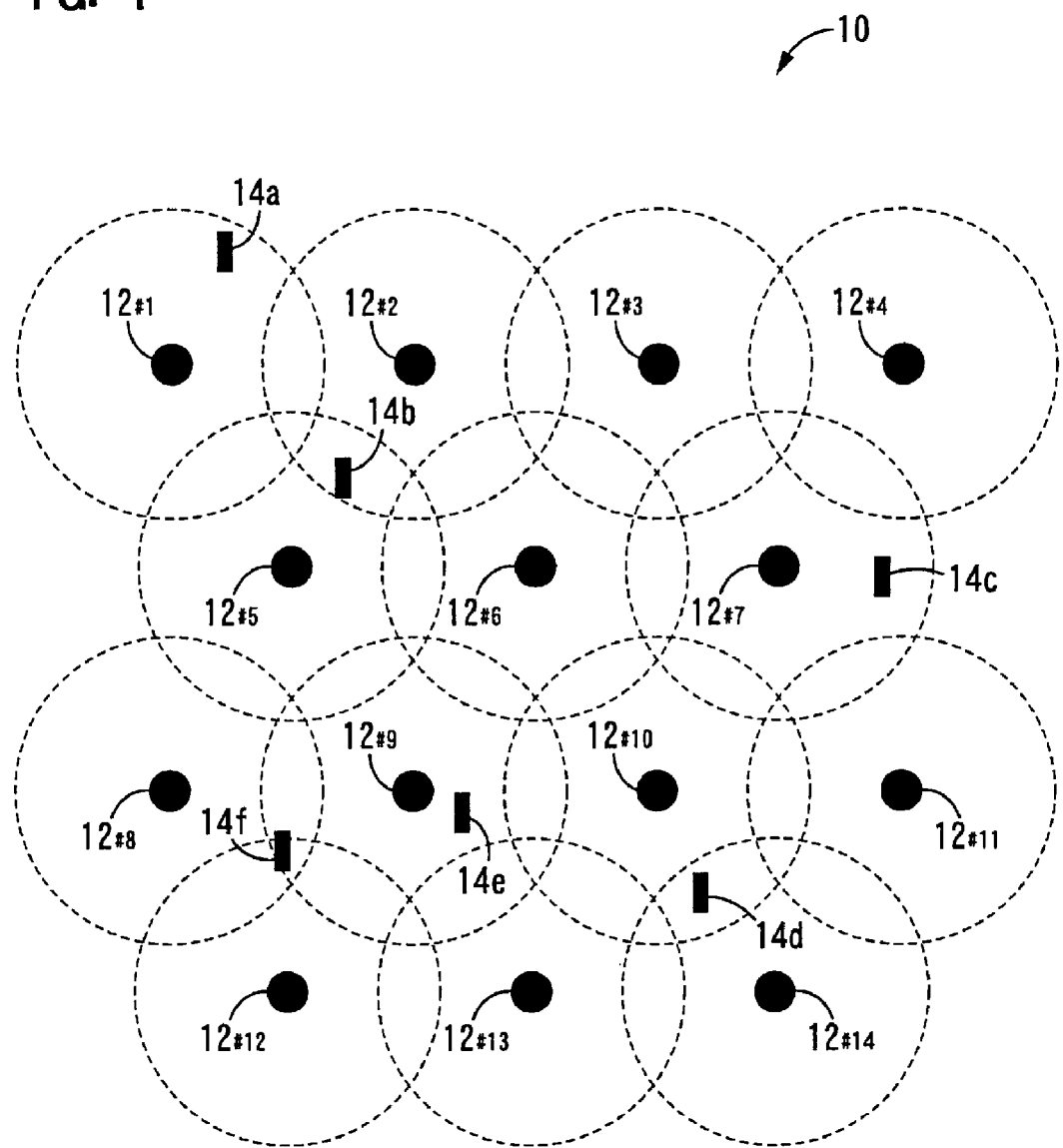
FIG. 1 is a view for explaining one embodiment of a radio-frequency tag communication system according to first and second aspects of the present invention.

10: Radio-frequency tag communication system, 12: Radio-frequency tag communication device, 14: Radio-frequency tag, 16: Reference-frequency generating portion, 17: PLL, 18: VCO, 19: Main-carrier modulating portion, 20: Transmitted-signal amplifying portion, 21: Transmission/reception switching portion, 22: Antenna device, 23: I-phase-signal converting portion, 24: Q-phase-signal converting portion, 25: I-phase-signal BPF, 26: I-phase-signal amplifying portion, 27: Q-phase-signal BPF, 28: Q-phase-signal amplifying portion, 29: RSSI circuit, 30: DSP, 40: Transmitted-data generating portion, 42: Transmission control portion (Transmission-timing control portion), 44: Reception control portion, 48: Received-signal demodulating portion, 50: Radio-frequency-tag-position detecting portion, 52: Memory portion (Group-information storage portion), 54: Communication interface, 55: Radio-frequency tag circuit element, 56: Antenna portion, 58: IC-circuit portion, 60: Rectifying portion, 62: Power source portion, 64: Clock extracting portion, 66: Memory portion, 68: Modulating/demodulating portion, 70: Control portion, 72: Control device, 74: Positional-relation determining portion, 76: Transmission control portion, 78: Memory device, 80: Communication interface, 110: Radio-frequency tag communication system, 112: Stationary radio-frequency tag communication device (First radio-frequency tag communication device), 114, 250: Portable radio-frequency tag communication device (Second radio-frequency tag communication device), 118: Reference-frequency generating portion, 120: PLL, 122: VCO, 124: Main-carrier modulating portion, 126: Transmitted-signal amplifying portion, 128: Antenna device, 130: I-phase-signal converting portion, 132: Q-phase-signal converting portion, 134: Transmission/reception switching portion, 136: I-phase-signal BPF, 138: I-phase-signal amplifying portion, 140: Q-phase-signal BPF, 142: Q-phase-signal amplifying portion, 144: RSSI circuit, 146: Control portion, 148: LAN interface, 150: LAN cable, 152: Controller, 154: Main unit, 156: Antenna unit, 158: Frame, 160: Display portion, 162: Operator's control portion, 164: Voice generating device, 172: Unit base, 174: Antenna device, 176: Transmitter circuit (Transmitter portion), 178: First receiver circuit, 180: Second receiver circuit, 182: Control portion, 183: Information reading portion, 184: Command-transmission-completion detecting portion, 185: Radio-frequency LAN communication portion, 186: Image processing portion, 188: Reference-frequency generating portion, 190: PLL, 192: VCO, 196: Transmitted-signal amplifying portion, 198: I-phase-signal converting portion, 200: Q-phase-signal converting portion, 202: Transmission/reception switching portion, 204: I-phase-signal BPF, 206: I-phase-signal amplifying portion, 208: Q-phase-signal BPF, 210: Q-phase-signal amplifying portion, 212: RSSI circuit, 214: First arithmetic amplifier, 216: Second arithmetic amplifier, 218: Antenna portion, 234: Chamber, 236: Radio-frequency LAN converter, 238: CPU, 240: RAM, 242: ROM, 244: LAN interface, 246: Transmission control portion, 248: Judging portion, 252: Unidirectional antenna device, 254: Omnidirectional antenna device, C1, C2: Capacitors, D: Rectifier, L1, L2: Coils, R1, R2, R3: Resistors

DETAILED DESCRIPTION OF THE PREFERRED EMBODIMENTS

Referring to the drawings, preferred embodiments of this invention will be described in detail.

Embodiment 1

Referring first to FIG. 1, there is shown one embodiment of a radio-frequency tag communication system 10 according to a first aspect of the present invention. As shown in FIG. 1, the radio-frequency tag communication system 10 of this embodiment is a so-called "RFID (Radio-Frequency Identification) system consisting of a plurality of radio-frequency tag communication devices $12_{\#1}, 12_{\#2}, 12_{\#4} \ldots, 12_{\#14}$ (fourteen radio-frequency tag communication devices in this embodiment, and hereinafter collectively referred to as "radio-frequency tag communication devices 12", unless otherwise specified) each constructed according to a second aspect of this invention, and at least one radio-frequency tag 14a, 14b, 14c, . . . 1, 14f (six radio-frequency tags in this embodiment, and hereinafter collectively referred to as "radio-frequency tags 14", unless otherwise specified) each of which is a communication object for radio communication with the radio-frequency tag communication devices 12. The radio-frequency tag communication devices 12 function as interrogators, while the radio-frequency tags 14 function as transponders. Described in detail, each radio-frequency tag communication device 12 is arranged to transmit an interrogating wave $F_c$ (transmitted signal) toward the radio-frequency tags 14, and each radio-frequency tag 14 which has received the interrogating wave $F_c$ modulates the received interrogating wave $F_c$ according to a predetermined information signal (data) to generate a reply wave $F_r$ (reply signal) to be transmitted toward the radio-frequency tag communication device 12, whereby radio communication is effected between each radio-frequency tag communication device 12 and the radio-frequency tags 14. The plurality of radio-frequency tag communication devices 12 are preferably disposed such that three adjacent ones of the radio-frequency tag communication devices 12 are positioned at respective three apexes of an equilateral triangle, as seen in the horizontal plane. Namely, a circle indicated by a thin broken line in FIG. 1 represents an area of communication of each radio-frequency tag communication device 12 located at the center of the circle. The radio-frequency tag communication devices 12 are arranged such that their areas of communication partially overlap each other at their peripheral portions, so as to avoid a gap existing between the adjacent areas of communication. As described below, the radio-frequency tag communication system 10 includes a control device 72 configured to control the plurality of radio-frequency tag communication devices 12.

Figure 2:
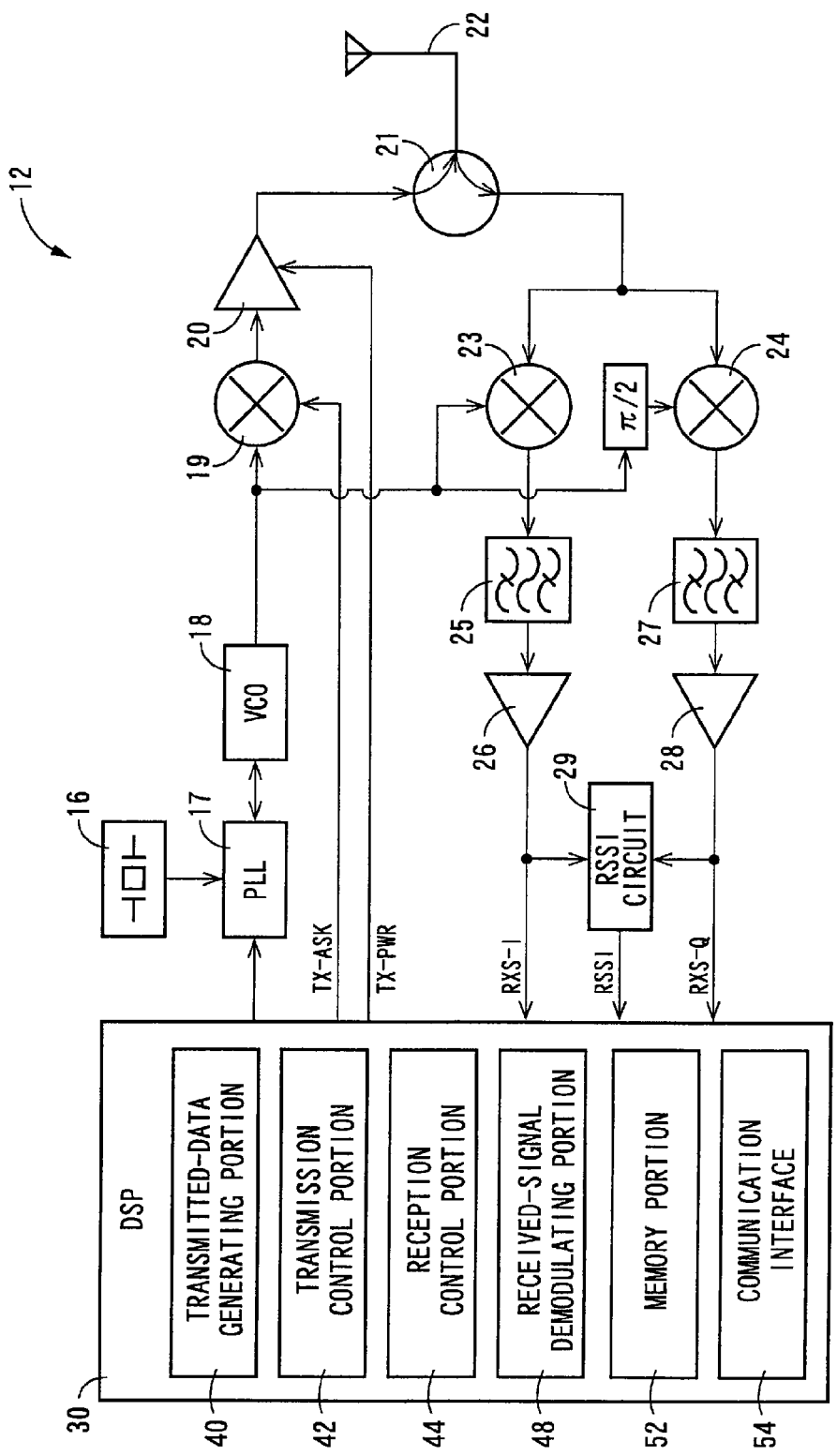
FIG. 2 is a view for explaining an electrical arrangement of a radio-frequency tag communication device provided in the radio-frequency tag communication system of FIG. 1.

Referring next to FIG. 2, there is shown an arrangement of each radio-frequency tag communication device 12. As shown in FIG. 2, the radio-frequency tag communication device 12 includes: a reference-frequency generating portion 16 configured to generate a reference frequency of a carrier wave $f_p$; a PLL (Phase Locked Loop) 17 configured to set a frequency of a main carrier wave on the basis of a reference wave generated by the reference-frequency generating portion 16 and a control signal received from a control portion 182; a VCO (Voltage Controlled Oscillator) 18 configured to output the frequency of the main carrier wave according to a control voltage received from the PLL 17; a main-carrier modulating portion 19 configured to generate the transmitted signal by amplitude modulation of the main carrier wave having the frequency outputted from the VCO 18, on the basis of a predetermined control signal TX-ASK; a transmitted-signal amplifying portion 20 configured to amplify the transmitted signal generated from the main-carrier modulating portion 19, on the basis of a predetermined control signal TX-PWR; an antenna device 22 which is a transmitter/receiver antenna device having a wide angular range of directivity and configured to transmit the transmitted signal received from the transmitted-signal amplifying portion 20, as the interrogating wave $F_c$ including a desired command, toward the communication object in the form of the radio-frequency tags 14, and to receive the reply wave $F_r$ transmitted from the radio-frequency tag 14 in response to the interrogating wave $F_c$; an I-phase-signal converting portion 23 and a Q-phase-signal converting portion 24 which are configured to convert the received signal received by the antenna device 22, into respective I-phase and Q-phase signals that are perpendicular to each other; a transmission/reception switching portion 21 configured to apply the transmitted signal received from the transmitted-signal amplifying portion 20, to the antenna device 22, and to apply the received signal received from the antenna device 22, to the I-phase-signal and Q-phase-signal converting portions 23, 24; an I-phase-signal BPF (Band Pass Filter) 25 configured to extract only a predetermined frequency band of the I-phase signal received from the I-phase-signal converting portion 23; an I-phase-signal amplifying portion 26 configured to amplify the I-phase signal received from the I-phase-signal BPF 25; a Q-phase-signal BPF 27 configured to extract only a predetermined frequency band of the Q-phase signal received from the Q-phase-signal converting portion 24; a Q-phase-signal amplifying portion 28 configured to amplify the Q-phase signal received from the Q-phase-signal BPF 27; an RSSI circuit (Received-Signal Strength Indicator) 29 configured to detect strengths of the I-phase signal and Q-phase signal respectively received from the I-phase-signal and Q-phase-signal amplifying portions 26, 28; and a DSP (Digital Signal Processor) 30 configured to control the operations of the above-described stationary radio-frequency tag communication device 12. The transmission/reception switching portion 21 is preferably a circulator or a directional coupler.

The DSP 30 described above is a so-called microcomputer incorporating a CUP, a ROM and a RAM and configured to be operable to perform signal processing operations according to programs stored in the ROM, while utilizing a temporary data storage function of the RAM. The DSP 16 controls: generation of transmitted data; transmission of the transmitted signal toward the radio-frequency tags 14; reception of the received signals transmitted from the radio-frequency tags 14 in response to the transmitted signal; demodulation of the received signals; and data communication with the control device 72, etc. To perform these control operations, the DSP 16 includes functional components such as a transmitted-data generating portion 40, a transmission control portion 42, a reception control portion 44, a received-signal demodulating portion 48, a memory portion 52, and a communication interface 54.

The transmitted-data generating portion 40 is configured to generate the transmitted data as a desired information signal used for modulating the transmitted signal, and to apply the generated transmitted data to the transmitted-signal modulating portion 18. The transmission control signal 42 is configured to control the transmission of the transmitted signal toward the radio-frequency tags 14, according to a command received from the control device 72. The transmission control portion 42 is further configured to control the timing of transmission of the transmitted signal according to group information stored in the memory portion 52, or according to an identification number of the radio-frequency tag communication device 12 (device ID) specified by the control device 72. In the present embodiment, the transmission control portion 42 corresponds to a transmission-timing control portion configured to control the timing of transmission of the transmitted signal. The reception control portion 44 is configured to determine one of the I-phase signal and the Q-phase signal which is selected as the received signal to be demodulated, on the basis of an output of the RSSI circuit 29. Thus, one of the I-phase and Q-phase signals which has a higher strength is selectively used as the received signal having a high degree of stability of reception irrespective of the phase of the reply wave transmitted from the radio-frequency tag. The received-signal demodulating portion 48 is configured to demodulate one of the I-phase and Q-phase signals which is selected as the received signal by the reception control portion 44. The received-signal demodulating portion 48 is preferably arranged to FM-modulate the received signal, for reading an information signal included in the reply signal received from the radio-frequency tag 14.

The memory portion 52 is a memory device such as a flash ROM or a hard disc, which is provided to store information relating to the radio communication of the radio-frequency tag communication device 12 with the radio-frequency tags 14. The memory portion 52 functions as a group-information storage portion for storing the group information indicative of a group of the radio-frequency tag communication devices 12 to which the radio-frequency tag communication device 12 in question belongs. Preferably, the group information is obtained on the basis of the positions of the radio-frequency tag communication device 12 in question relative to the other radio-frequency tag communication devices 12, as described below.

Figure 3:
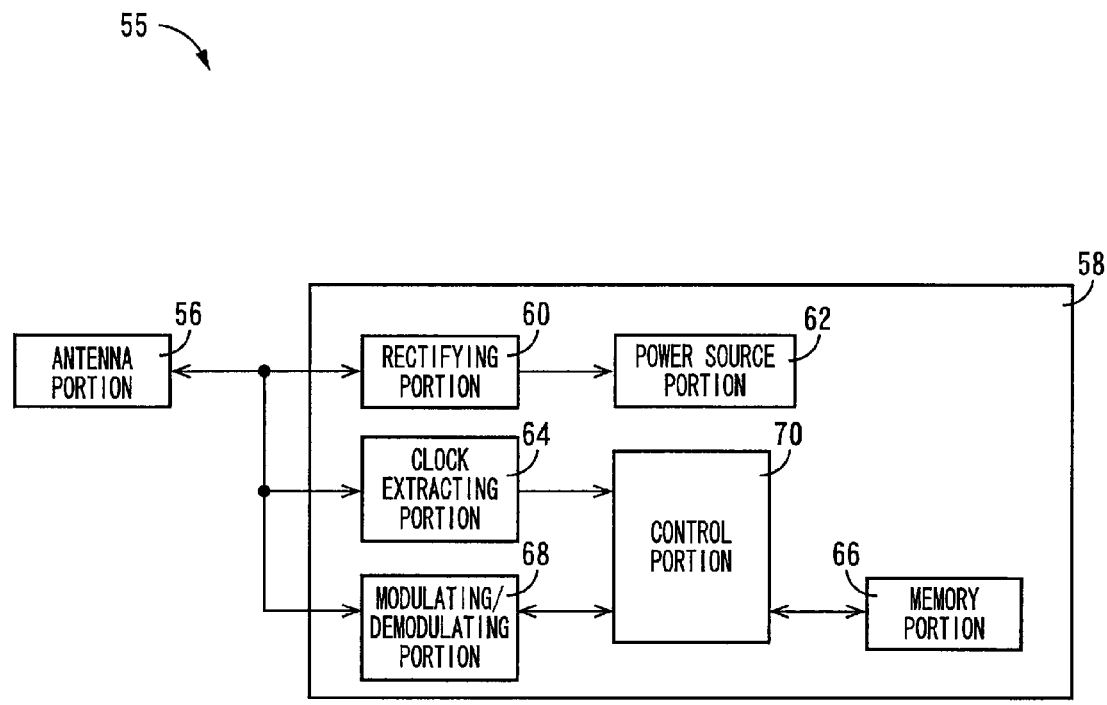
FIG. 3 is a view for explaining an electrical arrangement of a radio-frequency tag provided in the radio-frequency tag communication system of FIG. 1.

FIG. 3 shows an arrangement of a circuit element 55 provided in each radio-frequency tag 14. As shown in FIG. 3, the circuit element 55 of the radio-frequency tag 14 includes an antenna portion 56 for signal transmission and reception to and from the radio-frequency tag communication devices 12, and an IC-circuit portion 58 for processing signals received by the antenna portion 56. The IC-circuit portion 58 includes as functional portions thereof: a rectifying portion 60 configured to rectify the interrogating wave (transmitted signal) received by the antenna portion 56 from the radio-frequency tag 12; a power source portion 62 for storing an energy of the interrogating wave rectified by the rectifying portion 60; a clock extracting portion for extracting a clock signal from the carrier wave received by the antenna portion 56, and applying the extracted clock signal to a control portion 70; a memory portion 66 functioning as an information memory portion capable of storing desired information signals; a modulating/demodulating portion 68 connected to the antenna portion 56 and configured to perform signal modulation and demodulation; and the above-indicated control portion 70 configured to control the operation of the circuit element 55 via the above-described rectifying portion 60, clock extracting portion 64 and modulating/demodulating portion 68. The control portion 70 perform basic controls such as a control operation to store the desired information in the memory portion 66, as a result of the radio communication with the radio-frequency tag communication devices 12, and a control operation to control the modulating/demodulating portion 68 for generating the reply wave by modulating the interrogating wave received by the antenna portion 56, on the basis of the information signal stored in the memory portion 66, and to transmit the generated reply wave as a reflected signal from the antenna portion 56.

FIG. 4 shows control functions of the above-described control device 72 and the plurality of radio-frequency tag communication devices 12 connected to the control device 72. The control device 72 is a so-called microcomputer incorporating a CUP, a ROM and a RAM and configured to be operable to perform signal processing operations according to programs stored in the ROM, while utilizing a temporary data storage function of the RAM. The control device 72 controls the plurality of radio-frequency tag communication devices 12 to perform coordinated operations to detect and control the radio-frequency tags 14 in the radio-frequency tag communication system 14. For controlling the coordinated operations, the control device 72 includes, as functional portions thereof, a positional-relationship determining portion 74, a transmission control portion 76 and a communication interface 80, and is provided with a memory device 78 such as a hard disc.

The positional-relationship determining portion 74 is configured to determine a relative position of the plurality of radio-frequency tag communication devices 12. For example, the positional-relationship determining portion 74 determines the relative position, by commanding each of the plurality of radio-frequency tag communication devices 12 to detect the radio-frequency tag or tags 14 located within its area of communication, and by referring to results of detection of the radio-frequency tags 14 received from the radio-frequency tag communication devices 12. The areas of communication of the plurality of radio-frequency tag communication devices 12 partially overlap each other, as indicated in FIG. 1 by the thin broken lines. The positional-relationship determining portion 74 determines that the plurality of radio-frequency tag communication devices 12 the areas of communication of which partially overlap each other are located adjacent to each other. Preferably, the positional-relationship determining portion 74 is configured to determine that the plurality of radio-frequency tag communication devices 12 which can communicate with the same radio-frequency tag 14 within a predetermined length of time are located adjacent to each other. More preferably, the positional-relationship determining portion 74 is configured to determine that the plurality of radio-frequency tag communication devices 12 which are able to communicate with the same radio-frequency tag 14 within a predetermined length of time by a plurality of consecutive times are located adjacent to each other.

The transmission control portion 76 is configured to control the transmission of the transmission signal from each radio-frequency tag communication device, according to a result of the determination by the positional-relationship determining portion 74. In the present embodiment, the transmission control portion corresponds to a transmission control portion configured to control the timing of transmission of the transmitted signal from each radio-frequency tag communication device 12. Preferably, the transmission control portion 76 controls the adjacent radio-frequency tag communication devices 12 to transit the transmitted signals at respective different points of time. Preferably, the transmission control portion 76 classifies the plurality of radio-frequency tag communication devices 12 into a plurality of groups such that the radio-frequency tag communication devices 12 which are located adjacent to each other according to the determination by the positional-relationship determining portion 74 belong to respective different groups, so that the thus classified groups of radio-frequency tag communication devices transmit the transmitted signals at respective different points of time, which are selected at random, by using random numbers.

The memory device 78 stores the relative positions of the plurality of radio-frequency tag communication devices 12. Preferably, the memory device 78 stores a result of the determination by the positional-relationship determining portion 74. Preferably, the memory device 78 stores the groups of radio-frequency tag communication devices 12 classified by the transmission control portion 76, that is, a relationship between each group and the plurality of radio-frequency tag communication devices 12 belonging to that group. FIG. 5 is a view illustrating the relative positions of the plurality of radio-frequency tag communication devices which are stored in the memory device 78. Namely, FIG. 5 indicates one radio-frequency tag 12 which can communicates with a given radio-frequency tag 14, or a group of a plurality of radio-frequency tag communication devices 12 which can communicate with the same radio-frequency tag 14. For instance, the radio-frequency tag communication devices $12_{\#2}$ and $12_{\#5}$ can communicate with the radio-frequency tag 14b (Tag_B) and can be considered to be the mutually adjacent communication devices, while the radio-frequency tag communication devices $12_{\#8}$, $12_{\#9}$ and $12_{\#5}$ can communicate with the radio-frequency tag 14f (Tag_F) and can be considered to be the mutually adjacent communication devices. The contents of the memory device 78 are preferably updated each time the radio communication is effected between any one of the radio-frequency tag communication devices 12 and the radio-frequency tags 14.

The communication interface 80 is configured to effect the radio communication of the control device 72 with the radio-frequency tag communication devices 12 through a LAN, for example. For instance, the communication interface 80 commands each radio-frequency tag communication device 14 to communicate with the radio-frequency tags 14, and receives a result of the communication of the radio-frequency tag communication device 12 with the radio-frequency tags 14, that is, the radio-frequency tag 14 with which the radio-frequency tag communication device 12 can communicate.

Referring to the flow chat of FIG. 6, there will be described a radio-frequency tag detecting control (RFID communication control) performed by the control device 72 by using the plurality of radio-frequency tag communication devices 12, to detect the radio-frequency tags 14. This radio-frequency tag detecting control routine is repeated executed with a predetermined cycle time.

The radio-frequency tag detecting control routine is initiated with step SA (hereinafter "step" being omitted) in which the radio-frequency tags 14 are detected (searched) by the radio-frequency tag communication devices 12 belonging to each group. Then, the control flow goes to SB in which the radio-frequency tags 14 are detected by the radio-frequency tag communication devices 12 not belonging to any group. The control flow then goes to SC to list ID numbers of the radio-frequency tags 14, and ID numbers of the radio-frequency tag communication devices 12 which detected the radio-frequency tags 14. The control flow then goes to SD to update the relative positions of the plurality of radio-frequency tag communication devices 12 and the group information, which are stored in the memory device 78. Thus, one cycle of execution of the present control routine is terminated.

Figure 6:
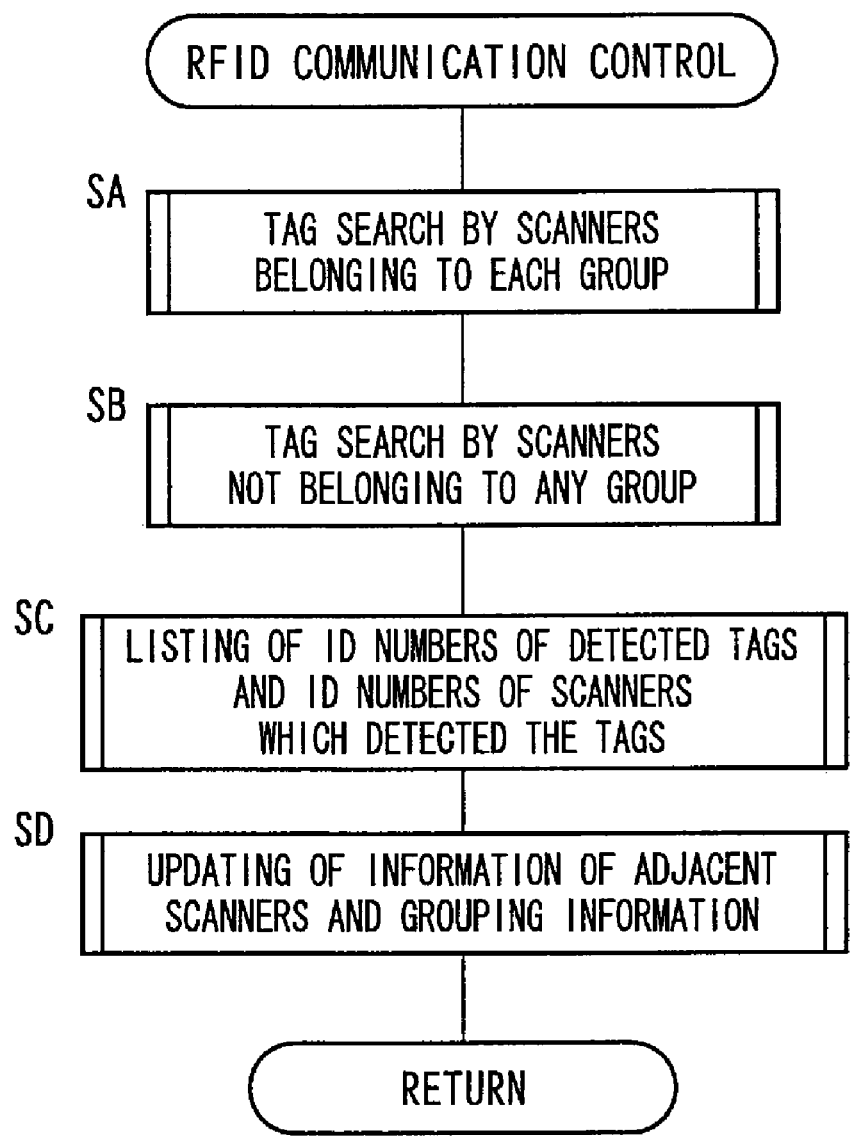
FIG. 6 is a flow chart illustrating a radio-frequency tag detecting control performed by the control device by using the plurality of radio-frequency tag communication devices.
Figure 7:
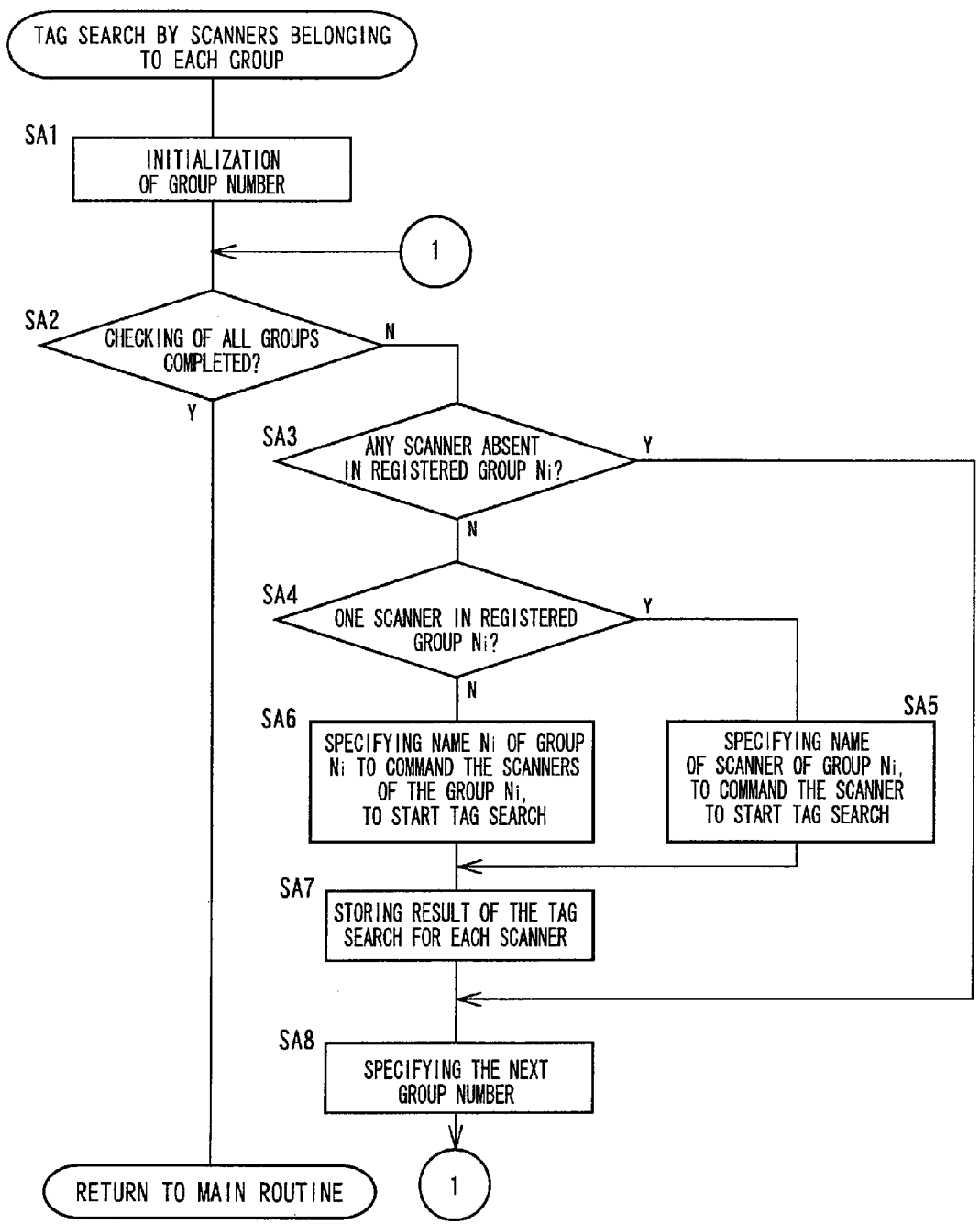
FIG. 7 is a flow chart illustrating in detail a sub-routine corresponding to a portion of the radio-frequency tag detecting control of FIG. 6 performed by using each group of radio-frequency tag communication devices.

FIG. 7 illustrates in detail a sub-routine corresponding to SA of the radio-frequency tag detecting control of FIG. 6 performed by using each group of radio-frequency tag communication devices 12. This sub-routine is initiated with SA1 to initialize the group number. Then, the control flow goes to SA2 to determine whether checking of all groups of radio-frequency tag communication devices 12 is completed. If an affirmative determination is obtained in SA2, the control flow returns to the main routine. If a negative determination is obtained in SA2, the control flow goes to SA3 to determine whether any radio-frequency tag communication device 12 is absent in the registered group $N_i$. If an affirmative determination is obtained in SA3, the control flow goes to SA8 to specify the number of the next group, and goes back to SB2 and the subsequent steps. If a negative determination is obtained in SA3, the control flow goes to SA4 to determine whether only one radio-frequency tag 12 is present in the registered group $N_i$. If an affirmative determination is obtained in SA4, the control flow goes to SA5 to specify the ID number (name) of the radio-frequency tag communication device 12 of the group $N_i$, for thereby commanding that radio-frequency tag communication device 12 to start the search for the radio-frequency tags 14. Then, the control flow goes to SA7 in which the radio-frequency tag 14 detected by the radio-frequency tag communication device 12 in SA5 is stored in relation to the radio-frequency tag communication device 12, and then goes to SA8 and the subsequent steps. If a negative determination is obtained in SA4, the control flow goes to SA6 to specify the ID numbers (names) of the radio-frequency tag communication devices 12 of the group $N_i$, for thereby commanding those radio-frequency tag communication devices 12 to start the search for the radio-frequency tags 14. Then, the control flow goes to SA7 in which the radio-frequency tags 14 detected by the radio-frequency tag communication devices 12 in SA6 are stored in relation to the radio-frequency tag communication devices 12, and then goes to SA8 and the subsequent steps.

Figure 8:
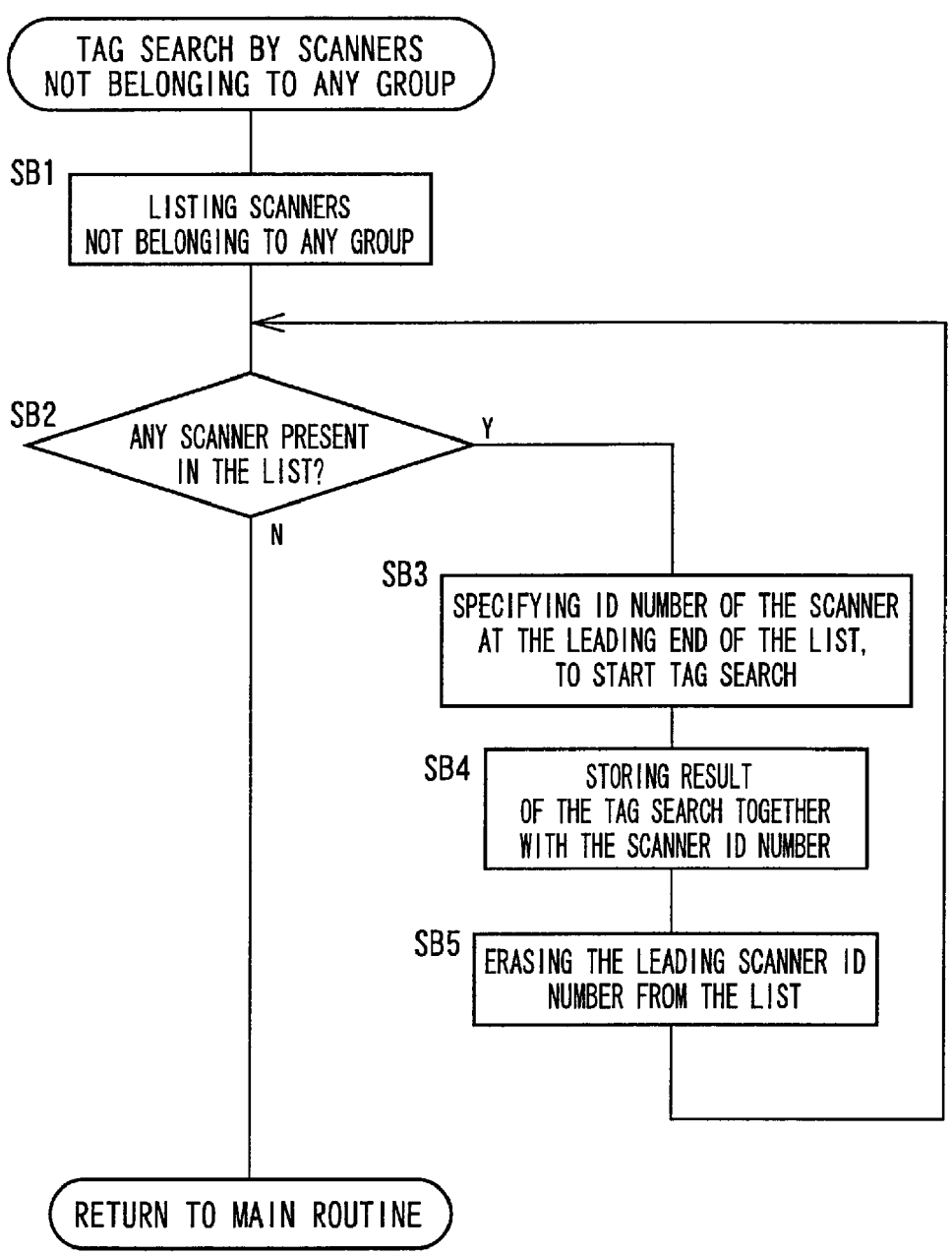
FIG. 8 is a flow chart illustrating in detail a sub-routine corresponding to another portion of the radio-frequency tag detecting control of FIG. 6 performed by using the radio-frequency tag communication devices not belonging to any group.
Figure 9:
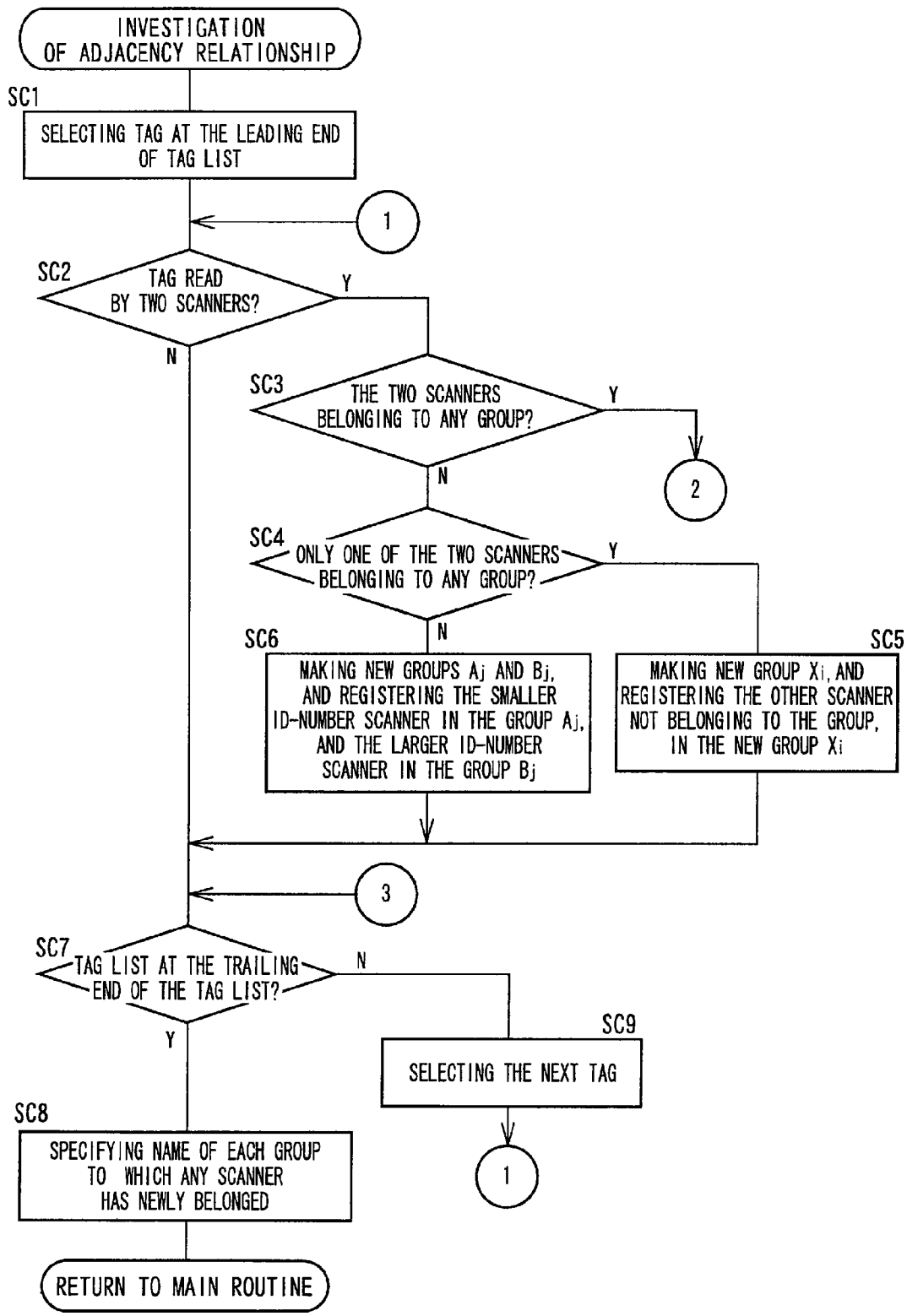
FIG. 9 is a flow chart illustrating in detail a part of a sub-routine corresponding to a further portion of the radio-frequency tag detecting control of FIG. 6 to list ID numbers of detected radio-frequency tags in relation to ID numbers of the radio-frequency tag communication devices which detected the radio-frequency tags.

FIG. 8 illustrates in detail a sub-routine corresponding to SB of the radio-frequency tag detecting control of FIG. 6 performed by using the radio-frequency tag communication devices not belonging to any group. This sub-routine is initiated with SB1 to list the radio-frequency tags 14 not belonging to any group. Then, the control flow goes to SB2 to determine whether any radio-frequency tag communication device 12 is present in the list prepared in SB1. If a negative determination is obtained in SB2, the control flow returns to the main routine. If an affirmative determination is obtained in SB2, the control flow goes to SB3 to specify the ID number of the radio-frequency tag communication device 12 at the leading end of the list, for thereby commanding that radio-frequency tag communication device 12 to start the search for the radio-frequency tags 14. Then, the control flow goes to SB4 in which the radio-frequency tag 14 detected by the radio-frequency tag 12 in SB3 is stored in relation to the radio-frequency tag communication device 12. The control flow then goes to SB6 to erase the ID number of the scanner at the leading end of the list, from the list, and goes back to SB2 and the subsequent steps.

FIGS. 9 and 10 and FIGS. 11-13 illustrate in detail a sub-routine corresponding to SC of the radio-frequency tag detecting control of FIG. 6 to list ID numbers of the detected radio-frequency tags 14 in relation to ID numbers of the radio-frequency tag communication devices 12 which detected the radio-frequency tags 14. This sub-routine is initiated with SC1 of FIG. 9 select the radio-frequency tag 14 at the leading end of a tag list. Then, the control flow goes to SC2 to determine whether the radio-frequency tag 14 selected in SC1 is detected (read) by the two radio-frequency tag communication devices 12. If a negative determination is obtained in SC2, the control flow goes to SC7 and the subsequent steps. If an affirmative determination is obtained in SC2, the control flow goes to SC3 to determine whether the two radio-frequency tags 14 which detected the radio-frequency tag 14 selected in SC1 belong to any group. If an affirmative determination is obtained in SC3, the control flow goes to SC10 and the subsequent steps of FIG. 10. If a negative determination is obtained in SC3, the control flow goes to SC4 to determine whether only one of the two radio-frequency tag communication devices 12 which detected the radio-frequency tag 14 selected in SC1 belongs to any group. If an affirmative determination is obtained in SC4, the control flow goes to SC5 to make a new group $X_i$ (X being other than A, B and C) having the same suffix "i" as the group to which the above-indicated one of the two radio-frequency tag communication devices 12 belongs, and to register the other radio-frequency tag communication device 12 in the new group $X_i$. Then, the control flow goes to SC7 and the subsequent steps. If a negative determination is obtained in SC4, the control flow goes to SC6 to make new groups $A_j$ and $B_j$ having a suffix "j" other than those of the other groups, and to register one of the above-indicated two radio-frequency tag communication devices 12 which has the smaller ID number, in the new group $A_j$, and the other radio-frequency tag communication device 12 having the larger ID number, in the new group $B_j$. SC7 is then implemented to determine whether the radio-frequency tag 14 at the trailing end of the tag list is presently selected. If an affirmative determination is obtained in SC7, the control flow goes to SC8 to specify the name of each group to which any radio-frequency tag communication device 12 has newly belonged. If a negative determination is obtained in SC7, the control flow goes to SC9 to select the next radio-frequency tag 14 from the tag list, and goes to SC2 and the subsequent steps.

Figure 10:
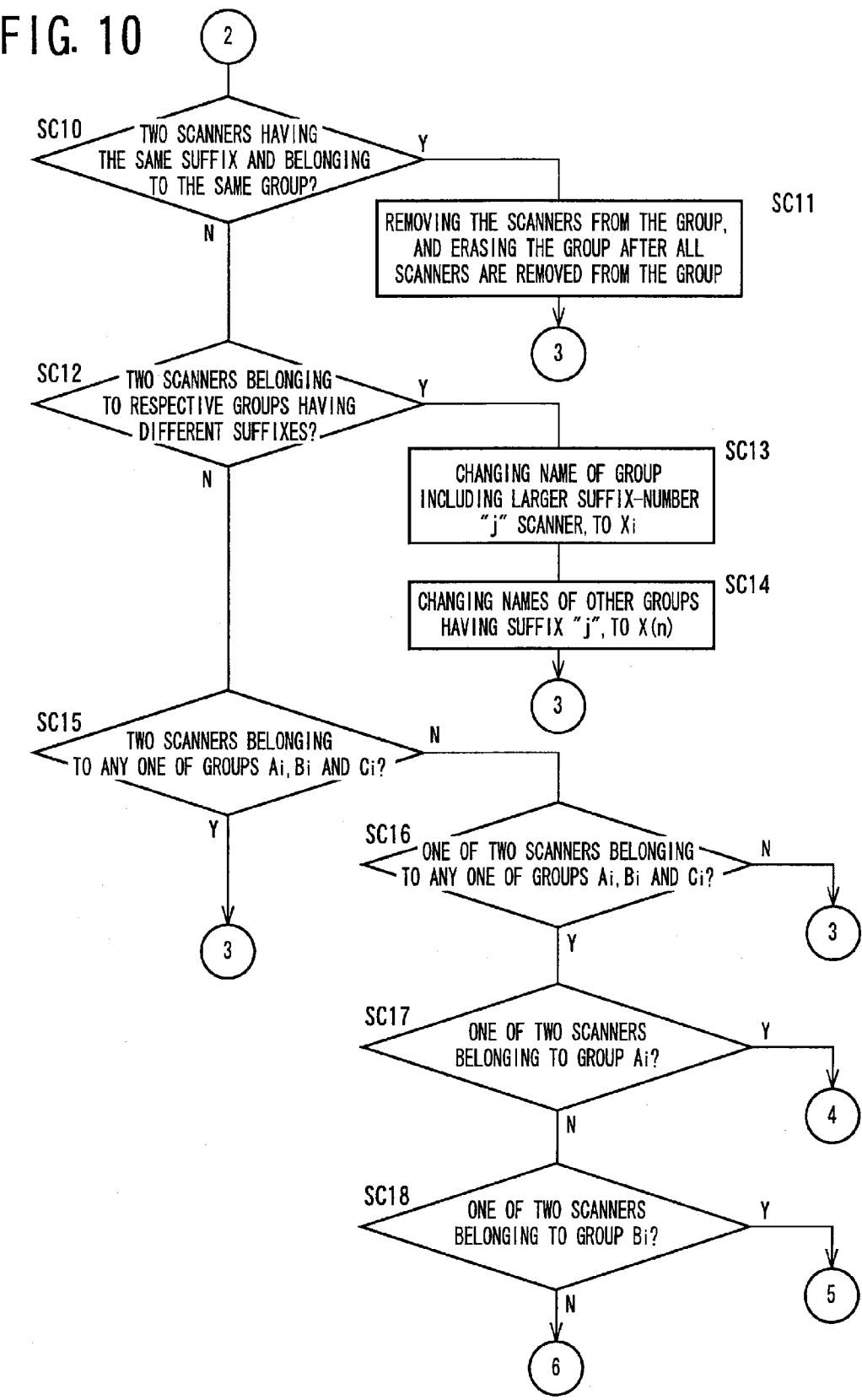
FIG. 10 is a flow chart illustrating in detail another part of the sub-routine to list the ID numbers of the detected radio-frequency tags in relation to the ID numbers of the radio-frequency tags which detected the radio-frequency tags.

SC10 of FIG. 10 is provided to determine whether the two radio-frequency tag communication devices 14 which detected the radio-frequency tag 14 selected in SC1 have the same suffix and belong to the same group. If an affirmative determination is obtained in SC10, this indicates that the two radio-frequency tag communication devices 12 located adjacent to each other erroneously belong to the same group. In this case, the control flow goes to SC11 to remove the two radio-frequency tag communication devices 12 from the group in question, and to erase the group if all radio-frequency tag communication devices 12 of the group have been erased, and the control flow goes back to SC7 and the subsequent steps. If a negative determination is obtained in SC11, the control flow goes to SC12 to determine whether the two radio-frequency tag communication devices 12 which detected the radio-frequency tag 14 selected in SC1 belong to respective two groups having respective different suffixes. If an affirmative determination is obtained in SC12, this indicates that the radio-frequency tag communication devices 12 belonging to one of the two groups are located to those belong to the other group. In this case, the control flow goes to step SC13 in which the name of the group including the radio-frequency tag communication devices 12 having the larger suffix "j" is changed to $X_i$ having the smaller suffix "i", and then goes to step SC14 in which the names of the other groups having the suffix "j" are changed to X(n). Then, the control flow goes back to SC7 of FIG. 9 and the subsequent steps. $X_i$ and X(n) are names of the groups having the suffix "i", which names are other than A, B and C. If a negative determination is obtained in SC12, this indicates that the adjacency relationship of the radio-frequency tag communication devices 12 can be further clarified. In this case, the control flow goes to SC15 to determine whether both of the two radio-frequency tag communication devices 12 which detected the radio-frequency tag 14 selected in SC1 of FIG. 9 belong any one of groups $A_i$, $B_i$ and $C_i$. If an affirmative determination is obtained in SC15, this indicates that the present grouping of the adjacent two radio-frequency tag communication devices 12 is adequate. In this case, the control flow goes to SC7 of FIG. 9 and the subsequent steps. If a negative determination is obtained in SC15, the control flow goes to SC16 to determine whether one of the two radio-frequency tag communication devices 12 which detected the radio-frequency tag 14 selected in SC1 of FIG. 9 belongs to any one of the groups $A_i$, $B_i$ and $C_i$. If a negative determination is obtained in SC16, this indicates that information for adequate grouping of the two radio-frequency tag communication devices 12 is insufficient. In this case, the control flow goes to SC7 of FIG. 9 and the subsequent steps. If an affirmative determination is obtained in SC16, this indicates that it is possible to optimize the grouping of the two radio-frequency tag communication devices 12. In this case, the control flow goes to SC17 to determine whether one of the two radio-frequency tag communication devices 12 belongs to the group $A_i$. If an affirmative determination is obtained in SC17, the control flow goes to SC19 of FIG. 11 and the subsequent steps. If a negative determination is obtained in SC17, the control flow goes to SC18 to determine whether one of the two radio-frequency tag communication devices 12 belongs to the group $B_i$. If an affirmative determination is obtained in SC18, the control flow goes to SC23 of FIG. 12 and the subsequent steps. If a negative determination is obtained in SC17, this indicates that one of the two radio-frequency tag communication devices 12 belongs to the group $C_i$. In this case, the control flow goes to SC27 of FIG. 13 and the subsequent steps.

Figure 11:
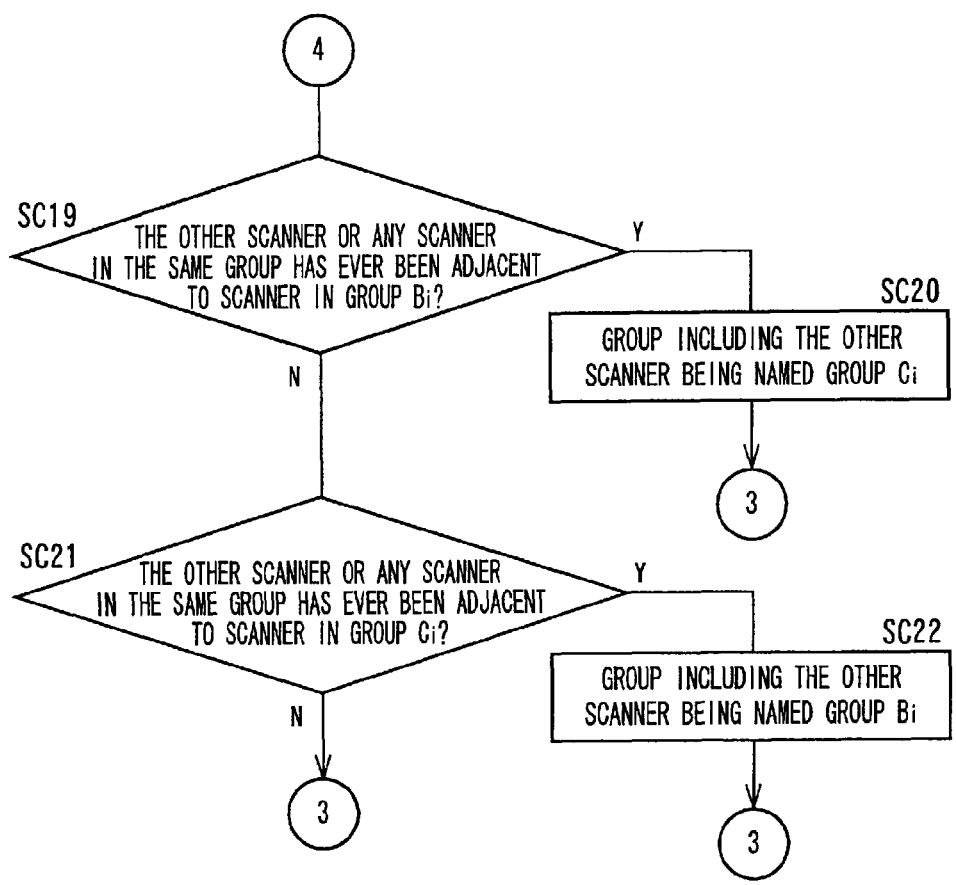
FIG. 11 is a flow chat illustrating in detail a further part of the sub-routine to list the ID numbers of the detected radio-frequency tags in relation to the ID numbers of the radio-frequency tags which detected the radio-frequency tags.

SC19 of FIG. 11 is provided to determine whether the other of the two radio-frequency tag communication devices 12 or any other radio-frequency tag communication device 12 belonging to the same group as the above-indicated other radio-frequency tag communication device 12 has ever been located adjacent to the radio-frequency tag communication device 12 of the group $B_i$. If an affirmative determination is obtained in SC19, this indicates that the group to which the above-indicated other radio-frequency tag communication device 12 is adjacent to both of the groups $A_i$ and $B_i$. In this case, the control flow goes to SC20 in which the group to which the above-indicated other radio-frequency tag communication device 12 is named group $C_i$, and goes back to SC7 and the subsequent steps. If a negative determination is obtained in SC19, the control flow goes to SC21 whether the other of the two radio-frequency tag communication devices 12 or any other radio-frequency tag communication device 12 belonging to the same group as the above-indicated other radio-frequency tag communication device 12 has ever been located adjacent to the radio-frequency tag communication device 12 of the group $C_i$. If an affirmative determination is obtained in SC21, this indicates that the group to which the above-indicated other radio-frequency tag communication device 12 is adjacent to both of the groups $A_i$ and $C_i$. In this case, the control flow goes to SC22 in which the group to which the above-indicated other radio-frequency tag communication device 12 is named group $B_i$, and goes back to SC7 and the subsequent steps. If a negative determination is obtained in SC21, this indicates that information for adequate grouping of the two radio-frequency tag communication devices 12 is insufficient. In this case, the control flow goes to SC7 of FIG. 9 and the subsequent steps.

Figure 12:
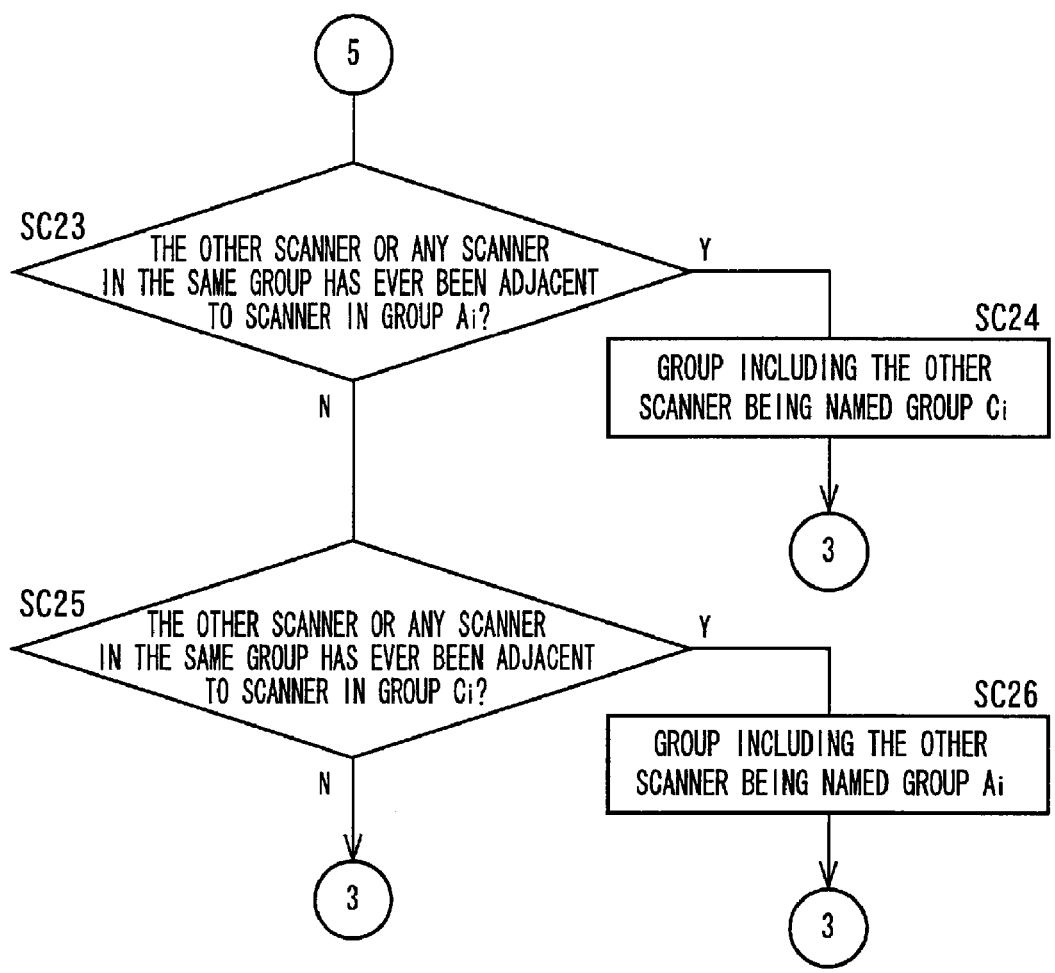
FIG. 12 is a flow chat illustrating in detail a still further part of the sub-routine to list the ID numbers of the detected radio-frequency tags in relation to the ID numbers of the radio-frequency tags which detected the radio-frequency tags.

Similarly, SC23 of FIG. 12 is provided to determine whether the other of the two radio-frequency tag communication devices 12 or any other radio-frequency tag communication device 12 belonging to the same group as the above-indicated other radio-frequency tag communication device 12 has ever been located adjacent to the radio-frequency tag communication device 12 of the group $A_i$. If an affirmative determination is obtained in SC23, this indicates that the group to which the above-indicated other radio-frequency tag communication device 12 is adjacent to both of the groups $A_i$ and $B_i$. In this case, the control flow goes to SC24 in which the group to which the above-indicated other radio-frequency tag communication device 12 is named group $C_i$, and goes back to SC7 and the subsequent steps. If a negative determination is obtained in SC23, the control flow goes to SC25 whether the other of the two radio-frequency tag communication devices 12 or any other radio-frequency tag communication device 12 belonging to the same group as the above-indicated other radio-frequency tag communication device 12 has ever been located adjacent to the radio-frequency tag communication device 12 of the group $C_i$. If an affirmative determination is obtained in SC25, this indicates that the group to which the above-indicated other radio-frequency tag communication device 12 is adjacent to both of the groups $B_i$ and $C_i$. In this case, the control flow goes to SC26 in which the group to which the above-indicated other radio-frequency tag communication device 12 is named group $A_i$, and goes back to SC7 and the subsequent steps. If a negative determination is obtained in SC25, this indicates that information for adequate grouping of the two radio-frequency tag communication devices 12 is insufficient. In this case, the control flow goes to SC7 of FIG. 9 and the subsequent steps.

Figure 13:
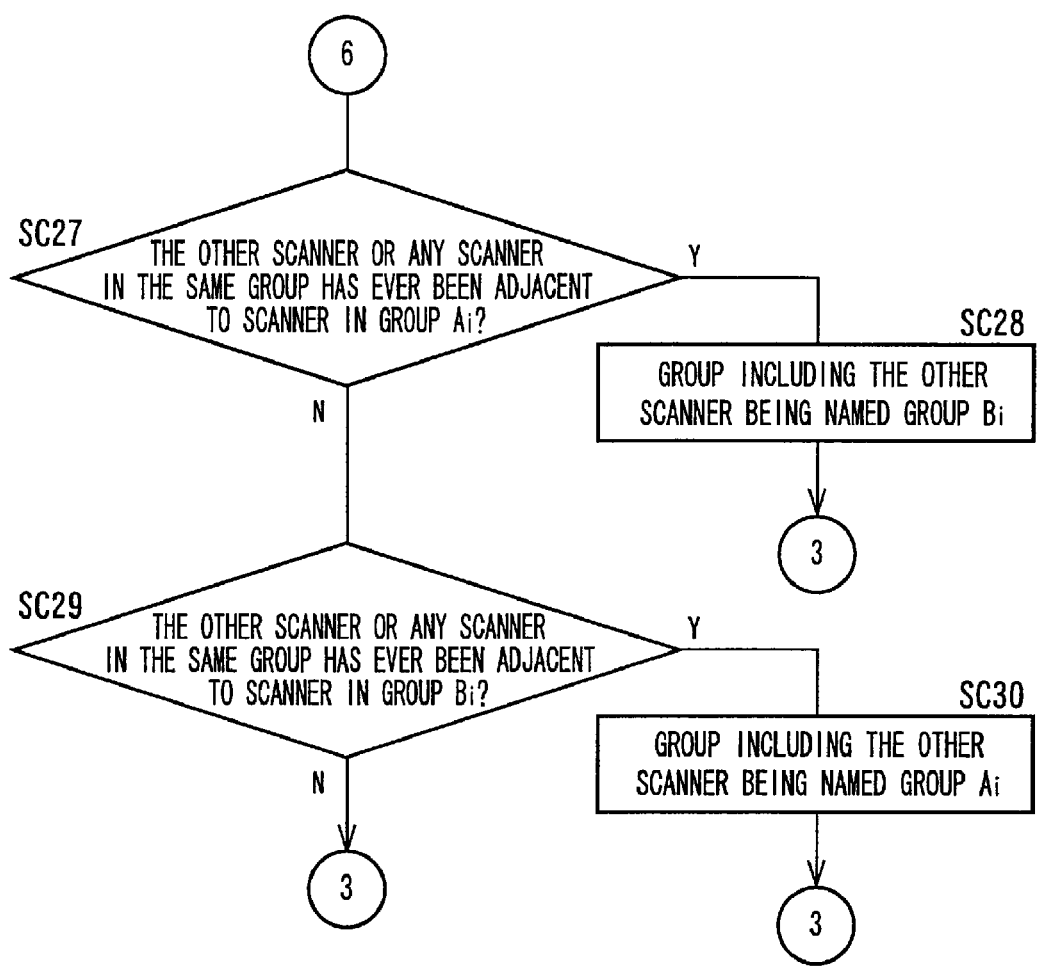
FIG. 13 is a flow chat illustrating in detail a yet further part of the sub-routine to list the ID numbers of the detected radio-frequency tags in relation to the ID numbers of the radio-frequency tags which detected the radio-frequency tags.

Similarly, SC27 of FIG. 13 is provided to determine whether the other of the two radio-frequency tag communication devices 12 or any other radio-frequency tag communication device 12 belonging to the same group as the above-indicated other radio-frequency tag communication device 12 has ever been located adjacent to the radio-frequency tag communication device 12 of the group $A_i$. If an affirmative determination is obtained in SC27, this indicates that the group to which the above-indicated other radio-frequency tag communication device 12 is adjacent to both of the groups $A_i$ and $C_i$. In this case, the control flow goes to SC28 in which the group to which the above-indicated other radio-frequency tag communication device 12 is named group $B_i$, and goes back to SC7 and the subsequent steps. If a negative determination is obtained in SC27, the control flow goes to SC29 whether the other of the two radio-frequency tag communication devices 12 or any other radio-frequency tag communication device 12 belonging to the same group as the above-indicated other radio-frequency tag communication device 12 has ever been located adjacent to the radio-frequency tag communication device 12 of the group $B_i$. If an affirmative determination is obtained in SC29, this indicates that the group to which the above-indicated other radio-frequency tag communication device 12 is adjacent to both of the groups $B_i$ and $C_i$. In this case, the control flow goes to SC30 in which the group to which the above-indicated other radio-frequency tag communication device 12 is named group $A_i$, and goes back to SC7 and the subsequent steps. If a negative determination is obtained in SC29, this indicates that information for adequate grouping of the two radio-frequency tag communication devices 12 is insufficient. In this case, the control flow goes to SC7 of FIG. 9 and the subsequent steps.

Referring next to the flow chart of FIG. 14, there will be described an operation of each radio-frequency tag communication device 12 to detect the radio-frequency tags 14. This routine is repeatedly executed with a predetermined cycle time.

Figure 14:
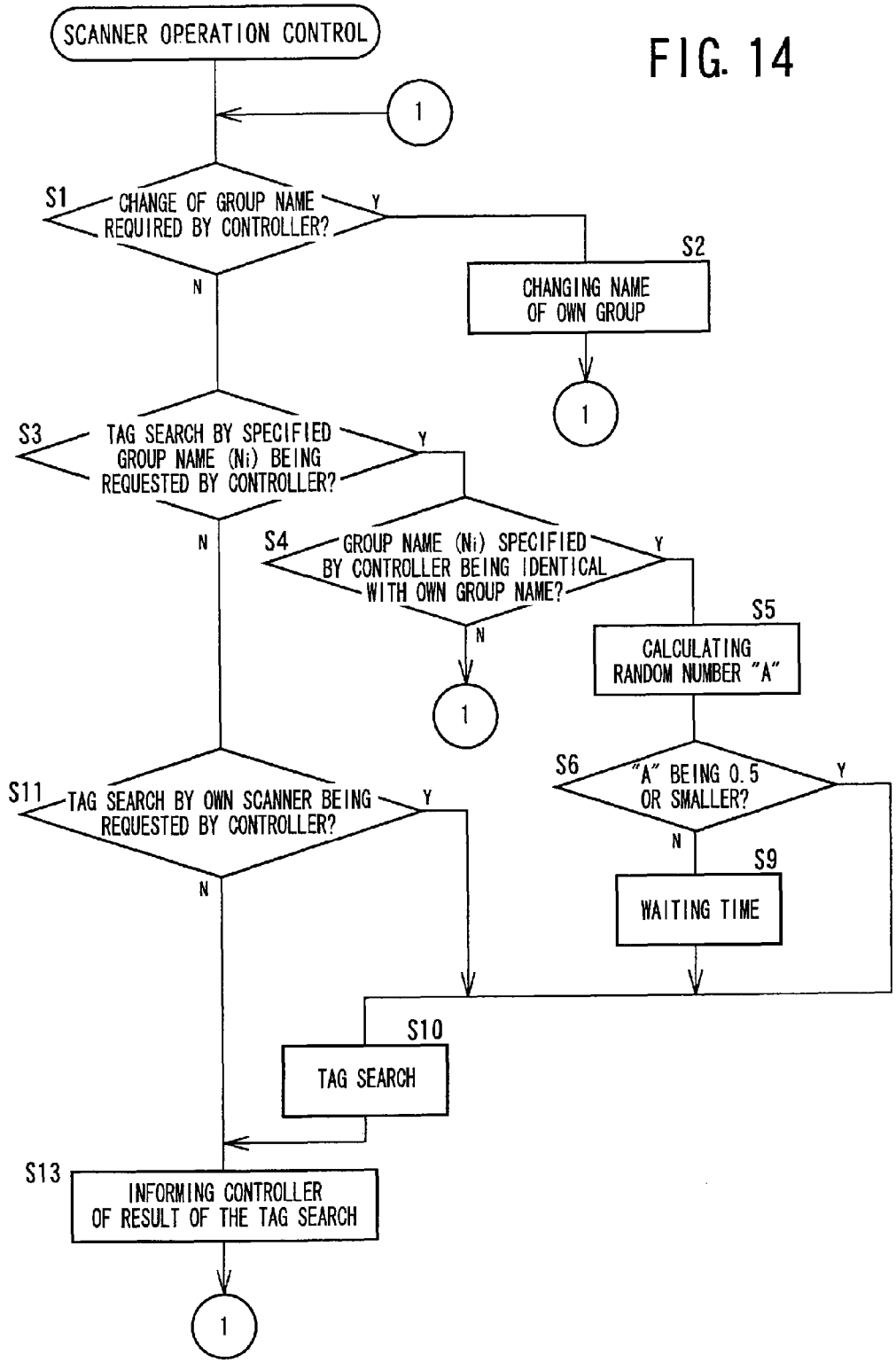
FIG. 14 is a flow chart illustrating a radio-frequency tag detecting operation of the radio-frequency tag communication device of FIG. 2.

The routine of FIG. 14 is initiated with S1 to determine whether a change of the name of the group of the radio-frequency tag communication device 12 in question was required by the control device 72 (in step SD implemented by the control device 72). If an affirmative determination is obtained in S1, the control flow goes to S2 to change the name of the group to the new name specified by the control device 72, so that the new name is stored in the memory portion 52. The control flow then goes back to S1. If a negative determination is obtained in S1, the control flow goes to S3 to determine whether the group name ($N_i$) is specified by the control device 72 to effect the search for the radio-frequency tags 14 (in step SA6 executed by the control device 72). If a negative determination is obtained in S3, the control flow goes to S11 and the subsequent steps. If an affirmative determination is obtained in S3, the control flow goes to S4 to determine whether the group name ($N_i$) specified by the control device 72 is identical with the name of the own group stored in the memory portion 52. If a negative determination is obtained in S4, the control flow goes back to S1. If an affirmative determination is obtained in S4, the control flow goes to S5 to calculate a random number "A". Then, the control flow goes to S6 to determine whether the calculated random number "A" is 0.5 or smaller. If an affirmative determination is obtained in S6, the control flow goes to S10 to start the operation to search for the radio-frequency tags 14, and to S13 and the subsequent steps. If a negative determination is obtained in S6, the control flow goes to S9 to provide a predetermined waiting time before transmitting the transmitted signal from the radio-frequency tag communication device 12 in question, so that the transmitted signals are transmitted from the radio-frequency tag communication devices 12 of the same group at the respective different points of time. Then, the control flow goes to S10 to start the operation to search for the radio-frequency tags 14, and to S13 and the subsequent steps. S11 is provided to determine whether the ID number of the radio-frequency tag communication device 12 is specified by the control device 72 to effect the search for the radio-frequency tags 14 (in step SA5 or SB3 executed by the control device 72). If an affirmative determination is obtained in S11, the control flow goes to S10 to start the operation to search for the radio-frequency tags 14 and then goes to S13 to inform the control device 62 of a result of the search. Then, the control flow goes back to S1. If a negative determination is obtained in S11, the control flow goes to S13 to inform the control device 62 of the result of the search, and goes back to S1.

Figure 15:
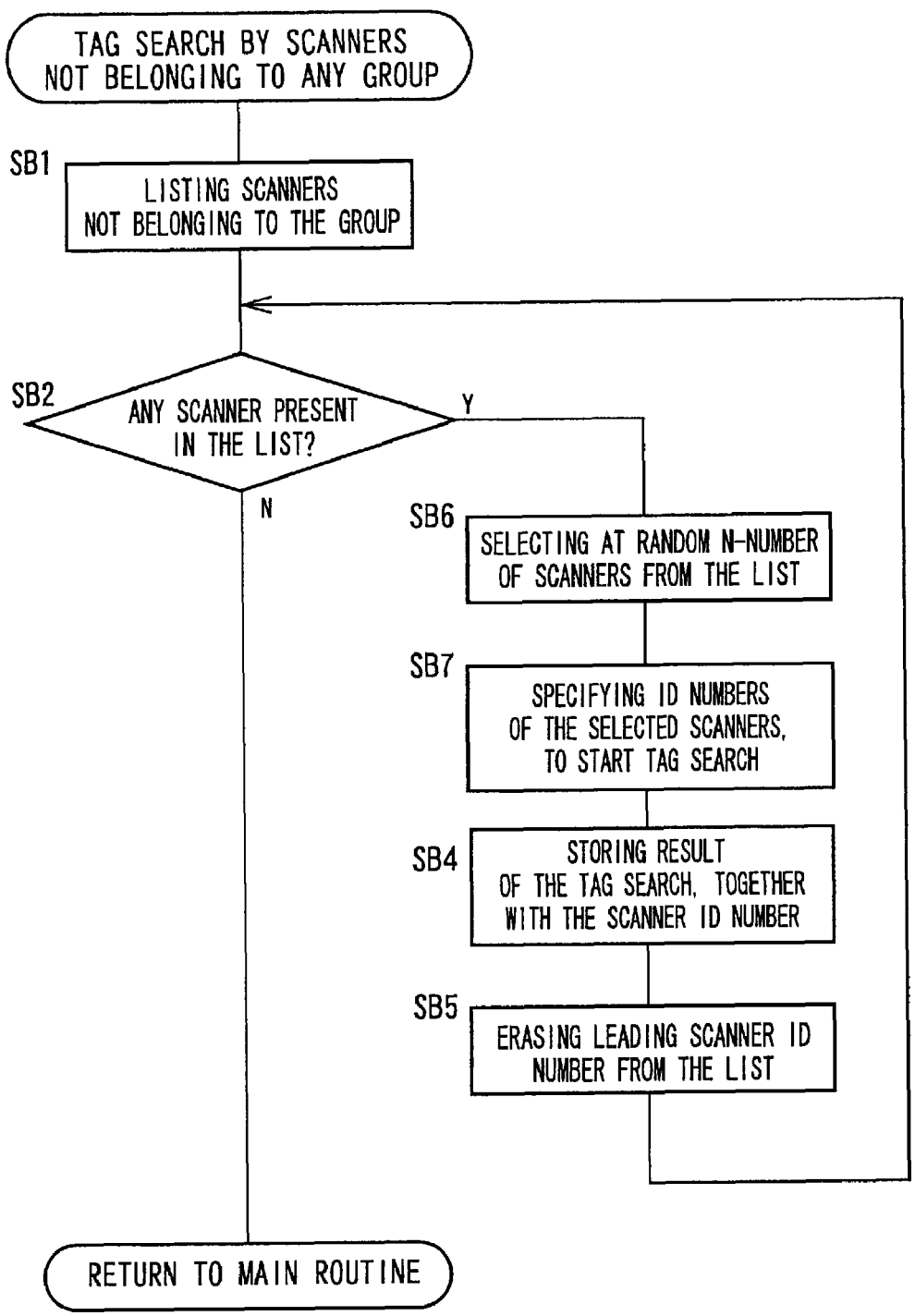
FIG. 15 is a flow chart illustrating in detail another sub-routine corresponding to a portion of the radio-frequency tag detecting operation of FIG. 6 performed by using the radio-frequency tag communication devices not belonging to any group.

The tag search described above by reference to FIG. 8 may be replaced by the tag search as illustrated in FIG. 15. The same reference signs as used in FIG. 8 are used in FIG. 15 to identify the same steps, which will not be described. If an affirmative determination is obtained in SB2 of the routine of FIG. 15, namely, if it is determined that any radio-frequency tag communication device 12 is present in the list prepared in SB1, the control flow goes to SB6 to select at random N-number of radio-frequency tag communication devices 12 from the list. Then, the control flow goes to SB7 to specify the ID numbers of the radio-frequency tag communication devices 12 selected in SB6, to effect the search for the radio-frequency tags 14, and then goes to SB4 and the subsequent steps. The present routine of FIG. 15 also prevents repetitive overlapping communication of the mutually adjacent radio-frequency tag communication devices 12.

FIGS. 16-22 show different states of grouping of the plurality of radio-frequency tag communication devices 12, which grouping is effected by the control routines described above in detail, for highly efficient coordinated operations of the radio-frequency tag communication devices 12 without overlapping of communication. FIG. 16 shows an initially positioned state of the plurality of radio-frequency tag communication devices 12 such that three adjacent ones of the radio-frequency tag communication devices 12 are positioned at respective three apexes of an equilateral triangle, as seen in the horizontal plane. In this state, the relative positions (adjacency relationship) of the plurality of radio-frequency tag communication devices 12 have not been determined, and the radio-frequency tag communication devices 12 have not yet been classified into groups. To effect the search for the radio-frequency tags 14, the scanners are sequentially called to transmit the interrogating signals.

FIG. 17 shows a grouping of the radio-frequency tag communication devices 12 after determination of adjacency relationship between the communication device $12_{\#2}$ and the communication device $12_{\#5}$. If it is determined that the communication device $12_{\#2}$ and the communication device $12_{\#5}$ are located adjacent to each other, as shown in FIG. 17, these two communication devices $12_{\#2}$ and $12_{\#5}$ are classified into respective two different groups. For instance, the communication device $12_{\#2}$ is classified into group $A_i$, while the communication device $12_{\#5}$ is classified into group $B_i$, so that overlapping of communication between these two communication devices $12_{\#2}$ and $12_{\#5}$ is prevented. As shown at right in FIG. 17, the radio communication is initially implemented by the communication devices $12_{\#2}$ and $12_{\#5}$ belonging to the specific groups, and is then implemented by the other radio-frequency tag communication devices 12 which have not yet classified into any groups.

FIG. 18 shows a grouping of the radio-frequency tag communication devices 12 after determination of adjacency relationship between the communication device $12_{\#10}$ and the communication device $12_{\#14}$, following the adjacency determination of FIG. 17. If it is determined that the communication device $12_{\#10}$ and the communication device $12_{\#14}$ are located adjacent to each other, as shown in FIG. 18, these two communication devices $12_{\#10}$ and $12_{\#14}$ are classified into respective two different groups. For instance, the communication device $12_{\#10}$ is classified into group $A_2$, while the communication device $12_{\#14}$ is classified into group $B_2$, so that overlapping of communication between these two communication devices $12_{\#10}$ and $12_{\#14}$ is prevented. As shown at right in FIG. 18, the radio communication is initially implemented by the communication devices $12_{\#2}$, $12_{\#5}$, $12_{\#10}$ and $12_{\#14}$ belonging to the specific groups, and is then implemented by the other radio-frequency tag communication devices 12 which have not yet classified into groups.

FIG. 19 shows a grouping of the radio-frequency tag communication devices 12 after determination of adjacency relationship between the communication device $12_{\#2}$ and the communication device $12_{\#3}$, following the adjacency determination of FIG. 18. If it is determined that the communication device $12_{\#2}$ and the communication device $12_{\#3}$ are located adjacent to each other, as shown in FIG. 19, these two communication devices $12_{\#2}$ and $12_{\#3}$ are classified into respective two different groups. For instance, the communication device $12_{\#2}$ remains belonging to the group $A_1$, while the communication device $12_{\#3}$ is classified into group $D_1$. The communication device $12_{\#2}$ has already been determined to be located adjacent to the communication device $12_{\#5}$, as described above, while the adjacency relationship between the communication devices $12_{\#5}$ and $12_{\#3}$ has not yet been determined, so that the communication device $12_{\#3}$ is classified into the group different from the group $B_1$ to which the communication device $12_{\#5}$ belongs, so that overlapping of communication between these two communication devices $12_{\#2}$ and $12_{\#3}$ is prevented. As shown at right in FIG. 19, the radio communication is initially implemented by the communication devices $12_{\#2}$, $12_{\#5}$, $12_{\#3}$, $12_{\#10}$ and $12_{\#14}$ belonging to the specific groups, and is then implemented by the other radio-frequency tag communication devices 12 which have not yet classified into groups.

FIG. 20 shows a grouping of the radio-frequency tag communication devices 12 after determination of adjacency relationship between the communication device $12_{\#5}$ and the communication device $12_{\#6}$, following the adjacency determination of FIG. 19. If it is determined that the communication device $12_{\#5}$ and the communication device $12_{\#6}$ are located adjacent to each other, as shown in FIG. 20, these two communication devices $12_{\#5}$ and $12_{\#6}$ are classified into respective two different groups. For instance, the communication device $12_{\#5}$ remains belonging to the group $B_1$, while the communication device $12_{\#6}$ is classified into group $E_1$. The communication device $12_{\#5}$ has already been determined to be located adjacent to the communication device $12_{\#2}$, as described above, while the adjacency relationship between the communication devices $12_{\#2}$ and $12_{\#6}$ has not yet been determined, so that the communication device $12_{\#6}$ is classified into the group different from the group $A_1$ to which the communication device $12_{\#2}$ belongs, so that overlapping of communication between these two communication devices $12_{\#5}$ and $12_{\#6}$ is prevented. As shown at right in FIG. 20, the radio communication is initially implemented by the communication devices $12_{\#2}$, $12_{\#5}$, $12_{\#3}$, $12_{\#6}$, $12\#_{10}$ and $12_{\#14}$ belonging to the specific groups, and is then implemented by the other radio-frequency tag communication devices 12 which have not yet classified into groups.

FIG. 21 shows a grouping of the radio-frequency tag communication devices 12 after determination of adjacency relationship between the communication device $12_{\#2}$ and the communication device $12_{\#6}$, following the adjacency determination of FIG. 20. The communication device $12_{\#6}$ has already been determined to be located adjacent to the communication device $12_{\#5}$, while the communication device $12_{\#5}$ has already been determined to be located adjacent to the communication device $12_{\#2}$, as described above. Accordingly, the communication device $12_{\#6}$ is classified into a group $C_1$ which is located adjacent to both the group $A_1$ including the communication device $12\#_2$ and the group $B_1$ including the communication device $12_{\#5}$, so that overlapping of communication among these three communication devices $12_{\#2}$, $12_{\#5}$ and $12_{\#6}$ is prevented. As shown at right in FIG. 21, the radio communication is initially implemented by the communication devices $12_{\#2}$, $12_{\#5}$, $12_{\#6}$, $12_{\#3}$, $12\#_{10}$ and $12_{\#14}$ belonging to the specific groups, and is then implemented by the other radio-frequency tag communication devices 12 which have not yet classified into groups.

FIG. 22 shows a grouping of the radio-frequency tag communication devices 12 after determination of adjacency relationship between the communication device $12_{\#3}$ and the communication device $12_{\#6}$, following the adjacency determination of FIG. 21. Since the communication device $12_{\#5}$ has already been determined to be located adjacent to the communication device $12_{\#2}$ and the communication device $12_{\#6}$, and since the three adjacent ones of the plurality of radio-frequency tag communication devices 12 are located at the respective three apexes of the equilateral triangle as seen in the horizontal plane, the communication device $12_{\#3}$ determined to be located adjacent to the communication devices $12_{\#2}$ and $12_{\#6}$ cannot be located adjacent to the communication device $12_{\#5}$. Accordingly, the communication device $12_{\#3}$ is classified into the group $B_1$ including the communication device $12_{\#5}$, so that overlapping of communication between the two communication devices $12_{\#3}$, $12_{\#5}$ and $12_{\#6}$ is prevented. As shown at right in FIG. 22, the radio communication is initially implemented by the communication device $12_{\#2}$ belonging to the group $A_1$, the communication devices $12_{\#3}$ and $12_{\#5}$ belonging to the group $B_1$, the communication device $12_{\#3}$ belonging to the group $C_1$, the communication device $12_{\#10}$ belonging to the group $A_2$, and the communication device $12_{\#14}$ belonging to the group $B_2$, in the order of description, and is then implemented by the other radio-frequency tag communication devices 12 not classified into any group.

Figure 23:
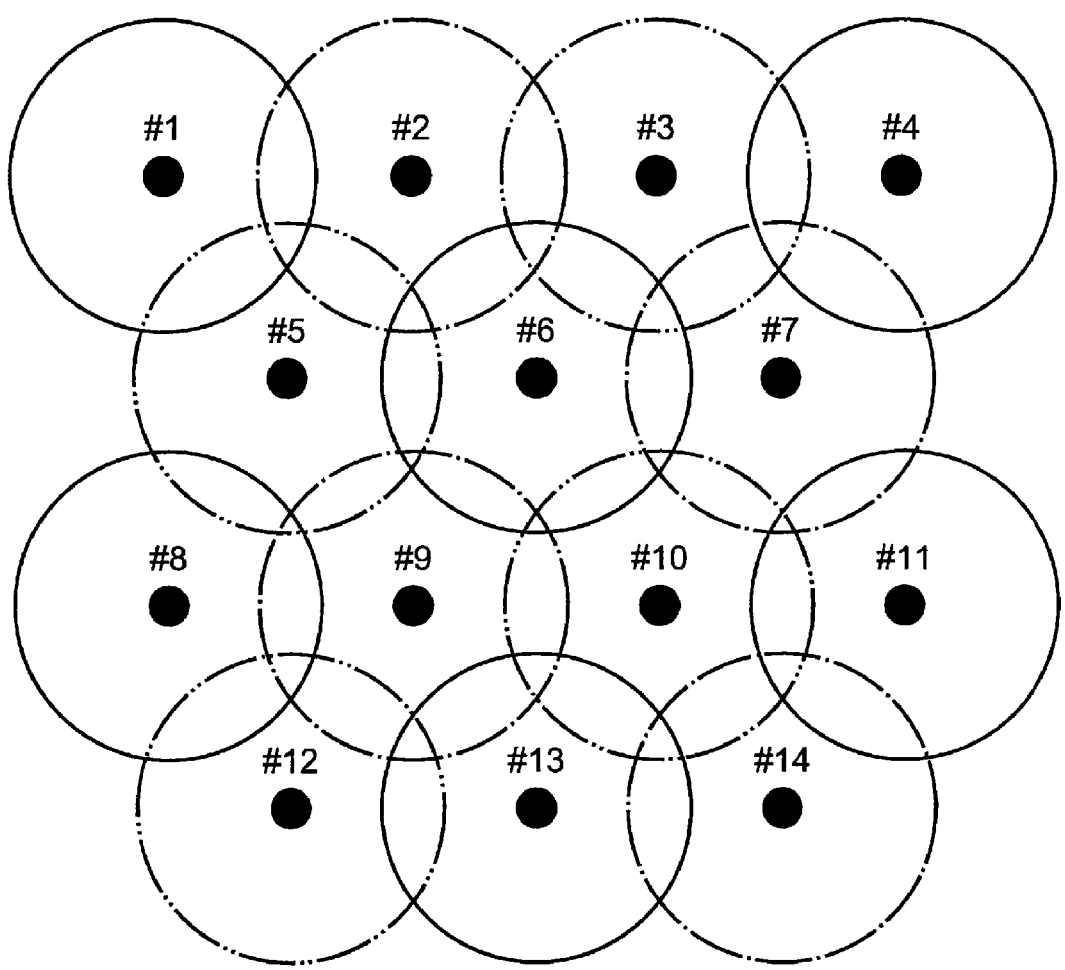
FIG. 23 is a view showing grouping of the plurality of radio-frequency tag communication devices of FIG. 1 in a steady state established after repeated determinations of the relative position of the devices.
Figure 24:
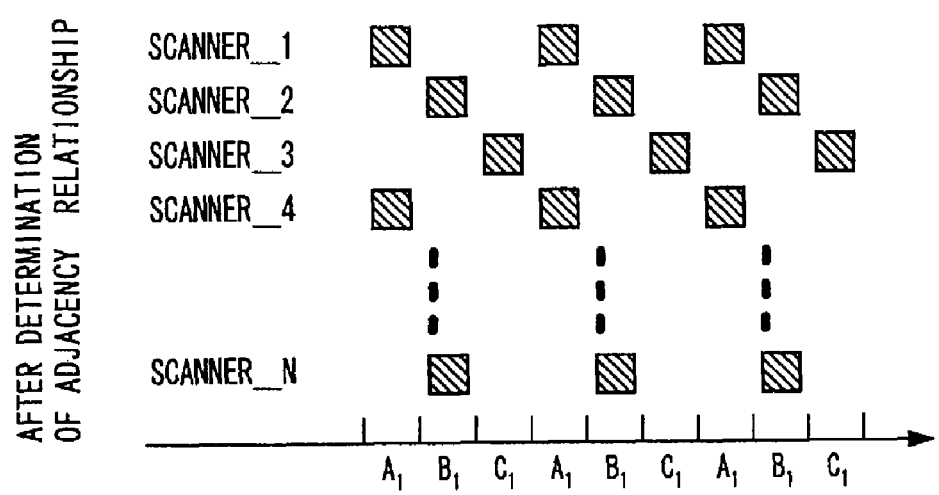
FIG. 24 is a view showing timing of transmission in the steady state established after the repeated determinations of the relative position of the radio-frequency tag communication devices of FIG. 1.
Figure 25:
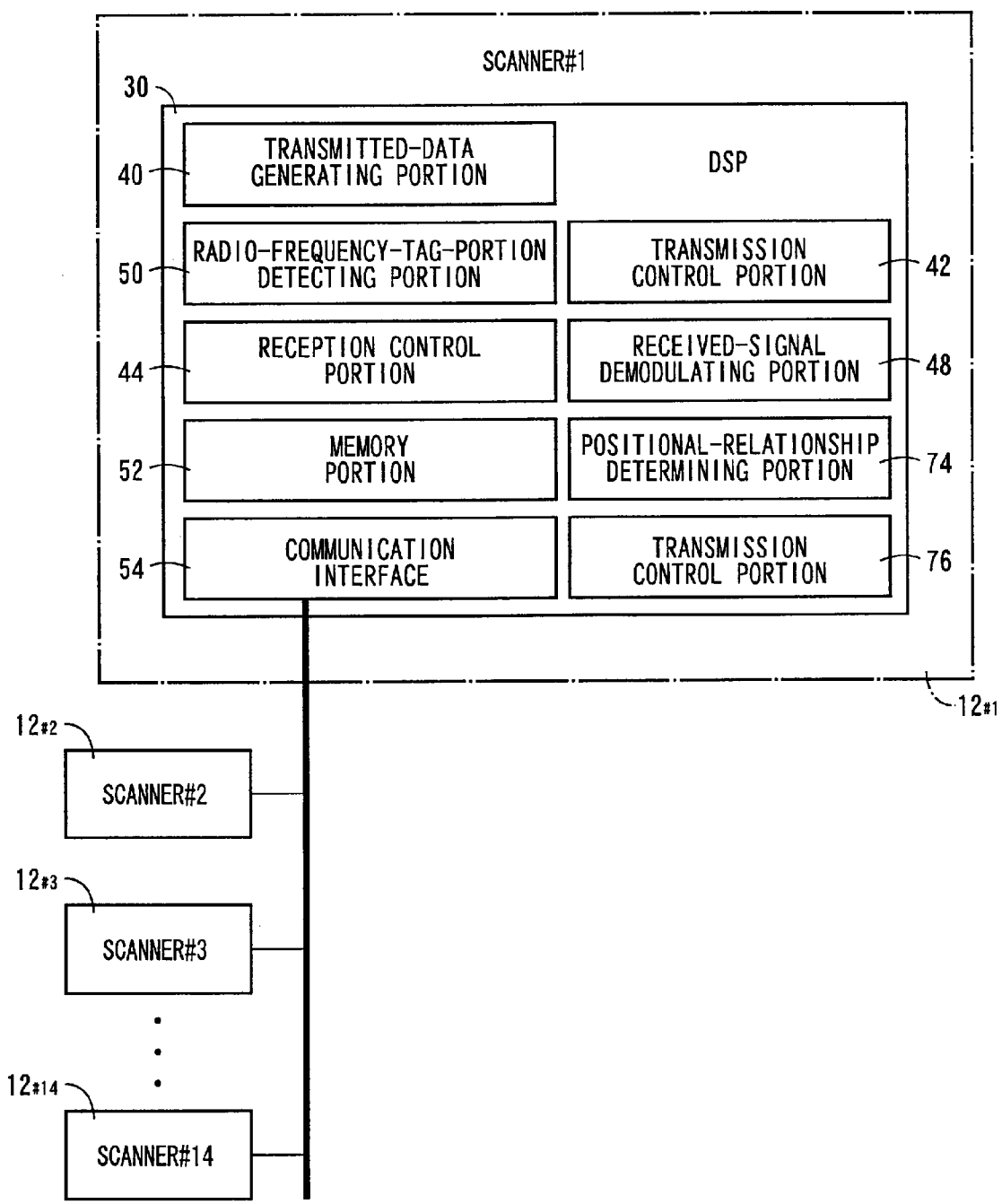
FIG. 25 is a view showing functional portions of a DSP of a radio-frequency tag communication device, which replace the functions of the control device of FIG. 4 to effect the determinations of the mutually adjacent radio-frequency tag communication devices and the grouping of the devices, and to control the timing of transmission of a transmitted signal from each radio-frequency tag communication device.

FIG. 23 shows grouping of the plurality of radio-frequency tag communication devices 12 in a steady state established after repeated determinations of the relative position of the communication devices 12. In the figure, one-dot chain line represents the area of communications of the radio-frequency tag communication devices 12 belonging to the group $A_1$, and two-dot chain line represents the areas of communication of the radio-frequency tag communication devices 12 belonging to the group $B_1$, while solid line represents the areas of communication of the radio-frequency tag communication devices 12 belonging to the group $C_1$. FIG. 24 indicates the points of time at which the transmitted signals are transmitted from the radio-frequency tag communication devices 12, in the steady state. As shown in FIG. 24, each of the plurality of radio-frequency tag communication devices 12 is classified into any one of the groups $A_1$, $B_1$ and $C_1$, by repeating the adjacency determination and the grouping according to the results of the adjacency determination, which have been described above by reference to FIGS. 16-22. Accordingly, the radio-frequency tag communication devices 12 are operable in a coordinated fashion with a high degree of efficiency, while preventing overlapping of communication among the mutually adjacent radio-frequency tag communication devices 12. In the present specific example of FIG. 23, the radio-frequency tag communication devices $12_{\#2}$, $12_{\#7}$, $12_{\#9}$ and $12_{\#14}$ belong to the group $A_1$, and the radio-frequency tag communication devices $12_{\#3}$, $12_{\#5}$, $12_{\#10}$ and $12_{\#12}$ belong to the group $B_1$, while the radio-frequency tag communication devices $12_{\#1}$, $12_{\#4}$, $12_{\#6}$, $12_{\#8}$, $12_{\#11}$ and $12_{\#13}$ belong to the group $C_1$. It will be understood that the mutually adjacent radio-frequency tag communication devices 12 belong to the respective different groups. The radio-frequency tag communication devices 12 belonging to the same group are operated for radio communication in a selected one of two halves of a predetermined period of transmission given to that group, such that one of the two halves is selected at random. In the case where the three adjacent ones of the plurality of radio-frequency tag communication devices 12 are located at the respective apexes of an equilateral triangle as seen in the horizontal plane, the three groups of communication devices 12 are operated to transmit the transmitted signals at respective three different points of time, so that a sufficiently long time is provided for each communication device 12 to transmit the transmitted signal.

Where the adjacency relationship of the radio-frequency tag communication devices 12 is determined in the manner described above, there exist non-detectable areas in which the radio-frequency tags 14 cannot be detected, if the distance between the adjacent communication devices 12 is excessively long. Further, overlapping of communication may take place among the radio-frequency tag communication devices 12 belonging to the same group, if the distance between the adjacent communication deices 12 is excessively short. Therefore, the distance between the adjacent radio-frequency tag communication devices 12 is preferably not shorter than the maximum distance of communication of the communication devices 12 and not longer than a distance two times the maximum distance of communication.

Where the distance between the adjacent radio-frequency tag communication devices 12 is excessively long, there is a low probability of detection of the radio-frequency tags 14 by the radio-frequency tag communication devices 12 within a predetermined length of time to determine the adjacency relationship of the communication devices 12, so that the time required for determination of the adjacency relationship is undesirably increased. Further, the excessively long distance between the adjacent communication devices 12 may cause the non-detectable areas in which the radio-frequency tags 14 cannot be detected, if the condition of radio communication between the communication devices 12 and the radio-frequency tags 14 is deteriorated due to deterioration of the properties of the radio-frequency tags 14. On the other hand, the excessively short distance between the adjacent communication devices 12 increases the required number of the communication devices 12, and consequently increases unnecessary communication and a load of the control device 72. Where the distance between the adjacent communication devices 12 is selected within a range between 1.4 and 1.8 times the maximum distance of communication, the required number of the communication devices 12 can be reduced to a value not larger than two times the ideal number of the communication devices 12 required for optimum radio communication, so that the adjacency determination of the communication devices 12 can be made with high efficiency, and practical radio communication is possible even after deterioration of condition of radio communication due to deterioration of the properties of the radio-frequency tags 14.

In the present first embodiment described above, the radio-frequency tag communication system 10 includes the positional-relationship determining portion 74 (SC) configured to determine relative positions of the plurality of radio-frequency tag communication devices 12, and the transmission control portion 76 (SA, SB, SC) configured to control transmission of the transmitted signal from each of the plurality of radio-frequency tag communication devices 12, according to a result of determination of the relative positions by the positional-relationship determining portion 74, so that a sufficiently long time is provided for the mutually adjacent radio-frequency tag communication devices 12 to transmit the transmitted signals. Namely, the present embodiment provides the radio-frequency tag communication system 10 wherein the radio-frequency tag communication devices 12 are operable in a coordinated fashion with high efficiency while preventing overlapping of communication among the mutually adjacent communication devices 12, even where the communication devices 12 are disposed such that the areas of communication of the mutually adjacent communication devices 12 partially overlap each other.

Further, the radio-frequency tag communication system further comprises the memory device 72 for storing the relative positions of the plurality of radio-frequency tag communication devices 12, and the contents of the memory device 72 are updated each time radio communication is effected between the radio-frequency communication devices 12 and the radio-frequency tags 14. Accordingly, the relative positions of the plurality of radio-frequency tag communication devices 12 can be practically recognized and controlled.

Further, the positional-relationship determining portion 74 determines that the plurality of radio-frequency tag communication devices 12 which are able to communicate with the same radio-frequency tag 14 within a predetermined length of time are located adjacent to each other. In this case, the relative positions of the mutually adjacent radio-frequency tag communication devices 12 can be practically recognized and controlled.

Further, the positional-relationship determining portion 74 determines that the plurality of radio-frequency tag communication devices 12 which are able to communicate with the same radio-frequency tag 14 by a plurality of consecutive times within the predetermined length of time are located adjacent to each other. In this case, it is possible to prevent erroneous detection of the relative positions of the radio-frequency tag communication devices 12 due to radio communication with the radio-frequency tag 14 moving at a high speed. Accordingly, the relative positions of the mutually adjacent radio-frequency tag communication devices 12 can be practically determined with high reliability.

Further, the transmission control portion 78 controls the transmission of the transmitted signals from the plurality of radio-frequency tag communication devices 12, such that the radio-frequency tag communication devices 12 that are located adjacent to each other transmit the transmitted signals at respective different points of time. In this case, it is possible to practically prevent overlapping of communication among the adjacent radio-frequency tag communication devices 12.

Further, the transmission control portion 76 classifies the plurality of radio-frequency tag communication devices 12 into a plurality of groups such that the radio-frequency tag communication devices 12 which are determined by the positional-relationship determining portion 74 to be located adjacent to each other belong to the respective different groups, the transmission control portion 76 controlling the transmission of the transmitted signals such that the plurality of groups of the radio-frequency tag communication devices 12 transmit the transmitted signals at respective different points of time. In this case, it is possible not only to prevent overlapping of communication among the adjacent radio-frequency tag communication devices 12, but also to permit concurrent transmission of the transmitted signals from the radio-frequency tag communication devices 12 that are not located adjacent to each other. Accordingly, the time required for the radio communication can be practically reduced.

Further, the transmission control portion 76 controls the transmission of the transmitted signals such that the radio-frequency tag communication devices 12 belonging to the same group transmit the transmitted signals at respective different points of time which are selected at random. In this case, it is possible to prevent overlapping of communication among the radio-frequency tag communication devices 12, even if the radio-frequency tag communication devices 12 are erroneously grouped.

Further, the plurality of radio-frequency tag communication devices 12 are disposed such that three adjacent ones of the radio-frequency tag communication devices 12 are located substantially at respective apexes of an equilateral triangle, as seen in a horizontal plane. In this case, the plurality of radio-frequency tag communication devices 12 are disposed in a honeycomb pattern as seen in the horizontal plane, so that a desired area of communication can be covered by a reduced number of the radio-frequency tag communication devices, and the maximum number of the radio-frequency tag communication devices 12 adjacent to each of the three adjacent radio-frequency tag communication devices can be limited to six.

Further, the plurality of radio-frequency tag communication devices 12 are disposed such that a distance between two adjacent ones of the radio-frequency tag communication devices 12 is not shorter than a maximum distance of communication of the radio-frequency communication devices 12 and not longer than a distance two times the maximum distance of communication. In this case, there does not exist an area in which none of the radio-frequency tag communication devices 12 can communicate with the radio-frequency tags 14, and the maximum number of the radio-frequency tag communication devices 12 the areas of communication of which partially overlap each other can be limited to three.

Further, the plurality of radio-frequency tag communication devices 12 are disposed such that a distance between two adjacent ones of the radio-frequency tag communication devices 12 is selected within a range between 1.4 and 1.8 times a maximum distance of communication of the radio-frequency tag communication devices 12. In this case, the required number of the radio-frequency communication devices 12 can be reduced to a value not larger than two times the ideal number of the communication devices 12 required for optimum radio communication, so that the areas of communication of the communication devices 12 overlap each other sufficiently for adjacency determination of the communication devices, and practical radio communication is possible even after deterioration of communication due to deterioration of the properties of the radio-frequency tags 14.

In the present embodiment described above, each radio-frequency tag communication device 12 includes the group-information storage portion in the form of the memory portion 52 for storing the group information indicative of the group to which the radio-frequency tag communication device 12 belongs, and the transmission-timing control portion in the form of the transmission control portion 42 (S5-S10 and S12) configured to control the timing of transmission of the transmitted signal, according to the group information stored in the memory portion 52, so that a sufficiently long time is provided for the mutually adjacent radio-frequency tag communication devices to transmit the transmitted signals. Namely, the present embodiment provides the radio-frequency tag communication device 12 which is operable with high efficiency in a coordinated fashion together with the other radio-frequency tag communication devices, while preventing overlapping of communication among the mutually adjacent communication devices.

Further, the memory portion 52 stores the group information obtained on the basis of the positions of the radio-frequency tag communication device 12 relative to other radio-frequency tag communication devices 12. In this case, the positions of the radio-frequency tag communication devices 12 relative to the adjacent other radio-frequency tag communication devices are stored in the memory portion 52, and the timing of transmission of the transmitted signal can be determined on the basis of the stored relative positions.

While the preferred embodiment of the first and second aspects of this invention has been described in detail by reference to the drawings, it is to be understood that the first and second aspects of the invention are not limited to the embodiment described above, but may be otherwise embodied.

In the radio-frequency tag communication device 10 according to the illustrated embodiment described above, the control device 72 is provided separately from the plurality of radio-frequency tag communication devices 12, and the control device 72 includes, as its functional portions, the positional-relationship determining portion 74 and the transmission control portion 76. However, one of the radio-frequency tag communication devices 12 may be configured to function as a main scanner which includes those functional portions. This modification eliminates the control device 72, and therefore makes it possible to minimize the required space for installation of the communication system.

In the embodiment described above, the positional-relationship determining portion 74 and the transmission control portion 76 are functional portions of the control device 72, while the transmission control portion 42, etc. are functional portions of the DSP 30 of the radio-frequency tag communication device 12. However, those portions may be replaced by independent control devices, and may be controlled by either digital signal processing or analog signal processing.

In the embodiment described above, the radio-frequency tag communication device 12 is provided with the transmitter/receiver antenna element 20 for transmitting the transmitted signal toward the radio-frequency tags 14 and for receiving the reply signals transmitted from the radio-frequency tags 14 in response to the transmitted signal. However, the radio-frequency tag communication device 20 may be provided with a transmitter antenna element for transmitting the transmitted signal toward the radio-frequency tags 14, and a receiver antenna element for receiving the reply signals transmitted from the radio-frequency tags 14 in response to the transmitted signal.

In the embodiment described above, the DSP 30 of the radio-frequency tag communication device 12 is provided with the radio-frequency-tag-position detecting portion 50 as a functional portion thereof for detecting the positions or directions of the radio-frequency tags 14. However, the radio-frequency-tag-position detecting portion 50 need not be provided, as long as the radio-frequency tag communication device 12 is capable of radio communication with the radio-frequency tags 14, according to the principle of this invention.

In the embodiment described above, the radio-frequency tag communication devices 12 belonging to the same group are commanded by the control device 72 to be operated at different points of time determined at random, to detect the radio-frequency tags. However, all of the radio-frequency tag communication devices 12 belonging to the same group may be operated at one time to detect the radio-frequency tags. Further, the different points of time may be determined in a manner other than the random selection, for example, in a manner of pseudo-random selection.

It is to be understood that various other changes may be made in the first and second aspects of this invention, without departing from the spirit of the invention.

There will be described in detail a preferred embodiment of third and fourth aspects of this invention, by reference to the drawings. In the following description, the same reference signs as used in the first embodiment will be used to identify the corresponding elements, which will not be described.

Embodiment 2

Figure 26:
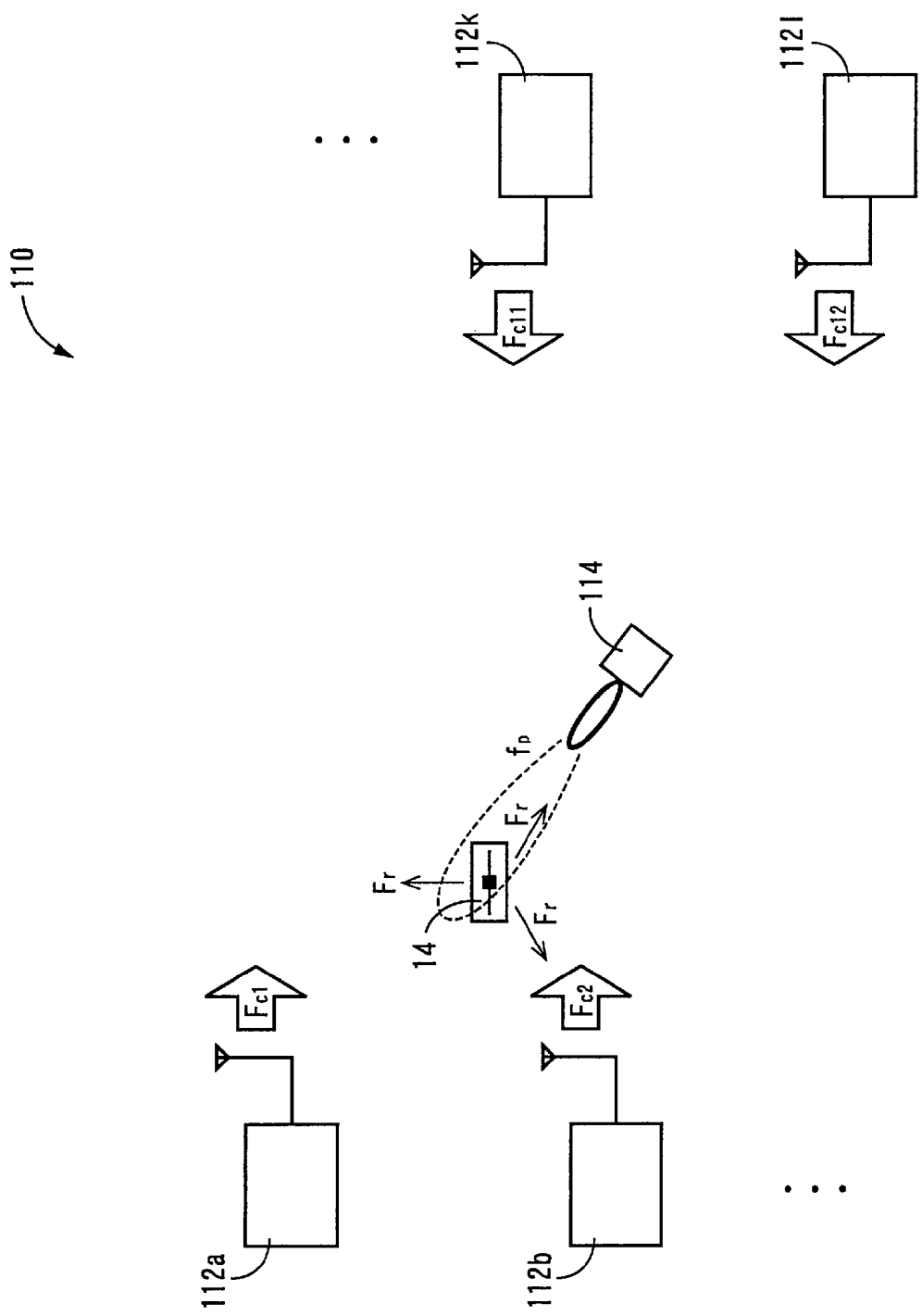
FIG. 26 is a view for explaining an embodiment of a radio-frequency tag communication system according to third and fourth aspects of the present invention.

Referring to FIG. 26, there is shown a radio-frequency tag communication system 110 according to an embodiment of third and fourth aspects of the present invention. As shown in FIG. 26, the radio-frequency tag communication system 110 a so-called "RFID (Radio-Frequency Identification) system consisting of a plurality of stationary radio-frequency tag communication devices 112a, 112b, 112c, . . . , 112l (twelve radio-frequency tag communication devices in this embodiment, and hereinafter collectively referred to as "stationary radio-frequency tag communication devices 112", unless otherwise specified) disposed at respective positions, at least one portable radio-frequency tag communication device (handy reader) 114 (one portable radio-frequency tag communication device shown in FIG. 26) for detecting at least one radio-frequency tag 14 located in an area of communication of the plurality of stationary radio-frequency tag communication devices 112, and the at least one radio-frequency tag 14 (one radio-frequency tag shown in FIG. 26) which has been described by reference to FIG. 3 and which is a communication object for radio communication with the radio-frequency tag communication devices 112. The stationary radio-frequency tag communication devices 112 and the portable radio-frequency tag communication device 114 function as interrogators, while the radio-frequency tag 14 functions as a transponder. Described in detail, the stationary radio-frequency tag communication devices 112 function as first radio-frequency tag communication devices configured to transmit interrogating waves $F_{c1}$, $F_{c2}$, $F_{c3}$, ..., $F_{c12}$ (hereinafter referred to simply as "interrogating waves $F_c$") toward the radio-frequency tags 14, and to receive reply wave (reply signal) $F_r$ transmitted from the radio-frequency tag 14, for thereby effecting radio communication with the radio-frequency tag 14. The portable radio-frequency tag communication device 114 functions as a second radio-frequency tag communication device configured to receive the interrogating waves $F_c$ transmitted from the stationary radio-frequency tag communication devices 112, to transmit a predetermined carrier wave $f_p$ not including a command, toward the radio-frequency tag 14 upon transmission of the reply wave $F_r$ from the radio-frequency tag 14 in response to the interrogating waves $F_c$, and to receive the $F_r$ from the radio-frequency tag 14. The present radio-frequency tag communication system 110 is preferably arranged such that the user of the communication system 110 carrying the portable radio-frequency tag communication device 114 observes views provided on a display 160 of the communication device 114, to detect the radio-frequency tag 14.

Figure 27:
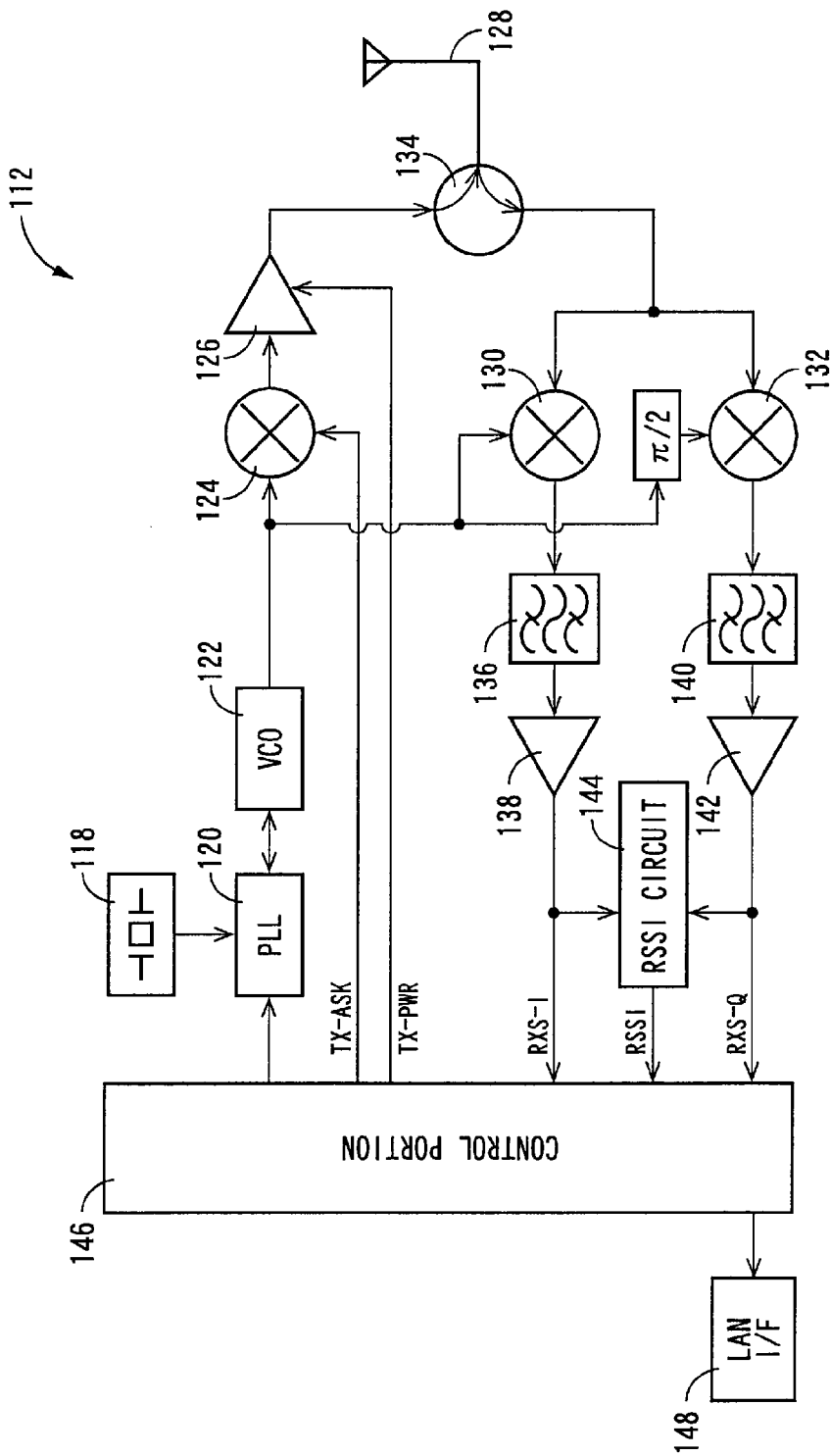
FIG. 27 is a view for explaining an arrangement of a stationary radio-frequency tag communication device provided in the radio-frequency tag communication system of FIG. 26.

FIG. 27 shows an arrangement of each stationary radio-frequency tag communication device 112. This stationary radio-frequency tag communication device 112 is installed (at a fixed position) on a floor, for example, of a room in which the radio communication is effected by the radio-frequency tag communication system 110. As shown in FIG. 27, the stationary radio-frequency tag communication device 112 includes: a reference-frequency generating portion 118 configured to generate a reference frequency for generating a main carrier wave of the above-described interrogating wave $F_c$; a PLL (Phase Locked Loop) 120 configured to set a frequency of the main carrier wave on the basis of a reference wave generated by the reference-frequency generating portion 118 and a control signal received from a control portion 146; a VCO (Voltage Controlled Oscillator) 122 configured to control the frequency of the main carrier wave according to a control voltage received from the PLL 120; a main-carrier modulating portion 124 configured to generate the transmitted signal by amplitude modulation of the main carrier wave having the frequency controlled by the VCO 122, on the basis of a predetermined control signal TX-ASK; a transmitted-signal amplifying portion 126 configured to amplify the transmitted signal generated from the main-carrier modulating portion 124, on the basis of a predetermined control signal TX-PWR; an antenna device 128 which is a transmitter/receiver antenna device having a wide angular range of directivity and configured to transmit the transmitted signal received from the transmitted-signal amplifying portion 126, as the interrogating wave $F_c$ including a desired command, toward the communication object in the form of the radio-frequency tags 14, and to receive the reply wave $F_r$ transmitted from the radio-frequency tag 14 in response to the interrogating wave $F_c$; an I-phase-signal converting portion 130 and a Q-phase-signal converting portion 132 which are configured to convert the received signal received by the antenna device 128, into respective I-phase and Q-phase signals that are perpendicular to each other; a transmission/reception switching portion 134 configured to apply the transmitted signal received from the transmitted-signal amplifying portion 126, to the antenna device 128, and to apply the received signal received from the antenna device 128, to the I-phase-signal and Q-phase-signal converting portions 130, 132; an I-phase-signal BPF (Band Pass Filter) 136 configured to extract only a predetermined frequency band of the I-phase signal received from the I-phase-signal converting portion 130; an I-phase-signal amplifying portion 138 configured to amplify the I-phase signal received from the I-phase-signal BPF 136; a Q-phase-signal BPF 140 configured to extract only a predetermined frequency band of the Q-phase signal received from the Q-phase-signal converting portion 132; a Q-phase-signal amplifying portion 142 configured to amplify the Q-phase signal received from the Q-phase-signal BPF 140; an RSSI circuit (Received-Signal Strength Indicator) 144 configured to detect strengths of the I-phase signal and Q-phase signal respectively received from the I-phase-signal and Q-phase-signal amplifying portions 138, 140; a control portion 146 configured to control the operations of the above-described stationary radio-frequency tag communication devices 112; and a LAN interface 148 for connecting the control portion 146 to a controller 152 (described below) via a LAN cable 150. The transmission/reception switching portion 21 is preferably a circulator or a directional coupler.

The control portion 146 described above is a so-called microcomputer incorporating a CUP, a ROM and a RAM and configured to be operable to perform signal processing operations according to programs stored in the ROM, while utilizing a temporary data storage function of the RAM. The control portion 146 performs basic control operations such as an operation to control transmission of the interrogating wave $F_c$ toward the radio-frequency tag 14, and an operation to receive the reply wave $F_r$ transmitted from the radio-frequency tag 14 in response to the interrogating wave $F_c$. The transmitted signal to be transmitted to the communication object in the form of the radio-frequency tag 14 is an electric wave including an inquiry command asking to "send a reply if the radio-frequency tag 14 has an identification code specified by the inquiry command". If the radio-frequency tag 14 which has received the inquiry command has the identification code specified by the identification code, the radio-frequency tag 14 replies to the inquiry command by transmitting the reply signal.

Figure 28:
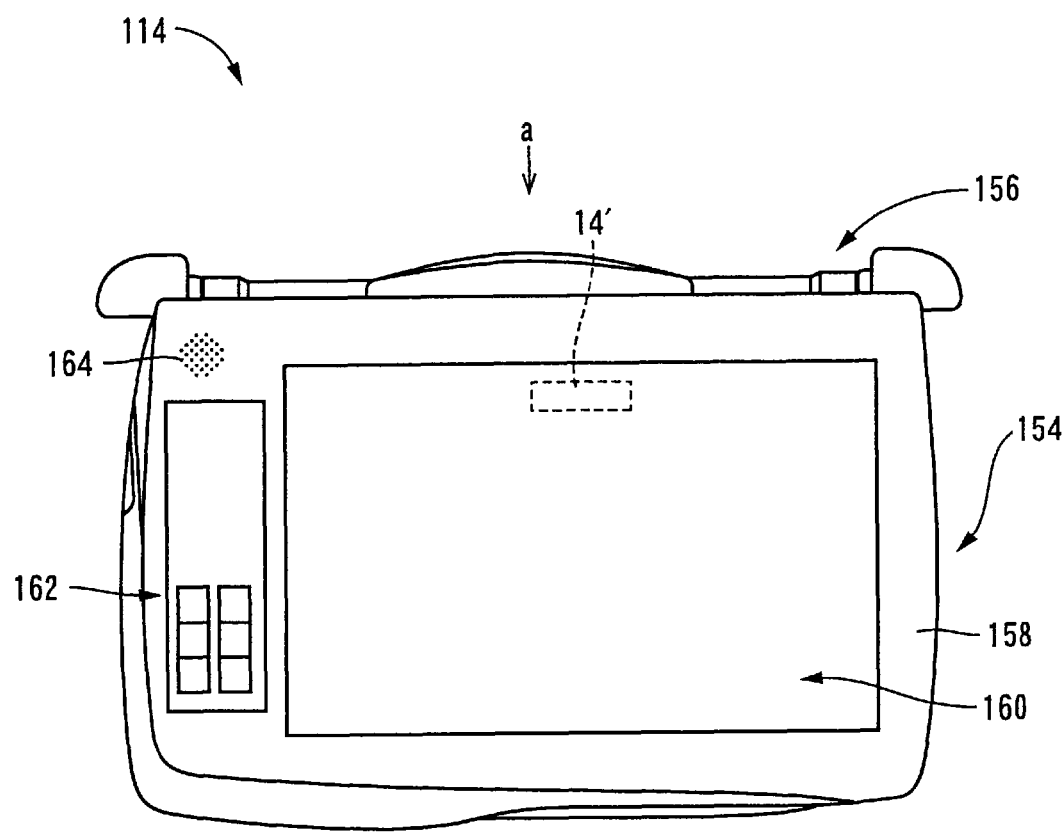
FIG. 28 is a plan view showing an appearance of a portable radio-frequency tag communication device provided in the radio-frequency tag communication device of FIG. 26.
Figure 29:
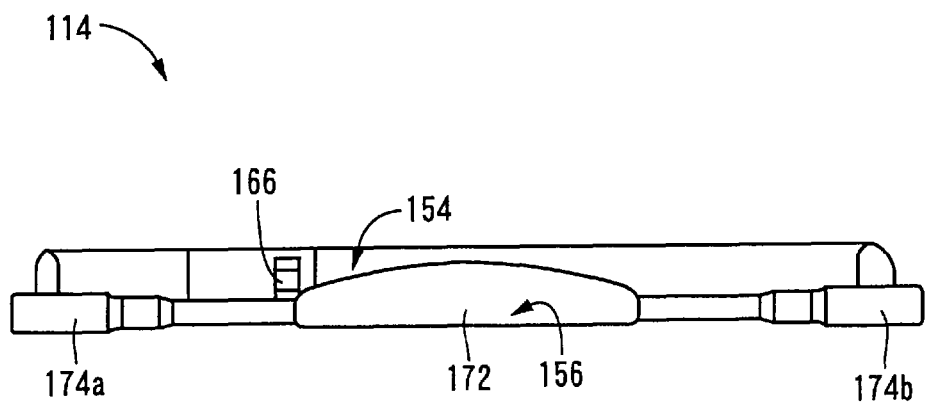
FIG. 29 is a rear view taken in a direction of arrow "a" in FIG. 28.

FIG. 28 is a plan view showing an appearance of the portable radio-frequency tag communication device 114, and FIG. 29 is a rear view taken in a direction of arrow "a" in FIG. 28. As shown in FIGS. 28 and 29, the portable radio-frequency tag communication device 114 consists of a main unit 154, and an antenna unit 156 removably attached to the main unit 154. The main unit 154 includes: a frame 158; a display portion 160 disposed on a flat portion of the frame 158; an operator's control portion 162 disposed in a part of the flat portion, which is on one side of the display portion 160; and a sound generating device 164 in the form of a buzzer, an alarm indicator or a chime speaker. Preferably, an identification radio-frequency tag 14' having the same construction as described above by reference to FIG. 3 is built in the frame 158 or affixed to the rear surface of the frame 158. The operator's control portion 162 is provided with an input device having suitable keys, pushbuttons, switches or pads, which is used to activate the display portion 160 and to detect the radio-frequency tag 14.

The antenna unit 156 includes an antenna element 174a and an antenna element 174b which extend from a unit base 172 in the left and right directions and which constitute a unidirectional array antenna device that receives the interrogating waves $F_c$ transmitted from the stationary radio-frequency tag communication devices 112 and the reply wave $F_r$ transmitted from the radio-frequency tag 14 in response to the interrogating wave $F_c$. The antenna elements 174 are provided as a transmitter/receiver antenna device which also functions as a transmitter antenna device for transmitting the carrier wave $f_p$ toward the radio-frequency tag 14 upon reception of the reply wave $F_r$ from the radio-frequency tag 14. The portable radio-frequency tag communication device 114 provided with the unidirectional antenna device is capable of detecting the radio-frequency tag 14 in a pinpoint fashion, with a so-called "pencil beam" having a narrow angle of directivity.

Figure 30:
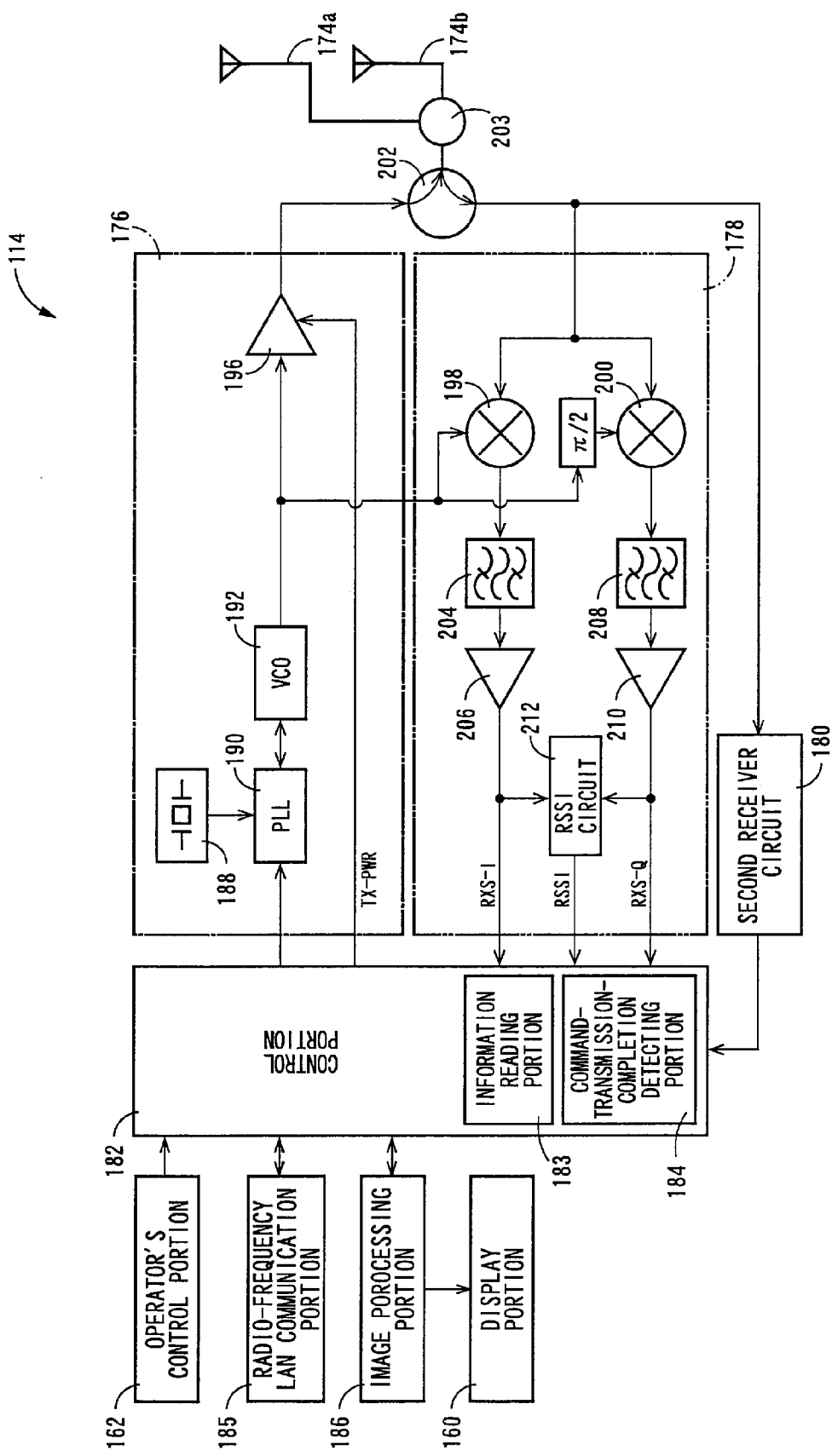
FIG. 30 is a view for explaining an arrangement of the portable radio-frequency tag communication device provided in the radio-frequency tag communication system of FIG. 26.

FIG. 30 shows an arrangement of the portable radio-frequency tag communication device 114. As shown in FIG. 30, the portable radio-frequency tag communication device 114 includes: a transmitter circuit (transmitter portion) 176 configured to transmit the carrier wave $f_p$ toward the radio-frequency tag 14 upon reception of the reply wave $F_r$ from the radio-frequency tag 14; a first receiver circuit (homodyne wave detection circuit) 178 configured to process the reply wave $F_r$ transmitted from the radio-frequency tag 14 in response to the interrogating waves $F_c$ transmitted from the stationary radio-frequency tag communication devices 112; a second receiver circuit (broad-band receiver circuit) 180 configured to receive the interrogating wave $F_c$ transmitted from the stationary radio-frequency tag communication devices 112; a control portion 182 configured to control radio communication with the radio-frequency tag 14 via the transmitter circuit 176, first receiver circuit 178 and second receiver circuit 180; a radio-frequency LAN communication portion 185 configured to connect the control portion 182 to the controller 152 (described below) by radio-frequency LAN communication; and an image processing portion 186 configured to activate the display portion 160 for displaying an image according to a command received from the control portion 182.

The transmitter circuit 176 includes: a reference-frequency generating portion 188 configured to generate a reference frequency of the carrier wave $f_p$; a PLL (Phase Locked Loop) 190 configured to set a frequency of the main carrier wave on the basis of a reference wave generated by the reference-frequency generating portion 188 and a control signal received from the control portion 182; a VCO (Voltage Controlled Oscillator) 192 configured to output the frequency of the main carrier wave according to a control voltage received from the PLL 190; and a transmitted-signal amplifying portion 196 configured to amplify the main carrier wave having the frequency controlled by the VCO 192, on the basis of a predetermined control signal TX-ASK, and to apply the amplified main carrier wave to the antenna elements 174. The transmitted signal transmitted from the transmitted-signal amplifying portion 196 is transmitted from the antenna elements 174 toward the radio-frequency tag 14 via a transmission/reception switching portion 202 and a distributor 203, as the carrier wave $f_p$ not including a command. Where the reply wave $F_r$ transmitted from the radio-frequency tag 14 in response to the interrogating wave $F_c$ transmitted from the stationary radio-frequency tag communication devices 112 has a comparatively low strength or intensity, it would be difficult for the portable radio-frequency tag communication device 114 to receive the reply wave $F_r$ with high sensitivity. However, the portable radio-frequency tag communication device 114 is arranged to transmit the carrier wave $f_p$ so that the reply wave $F_r$ is carried by the carrier wave $f_p$ and can therefore be received with high sensitivity, whereby the received reply wave $F_r$ can be subjected to homodyne wave detection by the first receiver circuit 178. The frequency of the carrier wave $f_p$ transmitted from the transmitter circuit 176 is different from the frequency of the interrogating wave $F_c$ transmitted from the stationary radio-frequency tag communication devices 112. Preferably, a difference between the frequency of the carrier wave $f_p$ transmitted from the transmitter circuit 176 and the frequency of the interrogating wave $F_c$ transmitted from the stationary radio-frequency tag communication devices 112 is not smaller than the frequency of the sub-carrier wave of the radio-frequency tag 14. As described below, the carrier wave $f_p$ not including the command is transmitted when the reply wave is transmitted from the radio-frequency tag 14 after the radio-frequency tag 14 is commanded to transmit the reply wave. Accordingly, the radio-frequency tag 14 does not receive a plurality of commands from the portable radio-frequency tag 114, and transmits the reply wave in response to the plurality of carrier waves $F_c$.

The first receiver circuit 178 includes: an I-phase-signal converting portion 198 and a Q-phase-signal converting portion 200 which are configured to convert the received signal received through the antenna device 174 and the transmission/reception switching portion 202, into respective I-phase and Q-phase signals that are perpendicular to each other; an I-phase-signal BPF (Band Pass Filter) 204 configured to extract only a predetermined frequency band of the I-phase signal received from the I-phase-signal converting portion 198; an I-phase-signal amplifying portion 206 configured to amplify the I-phase signal received from the I-phase-signal BPF 204; a Q-phase-signal BPF 208 configured to extract only a predetermined frequency band of the Q-phase signal received from the Q-phase-signal converting portion 200; a Q-phase-signal amplifying portion 210 configured to amplify the Q-phase signal received from the Q-phase-signal BPF 208; and an RSSI circuit (Received-Signal Strength Indicator) 212 configured to detect strengths of the I-phase signal and Q-phase signal respectively received from the I-phase-signal and Q-phase-signal amplifying portions 206, 210. The output signals of the I-phase-signal amplifying portion 206, Q-phase-signal amplifying portion 210 and RSSI circuit 212 are processed by the above-described control portion 182, to read information of the received signal.

Figure 31:
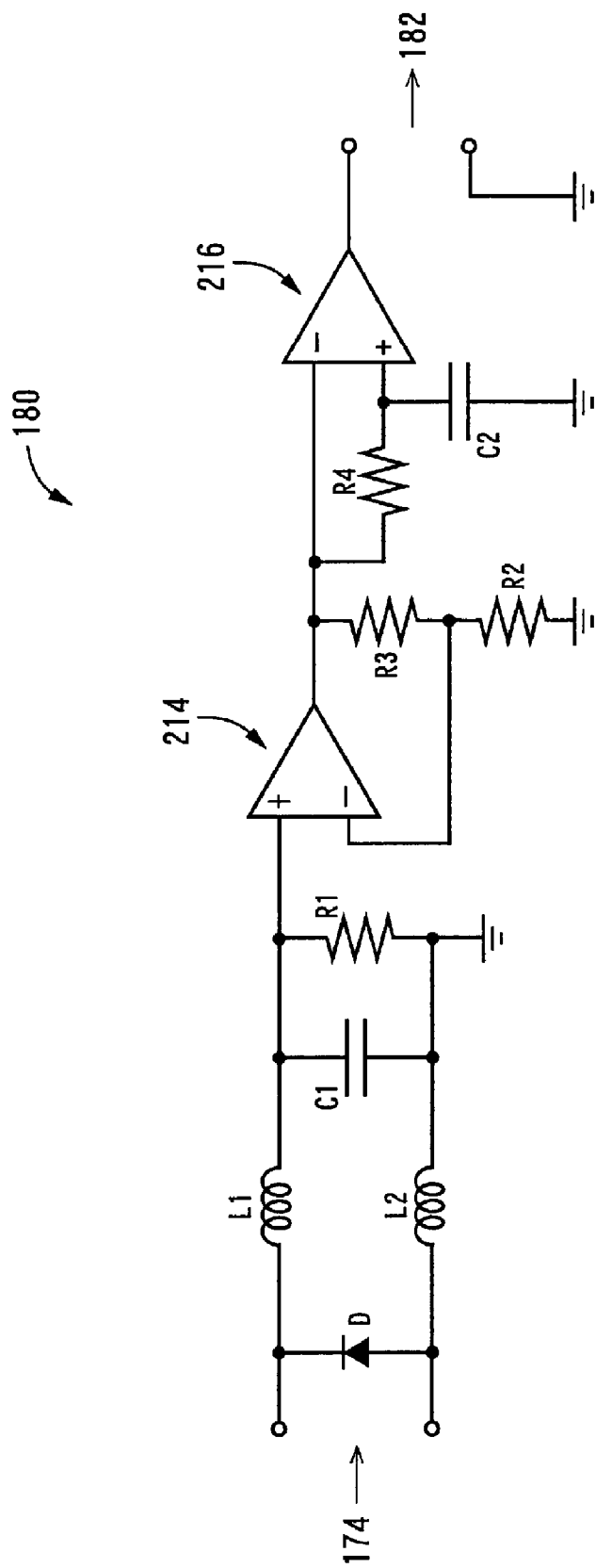
FIG. 31 is a view for explaining an electrical arrangement of a second receiver circuit provided in the portable radio-frequency tag communication device of FIG. 30.

Referring to FIG. 31, there is shown an electrical arrangement of the second receiver circuit 180 described above. As shown in FIG. 31, the second receiver circuit 180 is an envelope detector circuit provided with a first arithmetic amplifier 214 and a second arithmetic amplifier 216. The first arithmetic amplifier 214 has a non-reversal input terminal connected to one element of the antenna device 174 of balanced type through a coil L1. The other element of the antenna device 174 is grounded through a coil L2. One end of each of the coils L1 and L2 which is on the side of the antenna device 174 is connected to a rectifier D. Between the coil L1 and the non-reversal input terminal of the first arithmetic amplifier 214, there are connected a capacitor C1 and a resistor R1 in parallel with each other. The capacitor C1 and the resistor R1 are grounded. The first arithmetic amplifier 214 has a reversal input terminal which is grounded through a resistor R2, and an output terminal connected to a non-reversal input terminal of the second arithmetic amplifier 216. Between the output terminal of the first arithmetic amplifier 214 (the reversal input terminal of the second arithmetic amplifier 216) and the reversal input terminal of the first arithmetic amplifier 214, there is provided a resistor R3. The output terminal of the first arithmetic amplifier 214 is connected to a non-reversal input terminal of the second arithmetic amplifier 216 through a resistor R4. The non-reversal input terminal of the second arithmetic amplifier 214 is grounded through a capacitor C2. The second arithmetic amplifier 216 has an output terminal connected to the control portion 182. The second receiver circuit 180 has a broad-band frequency characteristic, and does not have a tuning circuit, and is therefore capable of detecting the interrogating waves $F_c$ transmitted from the stationary radio-frequency tag communication devices 112, as long as the interrogating waves $F_c$ have an electric field strength higher than a predetermined threshold, even when the reception frequency of the second receiver circuit 180 is not coincident with the frequency of the interrogating waves $F_c$. Thus, the radio-frequency tag 14 to which the interrogating wave $F_c$ has been transmitted from the stationary radio-frequency tag communication device 112 can be detected. If the radio-frequency tag 14 with which radio communication is to be effected by the portable radio-frequency tag communication device 114 is identical with the radio-frequency tag 14 to which the interrogating wave $F_c$ has been transmitted from the stationary radio-frequency tag communication device 112, the carrier wave $f_p$ is transmitted from the transmitter circuit 176 so that the reply wave can be received with improved sensitivity owing to the homodyne wave detection by the first receiver circuit 178.

The control portion 182 described above is a so-called microcomputer incorporating a CUP, a ROM and a RAM and configured to be operable to perform signal processing operations according to programs stored in the ROM, while utilizing a temporary data storage function of the RAM. The control portion 182 performs basic control operations such as an operation to detect the radio-frequency tag 14 and an operation to process the reply wave Fr transmitted from the radio-frequency tag 14, according to commands received from the controller 152 described below. The control portion 812 includes, as its functional portions, an information reading portion 183 and a command-transmission-completion detecting portion 184. The information reading portion 183 is configured to read information from the radio-frequency tag 14 by receiving the reply wave $F_r$ which is transmitted from the radio-frequency tag 14 in response to the interrogating waves $F_c$ transmitted from another radio-frequency tag communication device in the form of the stationary radio-frequency tag communication device 112. The command-transmission-completion detecting portion 184 is configured to determine whether the transmission of a command portion of the interrogating wave $F_c$ is completed. These functional portions permit an information reading control to read the information received from the radio-frequency tag 14, by receiving the reply wave $F_r$ transmitted from the radio-frequency tag 14 in response to the interrogating wave $F_c$ transmitted from the stationary radio-frequency tag 112, and a carrier-wave transmission control to transmit the carrier wave $f_p$ not including a command, through the transmitter circuit 176, at the timing when the reply wave $F_r$ is received from the radio-frequency tag 14. Described in detail, when the command-transmission-completion detecting portion 184 has detected the completion of transmission of the command portion, the carrier wave $f_p$ is transmitted toward the radio-frequency tag 14. The carrier wave $f_p$ is an electric wave which induces generation of the reply wave $F_r$ (reply signal) from the radio-frequency tag 14, and which does not include a command inquiring the radio-frequency tag 14. Therefore, the carrier wave $f_p$ does not interfere with the interrogating wave $F_c$ transmitted from the stationary radio-frequency tag communication device 112.

Figure 32:
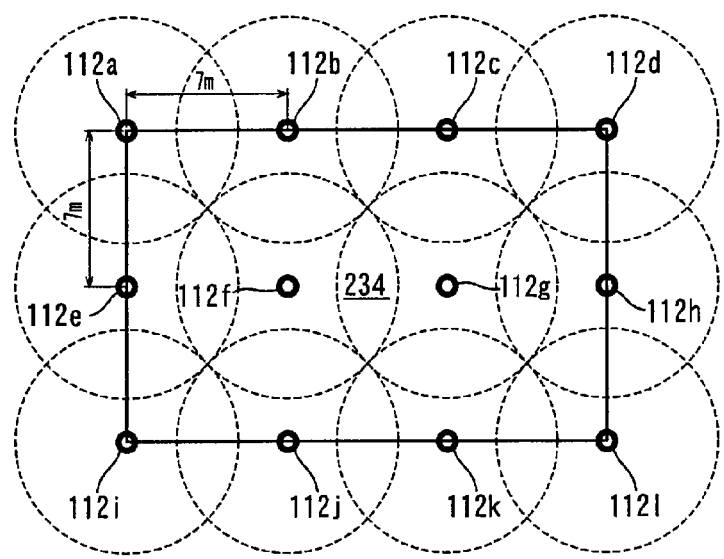
FIG. 32 is a view for explaining a plurality of stationary radio-frequency tag communication devices disposed in a certain room.

FIG. 32 shows the plurality of stationary radio-frequency tag communication devices 112a-112l disposed in a certain room 234. Since the radio-frequency tag 14 used in the present embodiment is a passive tag using a UHF band, a maximum distance of communication of each stationary radio-frequency tag communication device 112 functioning as an interrogator is usually about 3-5 m. In the specific example of FIG. 32, the stationary radio-frequency tag communication devices 112a-112l having the maximum distance of communication of 5 m are disposed in the room 234 having dimensions of 14 m×21 m, in a 3×4 matrix pattern, with the antenna devices 128 being spaced from each other by 7 m. The antenna device 128 of each stationary radio-frequency tag communication device 112 has a wide angle of directivity, so that the areas of communication of the twelve stationary radio-frequency tag communication devices 112 cover the entire area in the room 234, as shown in FIG. 32.

Figure 33:
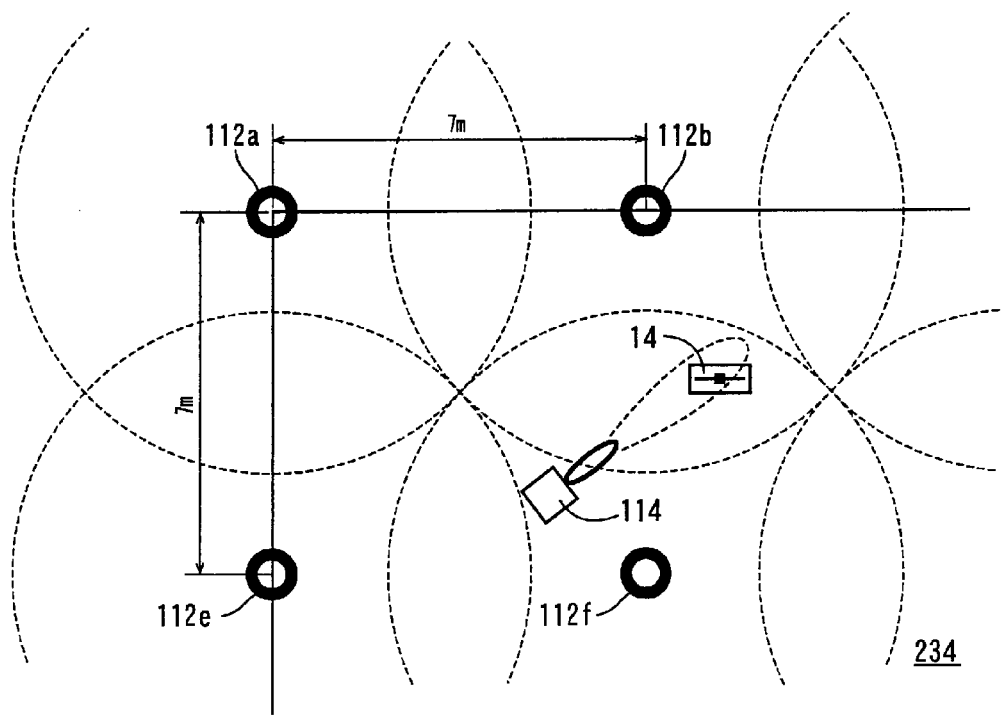
FIG. 33 is a fragmentary view showing in enlargement a portion of the view of FIG. 32.

Referring to the fragmentary view of FIG. 33, there is shown in enlargement a portion of the view of FIG. 32. In the present radio-frequency tag communication system 110, the position of the radio-frequency tag 14 is first roughly detected by the plurality of stationary radio-frequency tag communication devices 112, and is then precisely detected by the portable radio-frequency tag communication device 114, as indicated in FIG. 33. The portable radio-frequency tag communication device 114 which has the unidirectional antenna device 174 has an area of communication which is narrower than that of each stationary radio-frequency tag communication device 112, and has a narrow angular range of directivity, so that the portable radio-frequency tag communication device 114 can detect the position of the radio-frequency tag 14 in a pinpoint fashion. For instance, the portable radio-frequency tag communication device 114 can detect the position of the radio-frequency tag 14 which is accommodated in a drawer of a desk (not shown) placed in the room 234.

Figure 34:
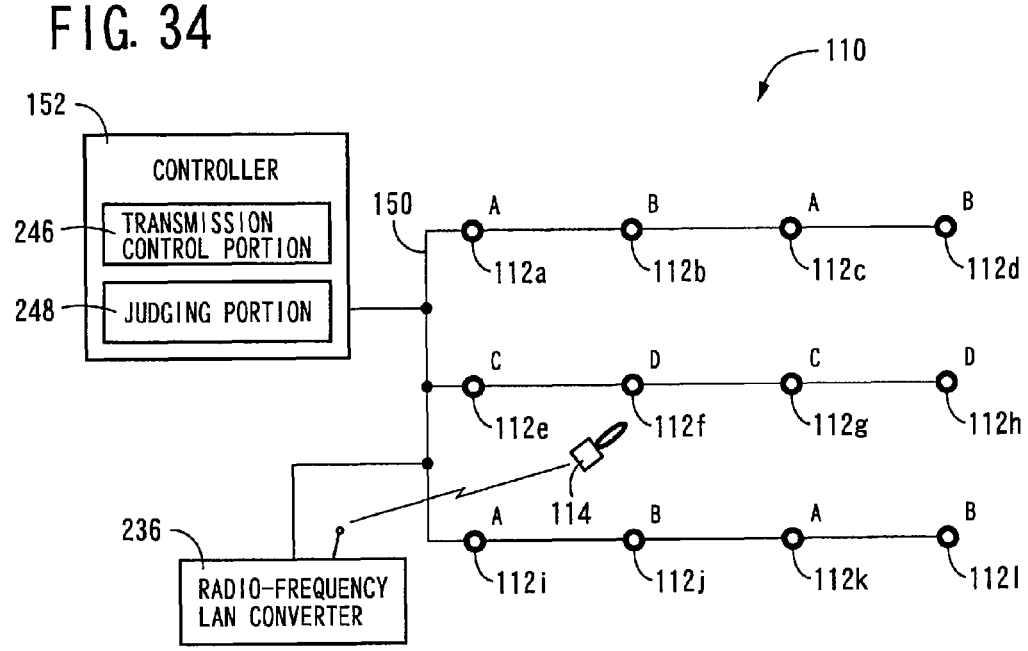
FIG. 34 is a view for explaining a controller for controlling the radio-frequency tag communication system of FIG. 26.
Figure 35:
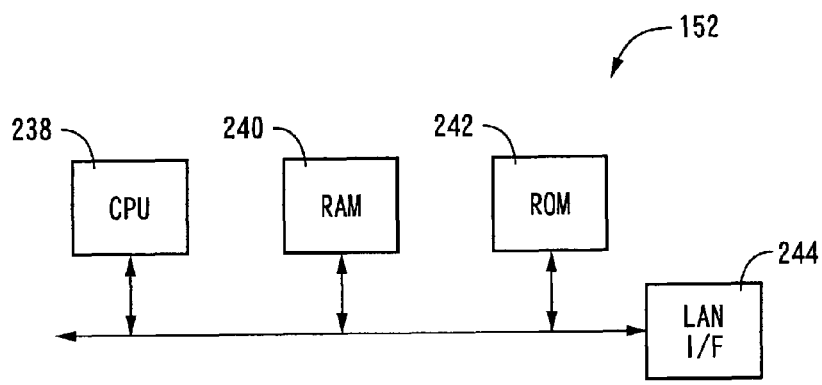
FIG. 35 is a view for explaining an arrangement of the controller of FIG. 34.

FIG. 34 shows the controller 152 for controlling the radio-frequency tag communication system 110, and FIG. 35 shows an arrangement of the controller 152. As shown in FIGS. 34 and 35, the controller 152 of the radio-frequency tag communication system 110 includes a CPU 238, a RAM 240, a ROM 242 and a LAN interface 244, and is configured to perform signal processing operations according to programs stored in the Rom 242, while utilizing a temporary data storage function of the RAM 240. The controller 152 is connected to the plurality of stationary radio-frequency tag communication devices 112 through the LAN cable 150, and is capable of radio communication with the stationary radio-frequency tag communication devices 112. The controller 152 is further capable of radio-frequency LAN communication with the portable radio-frequency tag communication device 114 through a radio-frequency LAN converter 236. The controller 152 arranged as described above controls the plurality of radio-frequency tag communication devices 112 and the portable radio-frequency tag communication device 114, for thereby controlling the radio-frequency tag communication system 110 in a coordinated fashion to detect the radio-frequency tag 14. To this end, the controller 152 includes, as its functional portions, a transmission control portion 246 and a judging portion 248, as shown in FIG. 34. The transmission control portion 246 is configured to control the transmission of the transmitted signals from the stationary and portable radio-frequency tag communication devices 112, 114, and the judging portion 248 is configured to determine whether the identification radio-frequency tag 14' provided on the portable radio-frequency tag communication device 14 and the radio-frequency tag 14 are located in the area of communication of any one of the plurality of stationary radio-frequency tag communication devices 112.

Figure 36:
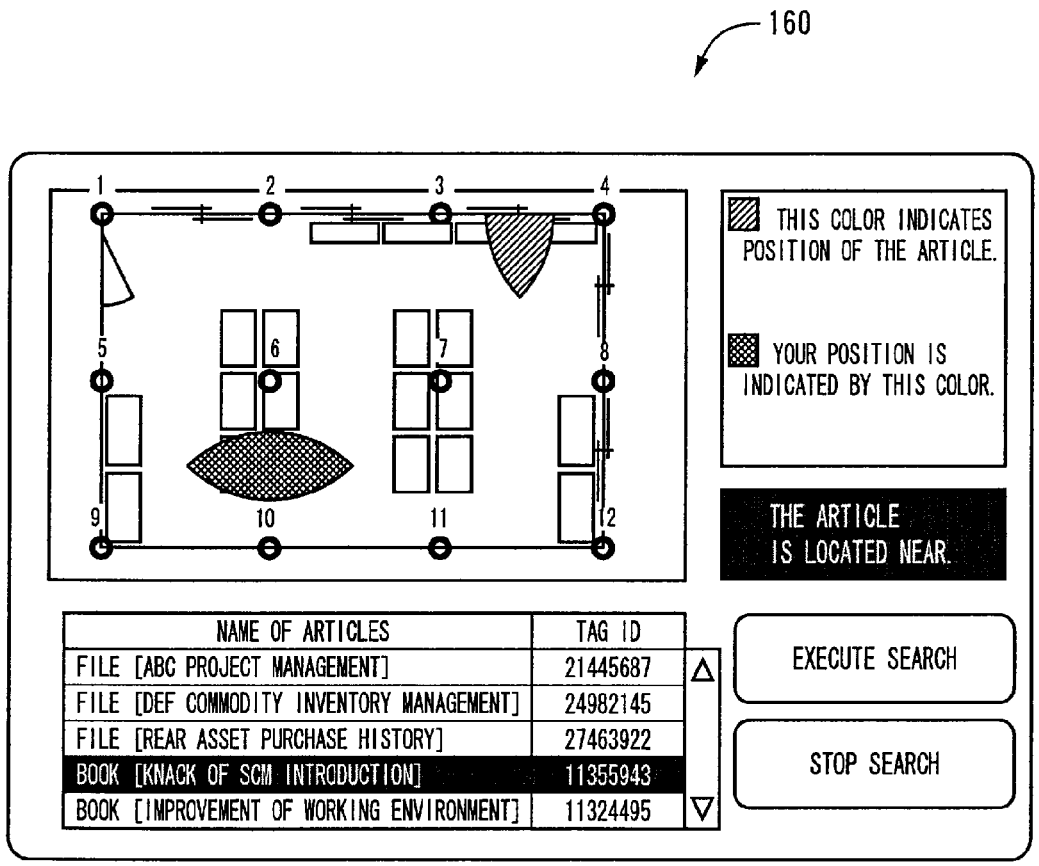
FIG. 36 is a view illustrating a radio-frequency tag search view provided on a display portion of the portable radio-frequency tag communication device of FIG. 30.

FIG. 36 illustrates a radio-frequency tag search view provided on the display portion 160 of the portable radio-frequency tag communication device 114. The controller 152 stores map information of the room 234, information indicative of the number and groups of the stationary radio-frequency tag communication devices 112, and information of the identification radio-frequency tag 14' provided on the portable radio-frequency tag communication device 114. The controller 152 controls the image processing portion 186 of the portable radio-frequency tag a communication device 114, to provide the radio-frequency tag search view on the display portion 160, as shown in FIG. 36. The desired one of a plurality of radio-frequency tags 14 can be specified or selected as the communication object, according to a command manually entered through the operator's control portion 162 of the portable radio-frequency tag communication device 114. The thus entered command is transmitted to the controller 152, to start the search for the specified radio-frequency tag 14. Namely, the display portion 160 functions as a display portion operable to indicate the direction in which the specified radio-frequency tag 14 is located. The operator-s control portion 172 functions as an input portion manually operable to specify the radio-frequency tag 14 to be searched for.

For searching for the specified radio-frequency tag 14, the stationary radio-frequency tag communication devices 112 detect the approximate positions of the specified radio-frequency tag 14 and the identification radio-frequency tag 14' provided on the portable radio-frequency tag 114, and transmits information on the detected approximate positions to the controller 152. Upon reception of the information, the controller 152 controls the portable radio-frequency tag communication device 114 to provide the radio-frequency tag search view, that is, to display the map of the room 234 through the image processing portion 186, and information indicative of a relative position between the specified radio-frequency tag 14 and the identification radio-frequency tag 14' of the portable radio-frequency tag communication device 114. The user carrying the portable radio-frequency tag communication device 114 and observing the radio-frequency tag search view is navigated to a position close to the specified radio-frequency tag 14. When it is determined that the portable radio-frequency tag communication device 114 is located close to the specified ratio-frequency tag 14, that is, when the judging portion 248 obtains an affirmative determination, the controller 152 activates the sound generating device 164 of the portable radio-frequency tag communication device 114 to generate a suitable sound for thereby informing the user that the specified radio-frequency tag 14 is located near the user. Namely, the sound generating portion 164 functions as an indicator portion operable to provide a predetermined indication when the affirmative determination is obtained by the judging portion 248. The display portion 160 providing the radio-frequency tag search view functions as a visual indicator portion operable to visually indicating that the specified radio-frequency tag 14 is located near the user.

Figure 37:
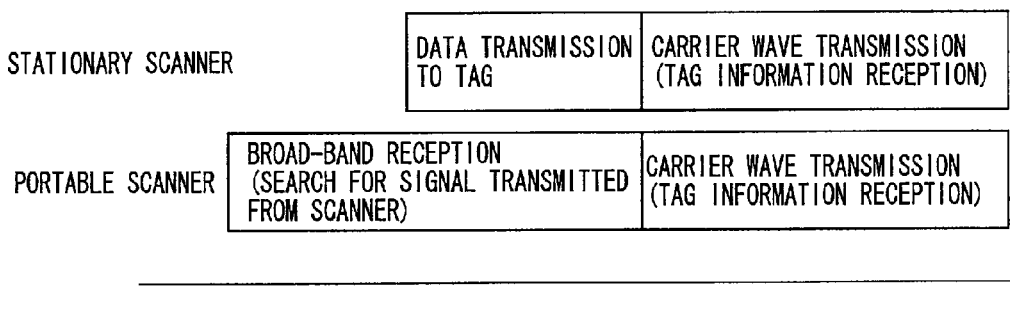
FIG. 37 is a view schematically illustrating communication with the radio-frequency tag in the radio-frequency tag communication system of FIG. 26.

FIG. 37 schematically illustrates communication with the radio-frequency tag 14 in the radio-frequency tag communication system 110. For communication with the radio-frequency tag 14 in the radio-frequency tag communication system 110, the stationary radio-frequency tag communication devices 112 transmit the interrogating waves $F_c$, and the portable radio-frequency tag communication device 114 searches for the interrogating waves $F_c$ transmitted from the stationary radio-frequency tag communication devices 112. The interrogating waves $F_c$ are demodulated by the second receiver circuit 180, and the modulated interrogating waves $F_c$ are applied to the control portion 182. The reply wave $F_r$ is transmitted from the radio-frequency tag 14 in response to the interrogating wave $_{Fc}$ transmitted from each stationary ratio-frequency tag communication device 112, and is received by the stationary ratio-frequency tag communication device 112 and the portable radio-frequency tag communication device 114. The interrogating wave $F_c$ is continuously transmitted from the stationary radio-frequency communication device 112, and the carrier wave $f_p$ is transmitted from the transmitter circuit 176 of the portable radio-frequency tag communication device 114.

Figure 38:
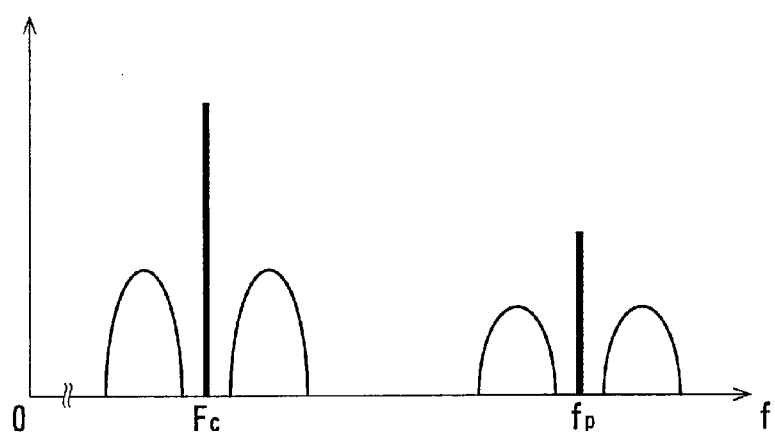
FIG. 38 is a view indicating a frequency distribution of a reply wave transmitted from the radio-frequency tag of FIG. 3 when an interrogating wave is transmitted from the stationary radio-frequency tag communication device of FIG. 27 while a carrier wave transmitted from the portable radio-frequency tag communication device of FIG. 30.

FIG. 38 indicates a frequency distribution of the reply wave $F_r$ transmitted from the radio-frequency tag 14 when the interrogating wave $F_c$ is transmitted from the stationary radio-frequency tag communication device 112 while the carrier wave $f_p$ is transmitted from the portable radio-frequency tag communication device 114. As indicated in FIG. 38, the reply wave $F_r$ transmitted from the radio-frequency tag 14 has side bands of a modulated sub-carrier wave on the respective higher and lower sides of the frequency of each of the interrogating wave $F_c$ and the carrier wave $f_p$. If the side bands of the interrogating wave $F_c$ and the side bands of the carrier wave $f_p$ overlapped each other, the radio communication of the stationary radio-frequency tag communication device 112 and the radio communication of the portable radio-frequency communication device 114 would interfere with each other. In the present embodiment, however, the frequency of the carrier wave $f_p$ transmitted from the transmitter circuit 176 of the portable radio-frequency tag communication device 114 is different from the frequency of the interrogating wave $F_c$ transmitted from the stationary radio-frequency tag communication device 112, and a difference between these two frequencies is not smaller than a value two times the frequency of the sub-carrier wave of the radio-frequency tag 14, the overlapping of the side bands of the interrogating wave $F_c$ and the side bands of the carrier wave $f_p$ is effectively prevented, as indicated in FIG. 38, and the interference between the radio communication of the stationary radio-frequency tag communication device 112 and the radio communication of the portable radio-frequency communication device 114 is effectively prevented.

Figure 39:
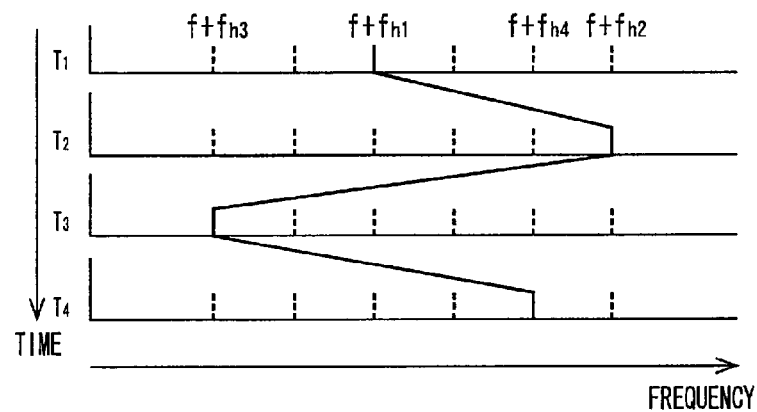
FIG. 39 is a view for explaining frequency hopping of the carrier wave transmitted from a transmitter circuit of the portable radio-frequency tag communication device of FIG. 30.

The transmitter circuit 176 of the portable radio-frequency tag communication device 114 is preferably arranged to change the frequency of the carrier wave $f_p$ over a wide range of frequency, by a frequency hopping method according to a predetermined pattern of hopping. FIG. 39 explains the frequency hopping of the carrier wave $f_p$. As shown in FIG. 39, the frequency of the carrier wave $f_p$ is changed with the time such that the frequency is equal to $f+f_{h1}$ at a point of time T1, $f+f_{h2}$ at a point of time T2, $f+f_{h3}$ at a point of time T3, and $f+f_{h4}$ at a point of time T4. Thus, the frequency of the carrier wave $f_p$ is changed during reception of the reply wave $F_r$ from the radio-frequency tag 14, for reducing the possibility of the frequency overlapping between the interrogating wave $F_c$ transmitted from the stationary radio-frequency tag communication device 112 and the carrier wave $f_p$ transmitted from the portable radio-frequency tag communication device 114.

Figure 40:
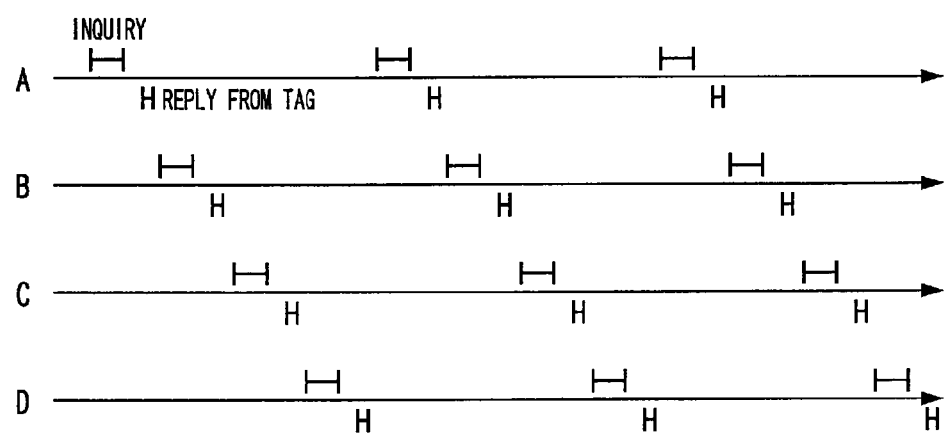
FIG. 40 is a view for explaining the timing of transmission of the transmitted signals from the plurality of radio-frequency tag communication devices of FIG. 27.

FIG. 40 explains the timing of transmission of the transmitted signals from the plurality of radio-frequency tag communication devices 112. The transmission control portion 246 described above controls the transmission of the transmitted signals from the plurality of stationary radio-frequency tag communication devices 112 so as to prevent an interference between the transmitted signals. Described in detail, the transmission control portion 246 controls the plurality of stationary radio-frequency tag communication devices 112 such that the interrogating waves Fc are transmitted from the stationary radio-frequency tag communication devices 112a, 112c, 112i and 112k belonging to a group A, at a time slot A, from the stationary radio-frequency tag communication devices 112b, 112d, 112j and 112l belonging to a group B, at a time slot B, from the stationary radio-frequency tag communication devices 112 112e and 112g belonging to a group C, at a time slot C, and from the stationary radio-frequency tag communication devices 112f and 112h belonging to a group D, at a time slot D. With the interrogating waves $F_c$ being transmitted at the timing described above, the interference between the interrogating waves $F_c$ transmitted by the mutually adjacent stationary radio-frequency tag communication devices 112 can be suitably avoided, making it possible to efficiently search for the specified radio-frequency tag 14. The stationary radio-frequency tag communication devices 112 are controlled to transmit the transmitted signals toward not only the specified radio-frequency tag 14, but also the identification radio-frequency tag 14' provided on the portable radio-frequency tag communication device 114. to search for the specified ratio-frequency tag 14, therefore, the transmission of the transmitted signal from each stationary radio-frequency tag communication device 112 is effected two times, with respective inquiry commands including respective different identification codes which identify the specified radio-frequency tag 14 and the identification radio-frequency tag 14'.

The transmitter circuit 176 of the portable radio-frequency tag communication device 114 is preferably configured to transmit the carrier wave $f_p$ in synchronization with the transmission of the interrogating wave $F_c$ from the stationary radio-frequency tag communication device 112. Where the radio-frequency tag 14 is transmitting the reply wave $F_r$ in response to the interrogating wave $F_c$ transmitted from the stationary radio-frequency tag communication device 112 belong to the group A indicated in FIG. 40, for example, that is, where the interrogating wave $F_c$ transmitted from the stationary radio-frequency tag communication device 112 belonging to the group A is received by the second receiver circuit 180, for example, the transmitter circuit 176 transmits the carrier wave $f_p$ at the time slot A. Similarly, where the radio-frequency tag 14 is transmitting the reply wave $F_r$ in response to the interrogating wave $F_c$ transmitted from the stationary radio-frequency tag communication device 112 belong to the group B, that is, where the interrogating wave $F_c$ transmitted from the stationary radio-frequency tag communication device 112 belonging to the group B is received by the second receiver circuit 180, the transmitter circuit 176 transmits the carrier wave $f_p$ at the time slot B. Where the radio-frequency tag 14 is transmitting the reply wave $F_r$ in response to the interrogating wave $F_c$ transmitted from the stationary radio-frequency tag communication device 112 belong to the group C, that is, where the interrogating wave $F_c$ transmitted from the stationary radio-frequency tag communication device 112 belonging to the group C is received by the second receiver circuit 180, the transmitter circuit 176 transmits the carrier wave $f_p$ at the time slot C. Where the radio-frequency tag 14 is transmitting the reply wave $F_r$ in response to the interrogating wave $F_c$ transmitted from the stationary radio-frequency tag communication device 112 belong to the group D, that is, where the interrogating wave $F_c$ transmitted from the stationary radio-frequency tag communication device 112 belonging to the group D is received by the second receiver circuit 180, the transmitter circuit 176 transmits the carrier wave $f_p$ at the time slot D. This control of the portable radio-frequency tag communication device 114 in synchronization with the operation of the stationary radio-frequency tag communication device 112 is implemented according to a command received from the controller 152. Thus, the reply wave $F_r$ is transmitted from the transmitter circuit 176 in synchronization with the transmission of the interrogating wave $F_c$ and the consequent transmission of the reply wave $F_r$ from the specified radio-frequency tag 14, in order to reduce the possibility of the frequency overlapping between the interrogating wave $F_c$ and the carrier wave $f_p$, whereby the sensitivity of reception of the replay wave Fr can be effectively improved.

Figure 41:
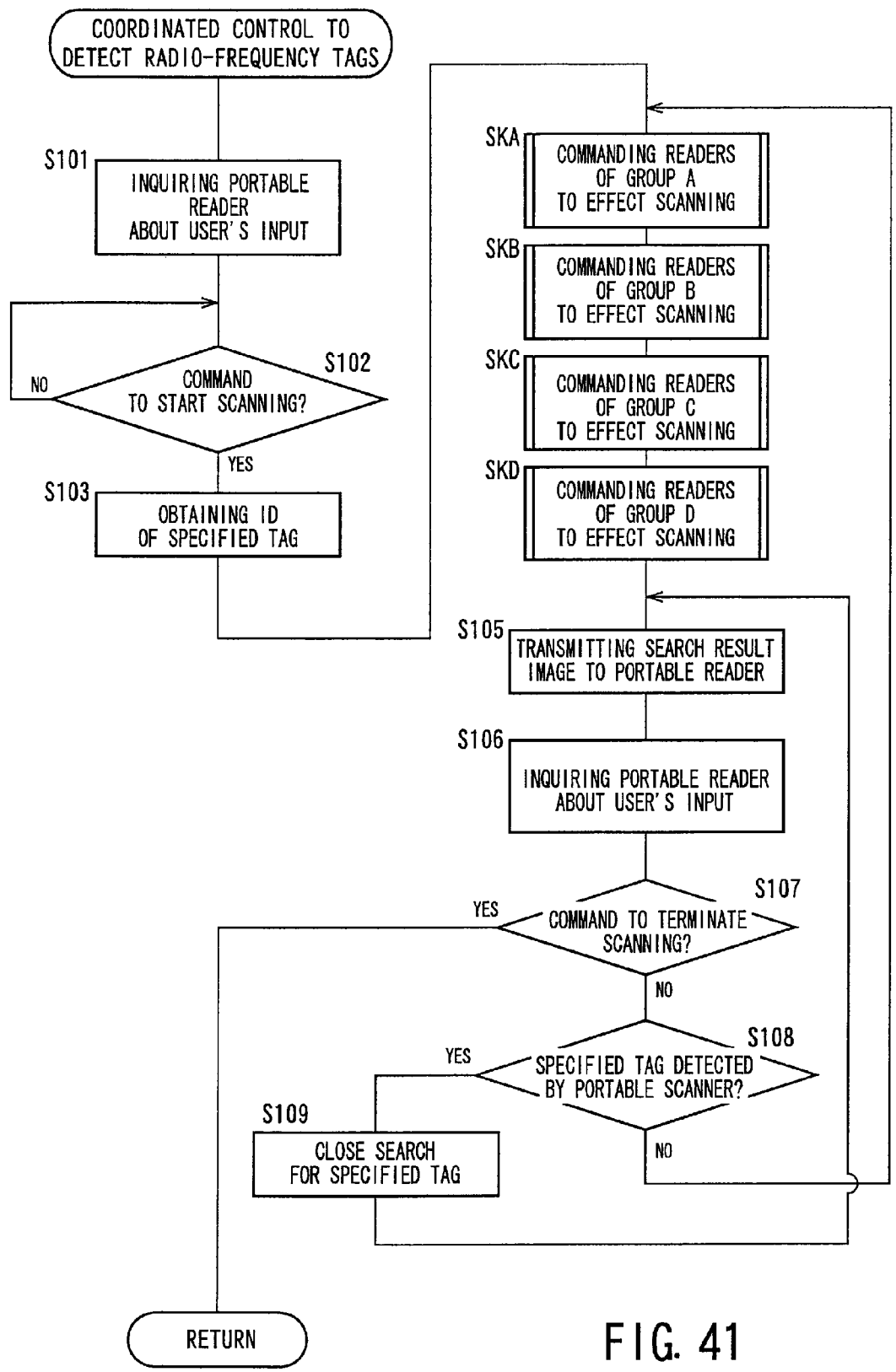
FIG. 41 is a flow chart illustrating a coordinated radio-frequency tag detecting control performed by a CPU of the controller of FIG. 35.

Referring to the flow chart of FIG. 41, there will be described a coordinated radio-frequency tag detecting control performed by the CPU 238 of the controller 152. This control routine is repeated executed with a predetermined cycle time.

This control routine is initiated with step S101 ("step" being hereinafter omitted) to inquire the user about an input to the portable radio-frequency tag communication device 114 (handy reader). Then, the control flow goes to S102 to determine whether a command to start the search for the radio-frequency tag 14 has been generated. If an affirmative determination is obtained in S102, the control flow goes to S103 to obtain an identification code of the radio-frequency tag 114 specified through the operator's control portion 114 of the portable radio-frequency tag communication device 114. The control flow then goes to SKX of FIG. 42 in which the approximate position of the specified radio-frequency tag 14 is detected by the stationary radio-frequency tag communication devices 112 belonging to the group X. Namely, SKA is initially implemented to control the stationary radio-frequency tag communication devices 112a, 112c, 112i and 112k belonging to the group A, for performing a search for the radio frequency tag 14. Then, SKB is implemented to control the stationary radio-frequency tag communication devices 112b, 112d, 112j and 112l belonging to the group B, for performing the search for the radio-frequency tag 14. The control flow then goes to SKC to control the stationary radio-frequency tag communication devices 112e and 112g belonging to the group C, for performing the search for the radio-frequency tag 14, and then goes to SKD to control the stationary radio-frequency tag communication devices 112f and 112h belonging to the group D, for performing the search for the radio-frequency tag 14. The control flow then goes to S105 in which a result of the search for the radio-frequency tag 14 is transmitted to the portable radio-frequency tag communication device 114, and is displayed on the display portion 160 through the image processing portion 186. Then, S106 is implemented to inquire the portable radio-frequency tag communication device 114 about an input by the user. Then, S107 is implemented to determine whether a command to terminate the search for the radio-frequency tag 14 has been generated. If a negative determination is obtained in S107, the control flow goes to S108 to determine whether the specified tag 14 has been detected by the handy scanner. If a negative determination is obtained in S108, the control flow goes back to SKA and the subsequent steps. If an affirmative determination is obtained in S108, the control flow goes to S109 to transmit a command for instructing only the stationary radio-frequency tag communication devices 112 near the specified radio-frequency tag 14, to make a close search for the specified radio-frequency tag 14. When the portable radio-frequency tag communication device 114 receives this command, the portable communication device 114 transmits the predetermined carrier wave $f_p$, and detects the radio-frequency tag 14 responding to the command. After implementation of S109, the control goes back to S105 and the subsequent steps. It will be understood that SKX and S109 correspond to the operation of the transmission control portion 246.

Figure 42:
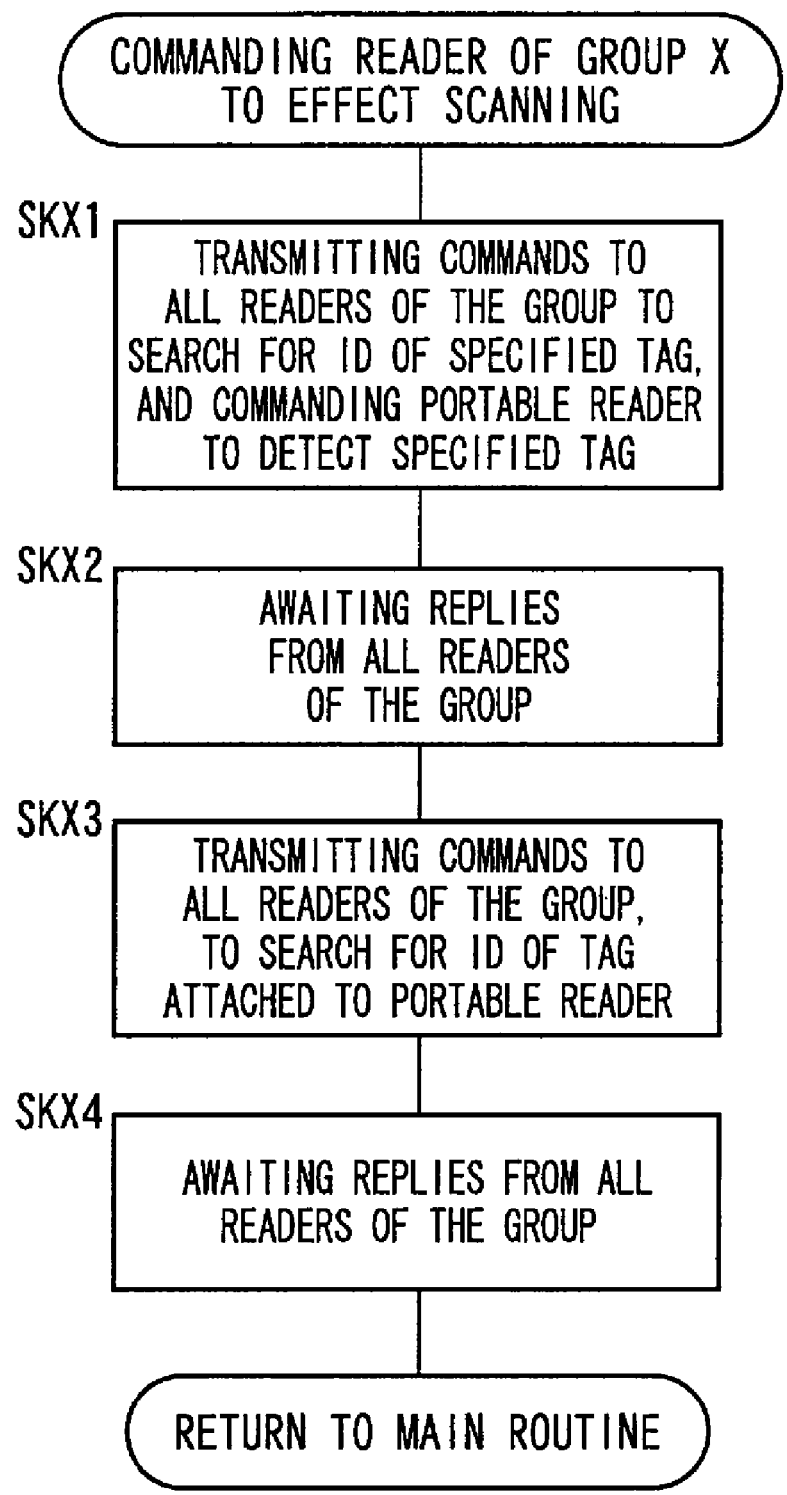
FIG. 42 is a flow chart illustrating a portion of the radio-frequency tag detecting operation of FIG. 41 to control signal transmission from the stationary radio-frequency tag communication devices.

The control in SKX of FIG. 42 is initiated with SKX1 ("X" representing one of the groups A, B, C and D; the same applied to SKX2-SKX4 described below) to transmit commands to all stationary radio-frequency tag communication devices 112 belonging to the group X, to search for the identification code of the specified radio-frequency tag 14. Then, the control flow goes to SKX2 to await replies from the stationary radio-frequency tag communication devices 112 belonging to the group X. Then, SKX3 is implemented to transmit commands to all stationary radio-frequency tag communication devices 12 belonging to the group X, to search for the identification code of the identification tag 14' provided on the portable radio-frequency tag communication device 114. Then, the control flow goes to SKX4 to await replies from the stationary radio-frequency tag communication devices 112 belonging to the group X, and returns to S4 of the main routine. When the portable radio-frequency tag communication device 114 receives the command, the portable communication device 114 transmits the predetermined carrier wave $f_p$, and detects the specified radio-frequency tag 14 responding to the command.

Figure 43:
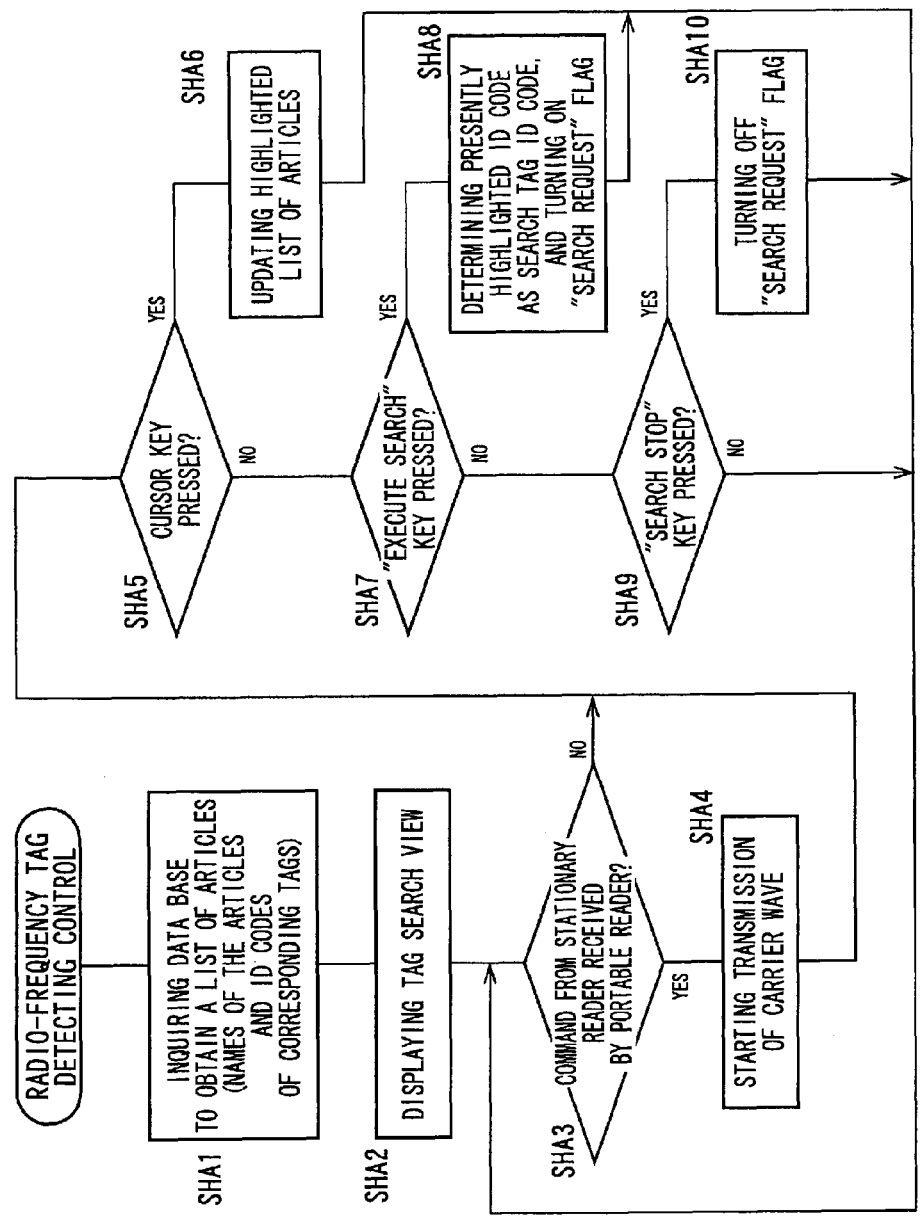
FIG. 43 is a flow chart illustrating a radio-frequency tag detecting operation of the control portion of the portable radio-frequency tag communication device of FIG. 30.

The flow chart of FIG. 43 illustrates a radio-frequency tag detecting control executed by the control portion 182 of the portable radio-frequency tag communication device 114. This control routine is repeated executed with a predetermined cycle time.

This control routine is initiated with SHA1 to inquire a suitable data base for obtaining a list of articles corresponding to the radio-frequency tags 14 (a list of names of the articles, and identification codes of the radio-frequency tags 14 attached to the articles). Then, the control flow goes to SHA2 to activate the display portion 160 to provide the radio-frequency tag search view as shown in FIG. 35. The control flow goes to SHA3 corresponding to the command-transmission-completion detecting portion 184, to determine whether the interrogating wave $F_c$ which is generated by the stationary radio-frequency tag communication device 112 and which includes the command to detect the specified radio-frequency tag 14 has been received. If an affirmative determination is obtained in SHA3, the control flow goes to SHA4 corresponding to the transmitter circuit 176 and the information reading portion 183, to start the transmission of the carrier wave $f_p$ to the specified radio-frequency tag 14, for reading information from the radio-frequency tag 14, and then goes to SHA5 and the subsequent steps. If a negative determination is obtained in SHA3, the control flow goes to SHA5 to determine a predetermined cursor key on the operator's control portion 162 has been pressed. If an affirmative determination is obtained in SHA5, the control flow goes to SHA6 in which the highlighted list of articles provided on the display portion 160 is updated, and then goes to SHA3 and the subsequent steps. If a negative determination is obtained in SHA5, the control flow goes to SHA7 to determine whether a "EXECUTE SEARCH" key on the operator's control portion 162 has been pressed. If an affirmative determination is obtained in SHA7, the control flow goes to SHA8 in which the identification code presently indicated on the display portion 160 is determined as the identification code of the radio-frequency tag 14 to be searched for, and a "SEARCH REQUEST" flag is turned on. Then, the control flow goes back to SH3 and the subsequent steps. If a negative determination is obtained in SHA7, the control flow goes to SHA9 to determine whether a "STOP SEARCH" key on the operator's control portion 162 has been pressed. If an affirmative determination is obtained in SHA9, the control flow goes to SHA10 in which the SEARCH REQUEST" flag is turned off, and then goes back to SHA3 and the subsequent steps. If a negative determination is obtained in SHA9, the control flow goes back to SHA3 and the subsequent steps. It will be understood that SHA2, SHA6, SHA8 and SHA10 correspond to the display portion 160, while SHA5, SHA7 and SHA9 correspond to the operation of the operator's control portion 162.

Figure 44:
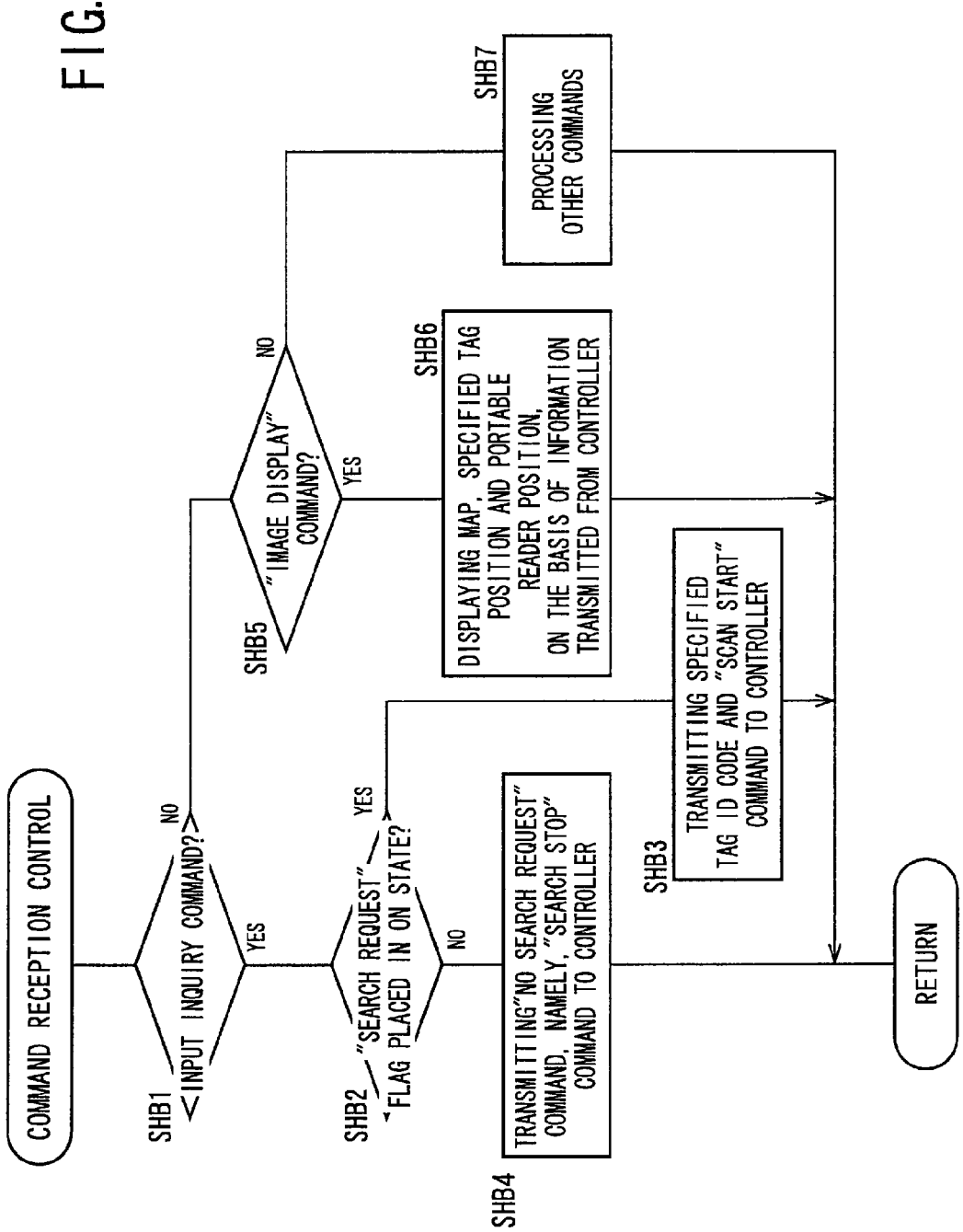
FIG. 44 is a flow chart illustrating an operation to control reception of commands from the controller by the control portion of the portable radio-frequency tag communication device of FIG. 30.

The flow chart of FIG. 44 illustrates an operation to control reception of the commands from the controller 152 by the control portion 182 of the portable radio-frequency tag communication device 114. This control routine is repeatedly executed with a predetermined cycle time.

This control routine is initiated with SHB1 to determine whether the input inquiry command has been received from the controller 152. If a negative determination is obtained in SHB1, the control flow goes to SHB5 to determine whether an "IMAGE DISPLAY" command has been received from the controller 152. If an affirmative determination is obtained in SHB1, the control flow goes to SHB2 to determine whether the "SEARCH REQUEST" flag is placed in the on state. If an affirmative determination is obtained in SHB2, the control flow goes to SHB3 to transmit the identification code of the specified radio-frequency tag 14 together with a "SCAN START" command to the controller 152, and the present control routine is terminated. If a negative determination is SHB2, the control flow goes to SHB4 to transmit a "NO SEARCH REQUEST" command, namely, a "SEARCH STOP" command to the controller 152, and the present control routine is terminated. If an affirmative determination is obtained in SHB5, that is, if it is determined that the "IMAGE DISPLAY" command has been received from the controller 182, the control flow goes to SHB6 to activate the display portion 160 to provide the radio-frequency tag search view including the position of the specified radio-frequency tag 14 and the position of the portable radio-frequency tag communication device 114, on the basis of information transmitted from the controller 152. Then, the present control routine is terminated. If a negative determination is obtained in SHB5, that is, if it is determined that the "IMAGE DISPLAY" command has not been received from the controller 152, the control flow goes to SHB7 to process other commands, and the present control routine is terminated.

In the present second embodiment described above, the portable radio-frequency tag communication device 114 comprises the information reading portion 183 (SHA4) configured to read information from the radio-frequency tag 14 by receiving the reply wave $F_r$, which is transmitted from the radio-frequency tag 14 in response to the interrogating wave $F_c$ transmitted from another radio-frequency tag communication device in the form of the stationary radio-frequency tag communication device 112. Thus, the plurality of radio-frequency tag communication devices can receive a reply from the radio-frequency tag in response to one command from one of the radio-frequency tag communication devices, so that concurrent radio communications of the radio-frequency tag communication devices do not cause a wave interference, and the time required for the radio communication can be reduced. Namely, the present embodiment provides the portable radio-frequency tag communication device 114 which permits rapid radio-communication with the radio-frequency tag with a simple control operation, in the radio-frequency tag communication system 110 provided with the plurality of radio-frequency tag communication devices including the radio-frequency tag communication device in question.

Further, the interrogating wave consists of the command portion for determining an operation of the radio-frequency tag, and the carrier wave $f_p$ for carrying the reply wave from the radio-frequency tag, and the portable radio-frequency tag communication device 114 further comprises the commandtransmission-completion detecting portion 184 (SHA3) configured to determine whether transmission of the command portion of the interrogating wave is completed, and the transmitter portion 176 configured to transmit the predetermined carrier wave to the radio-frequency tag 14 after the command-transmission-completion detecting portion 184 has determined that the transmission of the command portion is completed. Accordingly, the reply wave can be subjected to homodyne wave detection, and can therefore be received with high sensitivity.

Further, the carrier wave $f_p$ transmitted from the transmitter portion 176 has a frequency different from that of the interrogating wave $F_c$ transmitted from the stationary radio-frequency tag communication device 112. Accordingly, it is possible to effectively prevent an influence on the radio communication between the stationary 112 radio-frequency communication device 112 and the radio-frequency tag 14.

Further, the difference between the frequency of the carrier wave $f_p$ transmitted from the transmitter portion 176 and the frequency of the interrogating wave $F_c$ transmitted from the stationary radio-frequency tag communication device 112 is not smaller than the frequency of a sub-carrier wave of the radio-frequency tag 14. Accordingly, he above-indicated another radio-frequency tag communication device and it is possible to effectively prevent an influence on the radio communication between the stationary radio-frequency tag communication device 112 and the radio-frequency tag 14.

Further, the transmitter portion 176 is configured to diffuse the frequency of the carrier wave $f_p$. Accordingly, it is possible to more stably prevent the influence on the radio-communication between the stationary radio-frequency communication device 112 and the radio-frequency tag 14.

The radio-frequency tag communication system of according to the present embodiment comprises the first radio-frequency tag communication device in the form of the stationary radio-frequency tag communication device 112 configured to transmit the interrogating wave $F_c$ toward the radio-frequency tag 14 and to receive the reply wave $F_r$ transmitted from the radio-frequency tag 14 in response to the interrogating wave $F_c$, and the second radio-frequency tag communication device in the form of the portable radio-frequency tag communication device 114 having the information reading portion 183 configured to receive the interrogating wave $F_c$ transmitted from the stationary radio-frequency tag communication device 112 and to receive the reply wave $F_r$ transmitted from the radio-frequency tag 14 in response to the interrogating wave $F_c$, for thereby reading information from the radio-frequency tag 14. Accordingly, the plurality of radio-frequency tag communication devices can receive a reply from the radio-frequency tag in response to one command from one of the radio-frequency tag communication devices, so that concurrent radio communications of the radio-frequency tag communication devices do not cause a wave interference, and the time required for the radio communication can be reduced. Namely, the present embodiment provides the radio-frequency communication system 110 which is provided with the plurality of radio-frequency communication devices 112, 114 and which permits rapid radio-communication with the radio-frequency tag 14 with a simple control operation, Further, the first radio-frequency tag communication device is the stationary radio-frequency tag communication device 112 installed at a fixed position. Accordingly, the stationary radio-frequency tag communication device 112 which transmits the interrogating wave $F_c$ can have a relatively large electric energy supply capacity, so that the area of communication of the stationary radio-frequency tag communication device 112 can be increased.

Further, the stationary radio-frequency tag communication device 112 is provided with the antenna device 128 having a wide angular range of directivity and configured to transmit the interrogating wave $F_c$ toward the radio-frequency tag and to receive the reply wave $F_r$ transmitted from the radio-frequency tag 14 in response to the interrogating wave $F_c$. Accordingly, the stationary radio-frequency tag communication device 112 has a wide area of communication.

Further, the second ratio-frequency tag communication device is the portable radio-frequency tag communication device 114 which is movable. The portable radio-frequency tag communication device 114 permits accurate detection of the position of the radio-frequency tag 14. A plurality of portable radio-frequency communication devices do not suffer from an interference between their radio communications.

Further, the portable radio-frequency tag communication device 114 is provided with the unidirectional antenna device 174 configured to receive the interrogating wave $F_c$ transmitted from the stationary radio-frequency tag communication device 112 and to receive the reply wave $F_r$ transmitted from the radio-frequency tag 14 in response to the interrogating wave $F_c$. In this case, the position of the radio-frequency tag 14 can be accurately detected.

Further, the portable radio-frequency tag communication device 114 is provided with the second receiver circuit 180 configured to receive the interrogating wave $F_c$ transmitted from the stationary radio-frequency tag communication device 112. Accordingly, the frequency of reception of the portable radio-frequency tag communication device 112 need not be matched with the frequency of the interrogating wave $F_c$, for receiving the interrogating wave $F_c$.

Embodiment 3

Figure 45:
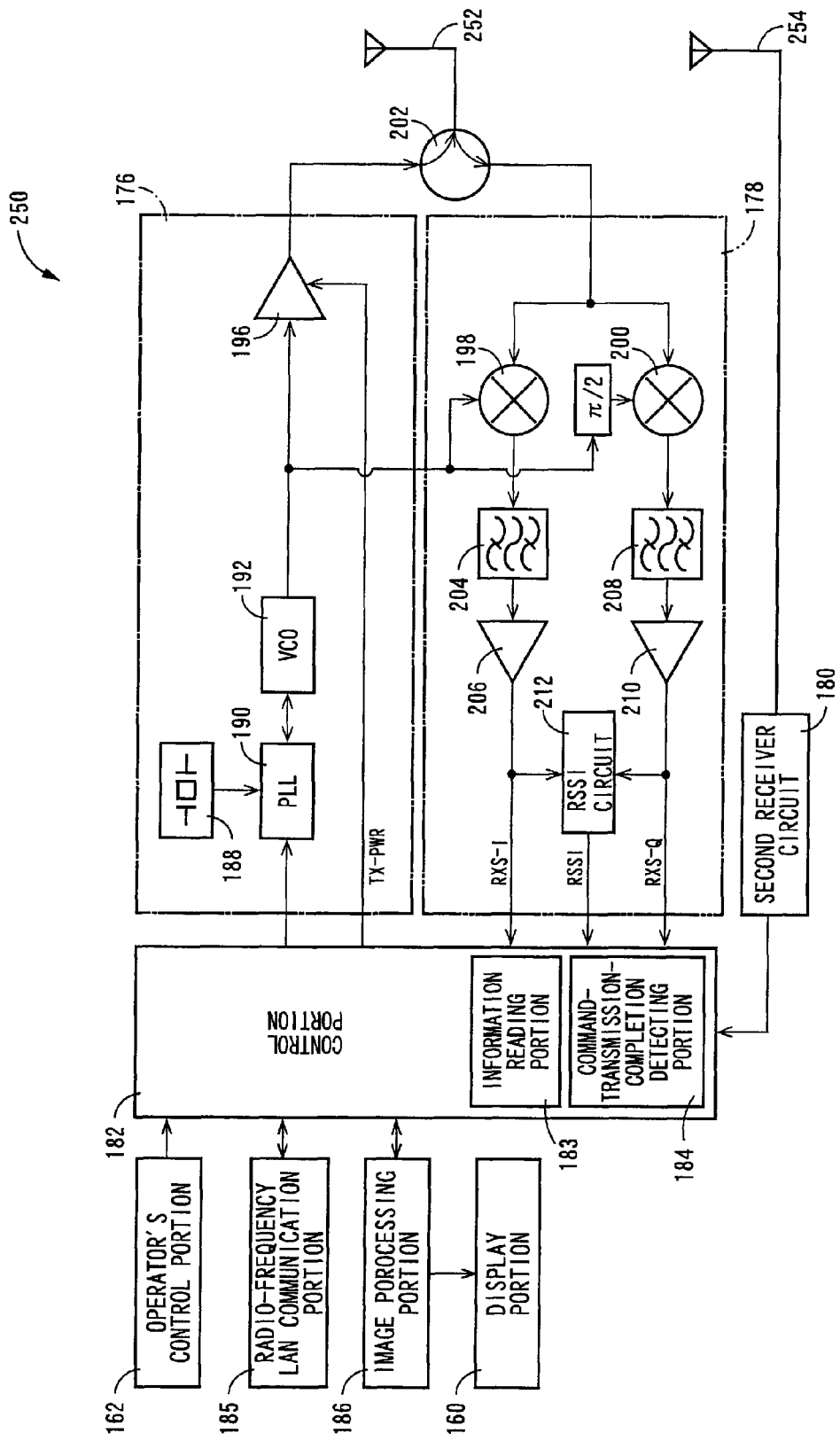
FIG. 45 is a view for explaining an arrangement of a portable radio-frequency tag communication device according to another embodiment of the third aspect of this invention.

FIG. 45 is a view for explaining an arrangement of a portable radio-frequency tag communication device 250 according to another embodiment of the third aspect of this invention. This portable radio-frequency tag communication device 250 is provided with a unidirectional antenna device 252 having a narrow angular range of directivity and connected to the transmitter circuit 176 and the first receiver circuit 178 through the transmission/reception switching portion 202, and an omnidirectional antenna device 254 having a wide angular range of directivity and connected to the second receiver circuit 180. The unidirectional antenna device 252 is provided to transmit toward the radio-frequency tag 14 the carrier wave fp not including a command for detecting the position of the radio-frequency tag 14, and to receive the reply wave $F_r$ from the radio-frequency tag 14. The omnidirectional antenna device 254 is provided to receive the interrogating wave Fc transmitted from the stationary radio-frequency tag communication device 112.

In the present third embodiment described above, the portable radio-frequency tag communication device 250 is provided with the first antenna device in the form of the omnidirectional antenna device 254 configured to receive the interrogating wave $F_c$ transmitted from the stationary radio-frequency tag communication device 112, and the second antenna device in the form of the unidirectional antenna device 252 configured to transmit the carrier wave $f_p$ toward the radio-frequency tag upon reception of the reply wave $F_r$ from the radio-frequency tag 14 and to receive the reply wave $F_r$ transmitted from the radio-frequency tag 14 in response to the interrogating wave $F_c$. Accordingly, the portable radio-frequency tag communication device 250 can receive, with high sensitivity, the interrogating wave $F_c$ transmitted from the stationary radio-frequency tag communication device 112, irrespective of the direction in which the stationary radio-frequency tag communication device 112 is located with respect to the portable radio-frequency tag communication device 250, so that the position of the radio-frequency tag 14 can be detected with high accuracy.

The preferred embodiments of the third and fourth aspects of the present invention have been described in detail by reference to the drawings, it is to be understood that the third and fourth aspects of the invention are not limited to the illustrated embodiments, may be otherwise embodied.

In the second and third embodiments, the radio-frequency communication system 110 uses radio-frequency tag communication devices consisting of the plurality of stationary radio-frequency tag communication devices 112 and the one portable radio-frequency tag communication device 114, the invention is not limited to the illustrated embodiments. For example, the radio-frequency tag 14 may be detected by the plurality of stationary radio-frequency tag communication devices 112 and the plurality of portable radio-frequency tag communication devices 114. In this case, a plurality of users of the communication system can suitably detect the plurality of radio-frequency tags 14 located within a desired area. Further, the principle of the present invention is also applicable to a radio-frequency tag communication system using radio-frequency tag communication devices consisting of a single stationary radio-frequency tag communication system 112 and a single portable radio-frequency tag communication device 114, a radio-frequency tag communication system using radio-frequency tag communication devices consisting of a plurality of stationary radio-frequency tag communication devices 112, or a radio-frequency tag communication system using radio-frequency tag communication devices consisting of a plurality of portable radio-frequency tag communication devices 114.

In the second and third embodiments, the controller 152 is provided separately from the stationary radio-frequency tag communication devices 112. However, one of the stationary radio-frequency tag communication devices 12 may have the function of the controller 152, or the portable radio-frequency tag communication device 114 may have the function of the controller 152. It is also noted that the controller 152 need not be provided.

In the second and third embodiments, the portable radio-frequency tag communication device 114 is provided with the operator's control portion 162 in addition to the display portion 160. However, the portable radio-frequency tag communication device 114 may be provided with a touch-panel type display device which permits the user to touch its screen for specifying the desired radio-frequency tag and which indicates the direction in which the specified radio-frequency tag exists.

In the second and third embodiments, the sound generating device 164 is arranged to generate a sound informing that the portable radio-frequency tag communication device 114 is located near the specified radio-frequency tag 14. However, the sound generating device 114 may be arranged to generate a sound informing that the portable radio-frequency tag communication device 114 has been moved apart from the specified radio-frequency tag 14 by a large distance.

In the preceding embodiments, the portable radio-frequency tag communication device 114 may be provided with a data base representative of a list of articles to which the radio-frequency tags 14 are affixed for management of the articles.

It is to be understood that the present invention may be embodied with various other changes and modifications, without departing from the sprint of the present invention.

What is claimed:

1. A radio-frequency tag communication system including a plurality of radio-frequency tag communication devices each configured to transmit a transmitted signal toward a radio-frequency tag and to receive a reply signal transmitted from the radio-frequency tag in response to the transmitted signal, thereby effecting radio communication with the radio-frequency tag, said radio-frequency tag communication system comprising:

a positional-relationship determining portion configured to determine relative positions of said plurality of radio-frequency tag communication devices by:

commanding each of the plurality of radio-frequency tag communication devices to transmit a current transmitted signal within its area of communication, assigning group information indicative of a first group to a first radio-frequency tag communication device from among the plurality of radio-frequency tag communication devices and group information indicative of a second group to a second radio-frequency tag communication device from among the plurality of radio-frequency tag communication devices when the first radio-frequency tag communication device does not receive a reply signal from a first radio-frequency tag in response to its current transmitted signal and the second radio-frequency tag communication device does receive the reply signal from the first radio-frequency tag in response to its current transmitted signal, determining that the first group is adjacent to the second group when both the first radio-frequency tag communication device and the second radio-frequency tag communication device were previously assigned group information indicative of a third group after receiving a previously transmitted signal from a second radio-frequency tag; and a transmission control portion configured to control transmission of said transmitted signal from each of the plurality of radio-frequency tag communication devices, according to a result of determination of said relative positions by said positional-relationship determining portion.

2. The radio-frequency tag communication system according to claim 1, further comprising a memory device for storing the relative positions of said plurality of radio-frequency tag communication devices, and wherein contents of said memory device are updated each time radio communication is effected between the radio-frequency communication devices and said radio-frequency tag.

3. The radio-frequency tag communication system according to claim 1, wherein said positional-relationship determining portion determines that the plurality of radio-frequency tag communication devices which are able to communicate with the same radio-frequency tag within a predetermined length of time are located adjacent to each other.

4. The radio-frequency tag communication system according to claim 3, wherein said positional-relationship determining portion determines that the plurality of radio-frequency tag communication devices which are able to communicate with the same radio-frequency tag by a plurality of consecutive times within the predetermined length of time are located adjacent to each other.

5. The radio-frequency tag communication system according to claim 1, wherein said transmission control portion controls the transmission of said transmitted signals from the plurality of radio-frequency tag communication devices, such that the radio-frequency tag communication devices that are located adjacent to each other transmit the transmitted signals at respective different points of time.

6. The radio-frequency tag communication system according to claim 1, wherein said transmission control portion classifies the plurality of radio-frequency tag communication devices into a plurality of groups such that the radio-frequency tag communication devices which are determined by said positional-relationship determining portion to be located adjacent to each other belong to the respective different groups, said transmission control portion controlling the transmission of said transmitted signals such that said plurality of groups of the radio-frequency tag communication devices transmit the transmitted signals at respective different points of time.

7. The radio-frequency tag communication system according to claim 6, wherein said transmission control portion controls the transmission of the transmitted signals such that the radio-frequency tag communication devices belonging to the same group transmit the transmitted signals at respective different points of time which are selected at random.

8. The radio-frequency tag communication system according to claim 1, wherein said plurality of radio-frequency tag communication devices are disposed such that three adjacent ones of the radio-frequency tag communication devices are located substantially at respective apexes of an equilateral triangle, as seen in a horizontal plane.

9. The radio-frequency tag communication system according claim 8, wherein said plurality of radio-frequency tag communication devices are disposed such that a distance between two adjacent ones of the radio-frequency tag communication devices is not shorter than a maximum distance of communication of the radio-frequency communication devices and not longer than a distance two times said maximum distance of communication.

10. The radio-frequency tag communication system according to claim 8, wherein said plurality of radio-frequency tag communication devices are disposed such that a distance between two adjacent ones of the radio-frequency tag communication devices is selected within a range between 1.4 and 1.8 times a maximum distance of communication of the radio-frequency tag communication devices.

11. A control device configured to locate a plurality of radio-frequency tag communication devices that are configured to transmit transmitted signals to each of a plurality of radio-frequency tags and to receive a reply signal transmitted from the plurality of radio-frequency tags in response to said transmitted signals, thereby effecting radio communication with the plurality of radio-frequency tags, said control device comprising:
  a group-information storage portion for storing group information indicative of a group to which each of the plurality of radio-frequency tag communication devices belong; and
  a transmission-timing control portion configured to control a timing of transmission of said transmitted signals, according to said group information stored in said group-information storage portion,
  wherein a first radio-frequency tag communication device from among the plurality of radio-frequency tag communication devices is assigned group information indicative of a first group and a second radio-frequency tag communication device from among the plurality of radio-frequency tag communication devices is assigned group information indicative of a second group when the first radio-frequency tag communication device does not receive a reply signal from a first radio-frequency tag in response to its current transmitted signal and the second radio-frequency tag communication device does receive the reply signal from the first radio-frequency tag in response to its current transmitted signal, and
  wherein the first group is identified as being adjacent to the second group when both the first radio-frequency tag communication device and the second radio-frequency tag communication device were previously assigned group information indicative of a third group after receiving a previously transmitted signal from a second radio-frequency tag.

12. The radio-frequency tag communication device according to claim 11, wherein said group-information storage portion stores the group information obtained on the basis of positions of the radio-frequency tag communication device relative to other radio-frequency tag communication devices.

13. The radio-frequency tag communication system according to claim 11, wherein said transmission-timing control portion transmits said transmitted signals, according to said group information in which the plurality of radio-frequency tag communication devices located adjacent to each other are classified into a plurality of different groups, at different points of time for each group.

* * * * *